US010864976B2

(12) United States Patent
Burton et al.

(10) Patent No.: US 10,864,976 B2
(45) Date of Patent: *Dec. 15, 2020

(54) CONNECTION AND FEATURES FOR INTERCHANGEABLE NOSECONE FOR A TROLLING MOTOR

(71) Applicant: NAVICO HOLDING AS, Egersund (NO)

(72) Inventors: Aaron J. Burton, Tulsa, OK (US); Matthew Laster, Broken Arrow, OK (US); Jeremiah Clark, Tulsa, OK (US); Christopher Dean Crawford, Bixby, OK (US); Paul Robert Bailey, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,951

(22) Filed: Feb. 6, 2019

(65) Prior Publication Data
US 2019/0233075 A1 Aug. 1, 2019

Related U.S. Application Data

(63) Continuation of application No. 15/834,464, filed on Dec. 7, 2017, now Pat. No. 10,377,459.
(Continued)

(51) Int. Cl.
*B63H 20/32* (2006.01)
*B63H 20/00* (2006.01)
(Continued)

(52) U.S. Cl.
CPC ............ *B63H 20/32* (2013.01); *B63H 20/007* (2013.01); *B63H 20/12* (2013.01); *B63B 49/00* (2013.01); *G01S 15/96* (2013.01); *G10K 11/006* (2013.01)

(58) Field of Classification Search
CPC ...... B63H 20/32; B63H 20/12; B63H 20/007; B63B 2755/00; B63B 49/00; G10K 11/006; G01S 15/96
See application file for complete search history.

(56) References Cited

U.S. PATENT DOCUMENTS 2,429,774 A 10/1947 Schultz et al.
3,258,250 A 6/1966 McMullin
(Continued)

FOREIGN PATENT DOCUMENTS

JP 2014-172451 9/2014

OTHER PUBLICATIONS

Humminbird 360 Imaging advertising literature excerpts; pp. 10-11 and 52-53.
(Continued)

*Primary Examiner* — Anthony D Wiest
(74) *Attorney, Agent, or Firm* — Nelson Mullins Riley & Scarborough LLP

(57) ABSTRACT

Various implementations described herein are directed to a trolling motor including an electric motor having a propeller coupled thereto, a shaft configured for coupling the electric motor to a watercraft. The shaft is configured to rotate relative to the watercraft and the shaft defines an internal passage. The trolling motor also includes a housing that encapsulates the motor, a removable nosecone operably coupled to the housing opposite the propeller and configured to encapsulate at least one marine device. One or more mechanical connection features are provided to enable removable connection of the nosecone to the remainder of the trolling motor housing. One or more electrical connection features are provided to enable electrical connection of the at least one marine device through the trolling motor housing.

18 Claims, 48 Drawing Sheets

Related U.S. Application Data

(60) Provisional application No. 62/477,773, filed on Mar. 28, 2017, provisional application No. 62/492,472, filed on May 1, 2017.

(51) Int. Cl.
  *B63H 20/12* (2006.01)
  *B63B 49/00* (2006.01)
  *G01S 15/96* (2006.01)
  *G10K 11/00* (2006.01)

(56) References Cited

U.S. PATENT DOCUMENTS

| | | |
|---|---|---|
| 4,737,940 A | 4/1988 | Arringotn |
| 4,970,700 A | 11/1990 | Gilmour et al. |
| 5,200,931 A | 4/1993 | Kosalos et al. |
| 5,260,912 A | 11/1993 | Latham |
| 5,525,081 A | 6/1996 | Mardesich |
| 5,568,152 A | 10/1996 | Janky et al. |
| 5,675,552 A | 10/1997 | Hicks et al. |
| 5,812,494 A | 9/1998 | Medeiros |
| 6,160,764 A | 12/2000 | Powell |
| 6,449,215 B1 | 9/2002 | Shell |
| 6,652,331 B2 | 11/2003 | Healey |
| 6,909,946 B1 | 6/2005 | Kabel et al. |
| 6,995,527 B2 | 2/2006 | DePasqua |
| 7,542,376 B1 | 6/2009 | Thompson et al. |
| 7,652,952 B2 | 1/2010 | Betts |
| 7,729,203 B2 | 6/2010 | Betts et al. |
| 8,300,499 B2 | 10/2012 | Coleman et al. |
| 8,305,840 B2 | 11/2012 | Maguire |
| 8,305,844 B2 | 11/2012 | DePasqua |
| 8,605,550 B2 | 12/2013 | Maguire |
| 8,651,041 B2 | 2/2014 | Meyers |
| 9,201,142 B2 | 12/2015 | Antao |
| 9,315,248 B2 | 4/2016 | Williams |
| 9,335,412 B2 | 5/2016 | Proctor |
| 9,739,884 B2 | 8/2017 | Proctor et al. |
| 10,114,119 B2 | 10/2018 | Horner et al. |
| 2002/0044500 A1 | 4/2002 | Hansen |
| 2009/0147623 A1 | 6/2009 | Betts et al. |
| 2010/0014386 A1 | 1/2010 | Thompson et al. |
| 2013/0044569 A1 | 2/2013 | DePasqua |
| 2013/0208568 A1 | 8/2013 | Coleman et al. |
| 2013/0215719 A1 | 8/2013 | Betts et al. |
| 2014/0010048 A1 | 1/2014 | Proctor |
| 2014/0010049 A1 | 1/2014 | Proctor |
| 2014/0139730 A1 | 5/2014 | White |
| 2014/0269192 A1 | 9/2014 | Proctor |
| 2015/0158570 A1 | 6/2015 | Schlintz et al. |
| 2016/0207602 A1 | 7/2016 | Clark |
| 2016/0320474 A1 | 11/2016 | Proctor et al. |
| 2016/0325814 A1 | 11/2016 | Antao et al. |
| 2016/0341827 A1 | 11/2016 | Horner et al. |
| 2018/0281914 A1 | 10/2018 | Burton et al. |

OTHER PUBLICATIONS

Furuno Model CH-37BB Color Sector Scanning Sonar product literature; Jan. 2012.
Wesmar SS395 Series Sonar Product literature; Feb. 2010; http://www.wesmar.com/productbrochures/wesmar_ss395_web.pdf.
D'Amico, et al.; A Brief History of Active Sonar; Aquatic Mammals; vol. 35, No. 4; pp. 426-434; 2009; http://csi.whoi.edu/sites/default/files/literature/Full%20Text.pdf.
Caputi; Power to the People (4 Look Ahead, Interphase iScan 180); Saltwater Sportsman; Sep. 21, 2007; http://www.saltwatersportsman.com/power-people.
Bottom Line Fishin Buddy product literature; Feb. 2001.
Bottom Line Fishin Buddy 2255 Manual.
Furuno Model CH-28 Installation Manual; Apr. 10, 1998.
Furuno Model CH-28 Operator's Manual; Dec. 28, 1996.
Furuno Model CH-28 Product Literature.
BottoM Line Finshin Buddy Product Literature; Jul. 14, 1999.
Interphase Sea Scout Product Literature; 1994.
Furuno Model CH-18 Color Searchlight Sonar Product Literature; Feb. 18, 1989.
Wesmar SS90B High Frequency Scanning Sonar Product Literature and Wesmar Pricing Information; Mar. 1, 1980.
Examination Report for Australian Application No. 2018202173 dated Nov. 28, 2018.
Extended European Search Report issued in European Application No. 18164726.4-1015 dated Jul. 30, 2018.

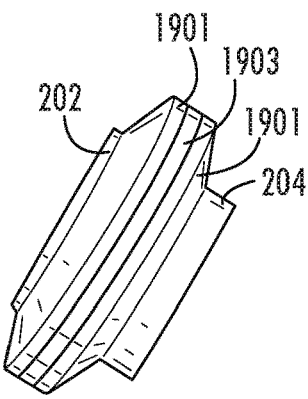
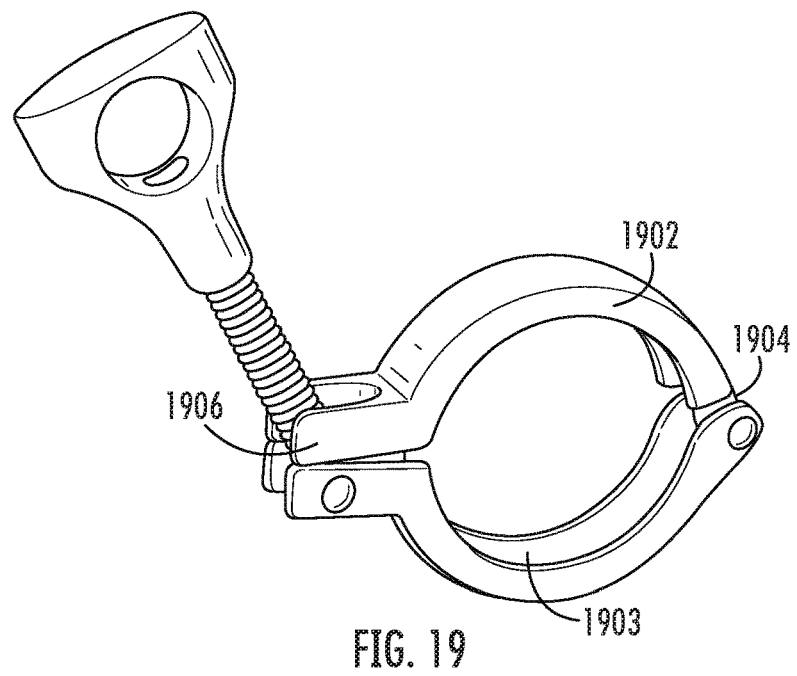
FIG. 19
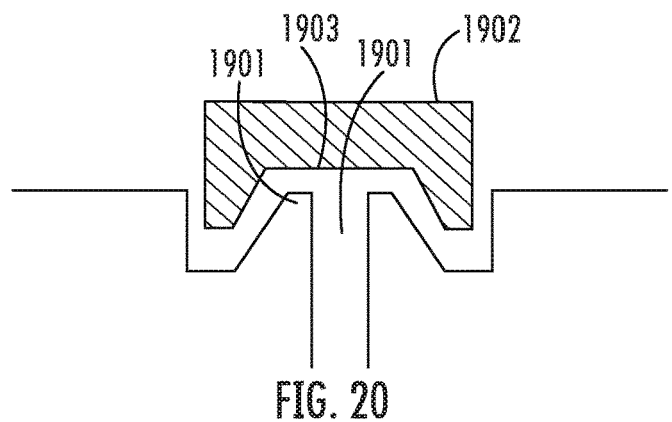
FIG. 20

CONNECTION AND FEATURES FOR INTERCHANGEABLE NOSECONE FOR A TROLLING MOTOR

CROSS REFERENCE TO RELATED APPLICATIONS

This application claims priority to and is a continuation of U.S. non-provisional patent application Ser. No. 15/834,464, entitled "Connection and Features for Interchangeable Nosecone for a Trolling Motor," filed Dec. 7, 2017; claims priority to provisional patent Application No. 62/477,773, entitled "Connection and Features for Interchangeable Nosecone for a Trolling Motor," filed Mar. 28, 2017; and claims priority to provisional patent Application No. 62/492,472, entitled "Connection and Features for Interchangeable Nosecone for a Trolling Motor," filed May 1, 2017, each of which is incorporated by reference herein in its entirety.

FIELD OF THE INVENTION

Embodiments of the present invention relate generally to trolling motor assemblies and, more particularly, to systems, assemblies, and associated methods for providing interchangeable nosecone options for a trolling motor.

BACKGROUND OF THE INVENTION

Trolling motors are often used during fishing or other marine activities. The trolling motors attach to the watercraft and propel the watercraft along a body of water. For example, trolling motors may provide secondary propulsion or precision maneuvering that can be ideal for fishing activities. The trolling motors, however, may also be utilized for the main propulsion system of watercraft. Further, there are many helpful marine data features, such as navigation, sonar, motor/vessel gauges, among others, that can be used by operators or users of the watercraft with a trolling motor. Applicant has developed systems, assemblies, and methods detailed herein to improve capabilities of trolling motors.

BRIEF SUMMARY OF THE INVENTION

There are many different types of transducer systems and other desirable features that are beneficial for fisherman or boaters utilizing a trolling motor. Current trolling motors, however, are limited in customization, as a consumer will purchase a trolling motor. The trolling motor may or may not have functionality built-in. However, depending on the desires of the consumer or the specific needs of the planned trip, it would be desirable to easily swap out functionality. Indeed, each user may have specific tastes or desired features.

In this regard, embodiments of the present invention contemplate providing interchangeable nosecones for trolling motors. For example, a consumer may only need to purchase a trolling motor without a nosecone or a basic nosecone. Then, the consumer may purchase one of a number of different nosecone options, finding the nosecone with the desired functionality (e.g., a specific type of sonar). The consumer may also have extra nosecones that can be utilized depending on the upcoming trip. For example, a user may swap out a nosecone with traditional sonar for a nosecone with downscan sonar plus a water temperature sensor when preparing for an upcoming trip. Likewise, upgrades to functionality (e.g., a new type of sonar) could be implemented with an existing trolling motor without having to purchase a whole new trolling motor. This all could be accomplished while still maintaining the small footprint of the trolling motor since there would be no need to strap on new transducer housings or speakers to the outside of the trolling motor housing. Further, the various features and corresponding cables would be protected by a waterproof housing of the trolling motor.

In an example embodiment, a trolling motor assembly is provided including an electric motor with a propeller coupled thereto and a shaft configured to couple the electric motor to a watercraft. The shaft is configured to rotate relative to the watercraft and the shaft defines an internal passage. The trolling motor assembly also includes a motor housing that encapsulates the electric motor. The housing defines a first end and a second end, the propeller is positioned proximate the second end, and the motor housing includes at least one motor housing electrical connection feature proximate the first end and at least one motor housing mechanical connection feature proximate the first end. The trolling motor also includes a removable nosecone that defines a nosecone housing that includes at least one nosecone electrical connection feature and at least one nosecone mechanical connection feature. The nosecone housing is configured to encapsulate at least one marine device and at least one nosecone electrical cable, the at least one nosecone electrical cable electrically connects the at least one marine device to the at least one nosecone electrical connection feature, the at least one nosecone mechanical connection feature is configured to removably attach to the at least one motor housing mechanical connection feature to enable removable coupling between the nosecone housing and the first end of the motor housing, the at least one nosecone electrical connection feature is configured to electrically connect with the at least one motor housing electrical connection feature in an instance in which the at least one nosecone mechanical connection feature is attached to the at least one motor housing mechanical connection feature. The trolling motor assembly further includes at least one motor housing electrical cable that leads from the at least one electrical connection feature of the motor housing through the internal passage of the shaft to enable electrical signals to be transmitted between the at least one marine device within the nosecone housing and a computing device in an instance in which the at least one nosecone electrical connection feature is electrically connected to the at least one motor housing electrical connection feature. The at least one motor housing electrical cable is contained within the internal passage of the shaft so as to protect the at least one motor housing electrical cable while still enabling rotation of the shaft and motor housing.

In some example embodiments, the motor housing also includes a watertight bulkhead disposed at the first end and the removable nosecone is operably coupled to the watertight bulkhead. In an example embodiment, the removable nosecone is interference fit about a periphery of the bulkhead. In some example embodiments, the trolling motor assembly also includes a bulkhead seal disposed between the bulkhead and the removable nosecone providing a watertight barrier for the removable nosecone. In an example embodiment, the bulkhead includes an electrical cable aperture allowing the electrical cable to pass therethrough. The aperture includes a sealing element disposed in the electrical cable aperture to provide a water tight barrier between the motor housing and the removable nosecone. In some example embodiments, nosecone mechanical connection feature includes a retention element configured to retain the removable nosecone in engagement with the bulkhead. In an example embodiment, the motor housing mechanical connection feature includes a bolt receiver operably coupled to the bulkhead and the retention element includes a retention bolt configured to engage the bolt receiver and the retention bolt includes a bolt head or retention nut configured to apply retention force to the removable nosecone in response to tightening of the retention bolt. In an example embodiment, the removable nosecone includes a through aperture configured to receive the retention bolt therethrough and the trolling motor further also includes a bolt cap configured to close the through aperture in the removable nosecone. In some example embodiments, the motor housing mechanical connection feature includes threads disposed about an outer periphery of the bulkhead and the nosecone mechanical connection feature includes complementary threads disposed on an inner periphery of the nosecone.

In an example embodiment, the nosecone mechanical connection feature includes a plurality of retention screws disposed through a sidewall of the removable nosecone and at least partially through the motor housing.

In some example embodiments, the trolling motor also includes a circular connector configured to retain the removable nosecone in engagement with the motor housing. In an example embodiment, nosecone mechanical connection feature and the motor housing mechanical connection feature include a ridge or groove disposed about an outer periphery of the nosecone and motor housing and the circular connector is disposed about the removable nosecone and motor housing, such that the ridge or groove in the nosecone and motor housing is engaged by a complementary ridge or groove disposed on the circular connector in response to fastening the circular connector to the removable nosecone and the motor housing. In an example embodiment, the circular connector includes a hinged connector and the hinged connector is fastened by a screw, a T lock, or a ratchet strip. In some example embodiments, the hinged connector is anchored to the motor housing or removable nosecone.

In an example embodiment, the nosecone mechanical connection feature or the motor housing mechanical connection feature include one or more retention clips and the other of the motor housing mechanical connection feature or the nosecone mechanical connection feature includes one or more complementary recesses. The one or more retention clips extend longitudinally into the one or more corresponding recesses and the one or more retention clips include a protrusion configured to engage the one or more recesses to retain the removable nosecone in engagement with the motor housing.

In some example embodiments, the nosecone mechanical connection feature or the motor housing mechanical connection feature includes one or more locking elements and the other of the nosecone mechanical connection feature or the motor housing mechanical connection feature includes a locking ring configured to engage the one or more locking elements disposed on the other of the removable nosecone or the motor housing Rotation of the locking ring to a locking position causes the one or more locking elements to engage to cause the removable nosecone to tighten against the motor housing.

In an example embodiment, the removable nosecone includes an interchangeable component module and the at least one marine device is disposed within the interchangeable component module. In some example embodiments, the interchangeable component module or removable nosecone includes a guide configured to be received by a slot disposed in the other of the removable nosecone or the interchangeable component module.

In some example embodiments, the motor housing mechanical connection feature includes a plurality of retention elements disposed in a plurality of retention slots in a side wall the motor housing and the nosecone mechanical connection feature includes a plurality of receiving apertures The retention slots extend in a longitudinal direction of extension of the motor housing and include an aperture disposed in the first end. The plurality of retention elements extend through the aperture and into the plurality of receiving apertures extending at least partially through the removable nosecone to retain the removable nosecone in engagement with the motor housing.

In some example embodiments, the trolling motor assembly also includes a first watertight bulkhead that seals the motor housing at the first end and a second watertight bulkhead that seals the removable nosecone. The nosecone mechanical connection feature is disposed on the second watertight bulkhead and the motor housing mechanical connection feature is disposed on the first water tight bulkhead such that the second watertight bulkhead is configured to be coupled to the first watertight bulkhead.

In another example embodiment, a trolling motor assembly is provided including an electric motor with a propeller coupled thereto and a shaft configured to couple the electric motor to a watercraft. The shaft is configured to rotate relative to the watercraft and the shaft defines an internal passage. The trolling motor also includes a motor housing that encapsulates the electric motor. The housing defines a first end and a second end, the propeller is positioned proximate the second end, and the motor housing includes at least one motor housing electrical connection feature and at least one motor housing mechanical connection feature proximate the first end. The trolling motor assembly also includes a removable nosecone that defines a nosecone housing that includes at least one nosecone electrical connection feature and at least one nosecone mechanical connection feature. The nosecone housing is configured to encapsulate at least one marine device, the at least one nosecone mechanical connection feature is configured to removably attach to the at least one motor housing mechanical connection feature to enable removable coupling between the nosecone housing and the first end of the motor housing, and the at least one nosecone electrical connection feature is configured to establish wireless data communication with the at least one motor housing electrical connection feature or a computing device.

In an example embodiment, the at least one nosecone electrical connection feature is configured to establish wireless data communication with the at least one motor housing electrical connection feature in an instance in which the at least one nosecone mechanical connection feature is attached to the at least one motor housing mechanical connection feature and the trolling motor assembly also includes at least one motor housing electrical cable that leads from the at least one electrical connection feature of the motor housing through the internal passage of the shaft to enable electrical signals to be transmitted between the at least one marine device within the nosecone housing and a computing device in an instance in which the at least one nosecone electrical connection feature is electrically connected to the at least one motor housing electrical connection feature The at least one motor housing electrical cable is contained within the internal passage of the shaft so as to protect the at least one motor housing electrical cable while still enabling rotation of the shaft and motor housing.

In yet a further embodiment, trolling motor assembly is provided including an electric motor with a propeller coupled thereto and a shaft configured to couple the electric motor to a watercraft. The shaft is configured to rotate relative to the watercraft and the shaft defines an internal passage. The trolling motor assembly also includes a motor housing that encapsulates the electric motor, the housing defines a first end and a second end, the propeller is positioned proximate the second end, and the motor housing includes at least one motor housing electrical connection feature proximate the first end and at least one motor housing mechanical connection feature proximate the first end. The trolling motor assembly also include a removable nosecone that defines a nosecone housing that includes at least one nosecone mechanical connection feature. The at least one nosecone mechanical connection feature is configured to removably attach to the at least one motor housing mechanical connection feature to enable removable coupling between the nosecone housing and the first end of the motor housing. The trolling motor assembly also includes at least one motor housing electrical cable that leads from the at least one electrical connection feature of the motor housing through the internal passage of the shaft to enable electrical signals to be transmitted between at least one marine device within the nosecone housing and a computing device in an instance in which the at least one marine electronic device feature is installed in the nosecone and electrically connected to the at least one motor housing electrical connection feature. The at least one motor housing electrical cable is contained within the internal passage of the shaft so as to protect the at least one motor housing electrical cable while still enabling rotation of the shaft and motor housing.

BRIEF DESCRIPTION OF THE DRAWINGS

Figure 1A:
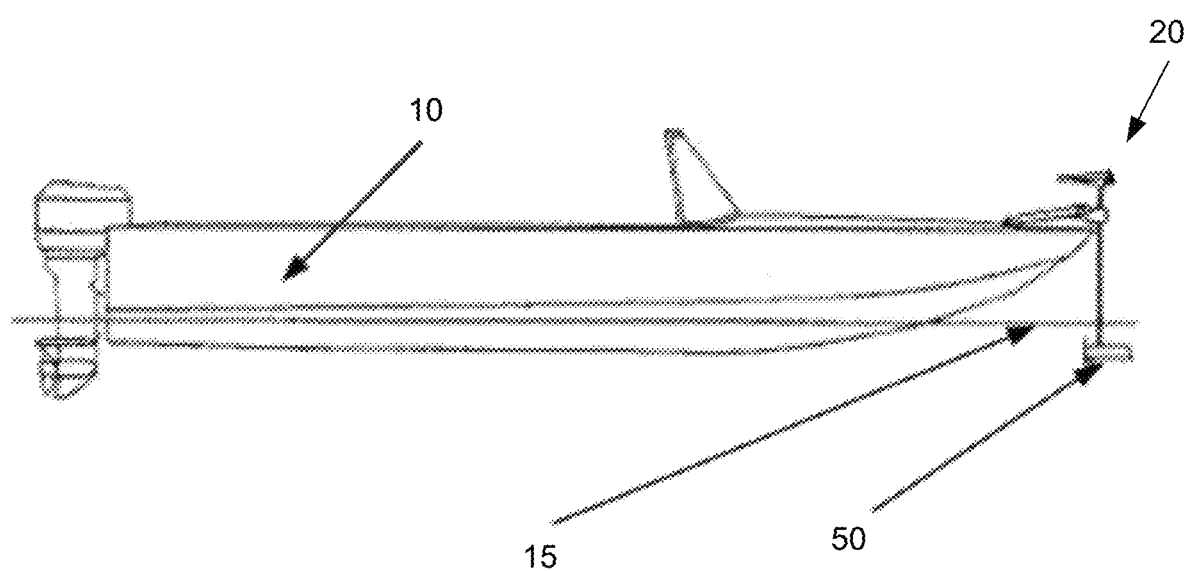
Figure 1B:
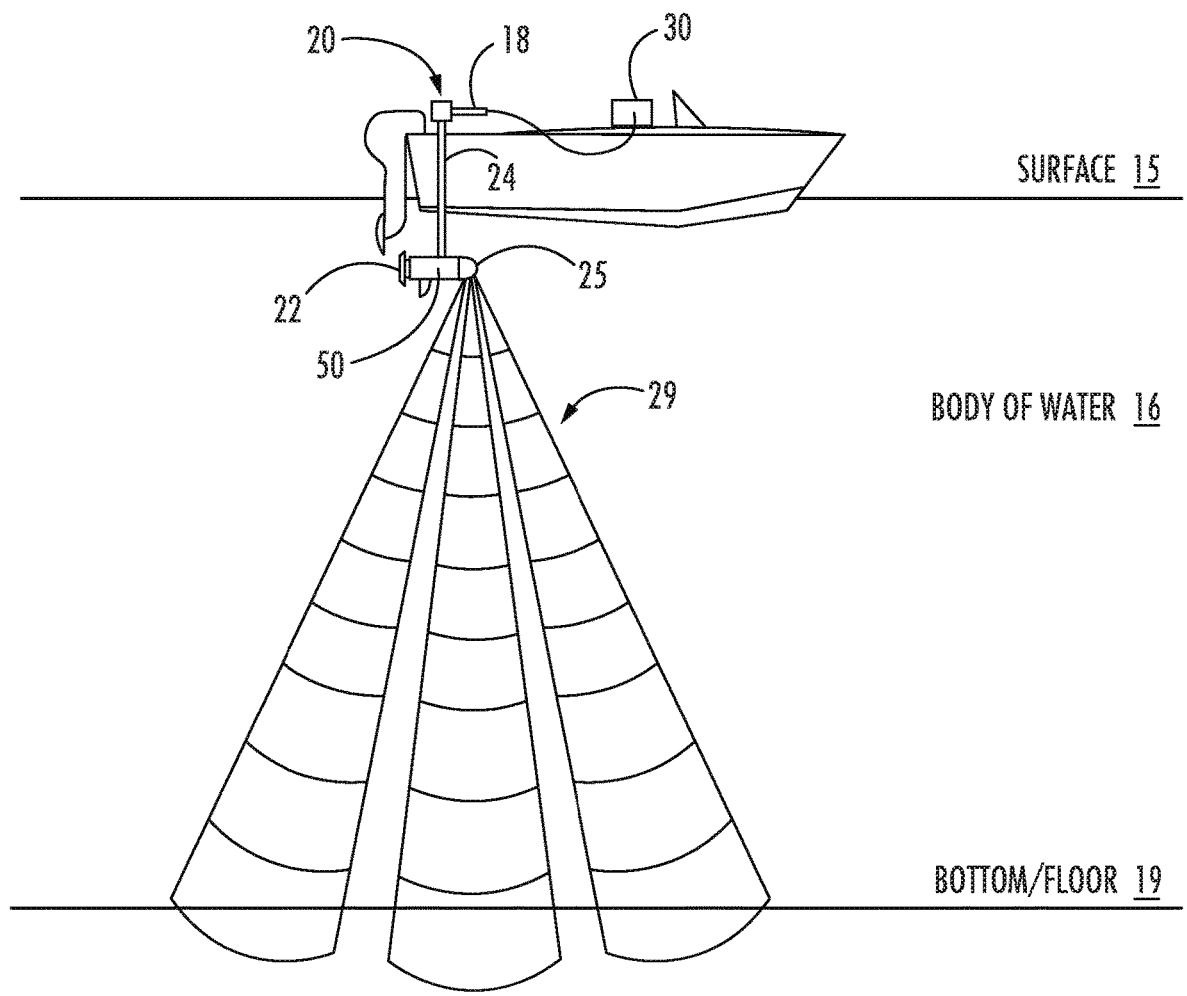
Figure 2:
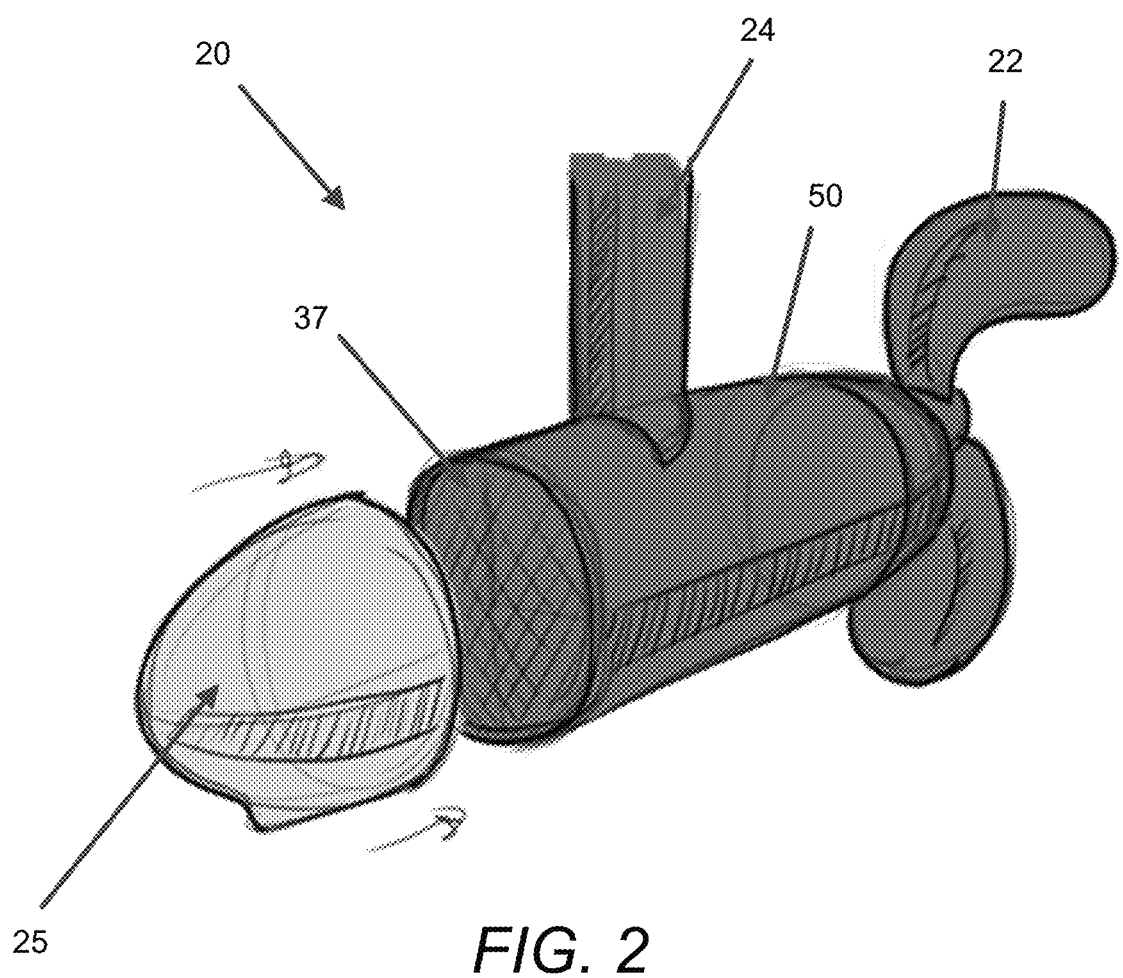
Figure 3A:
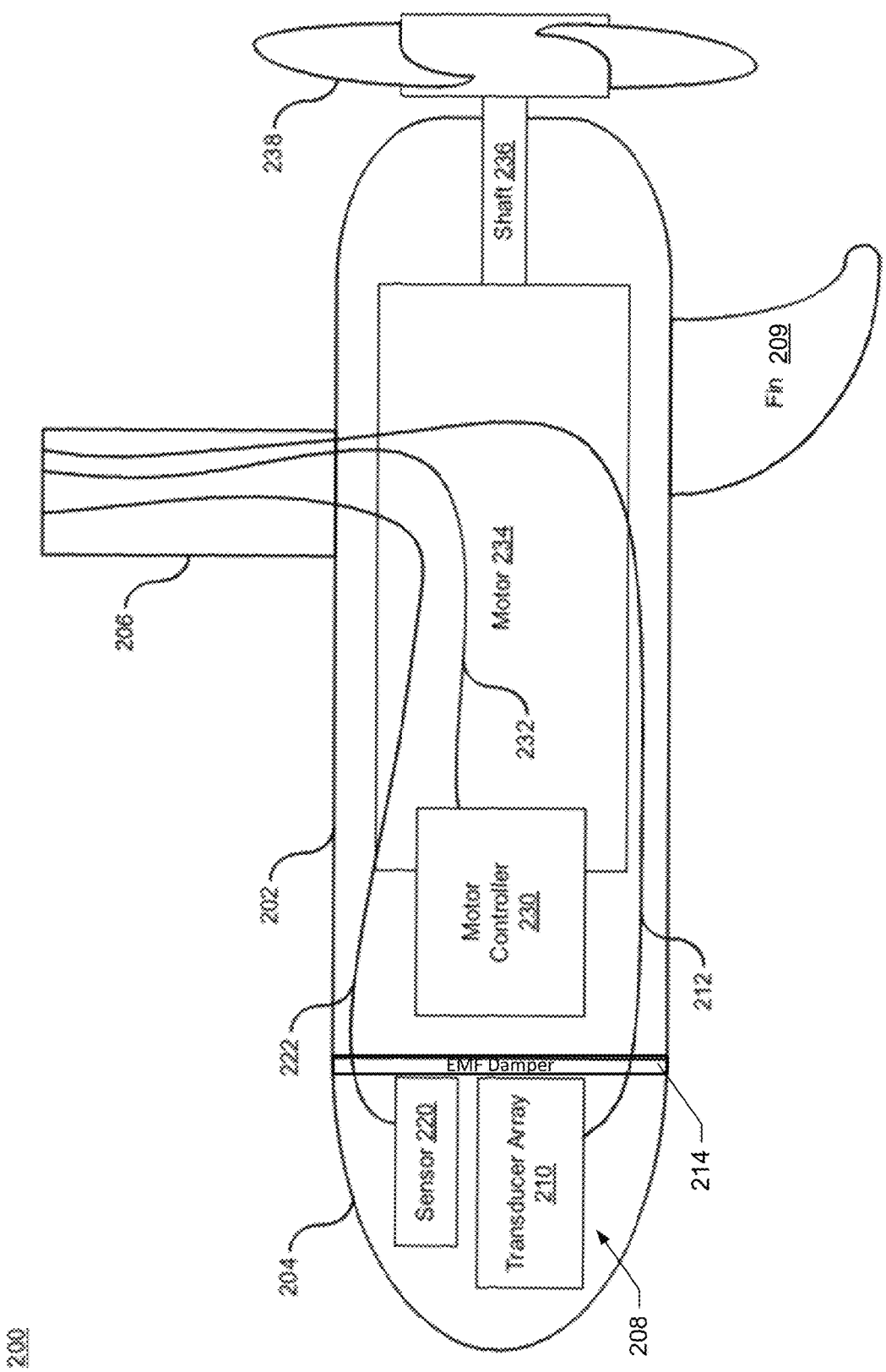
Figure 3B:
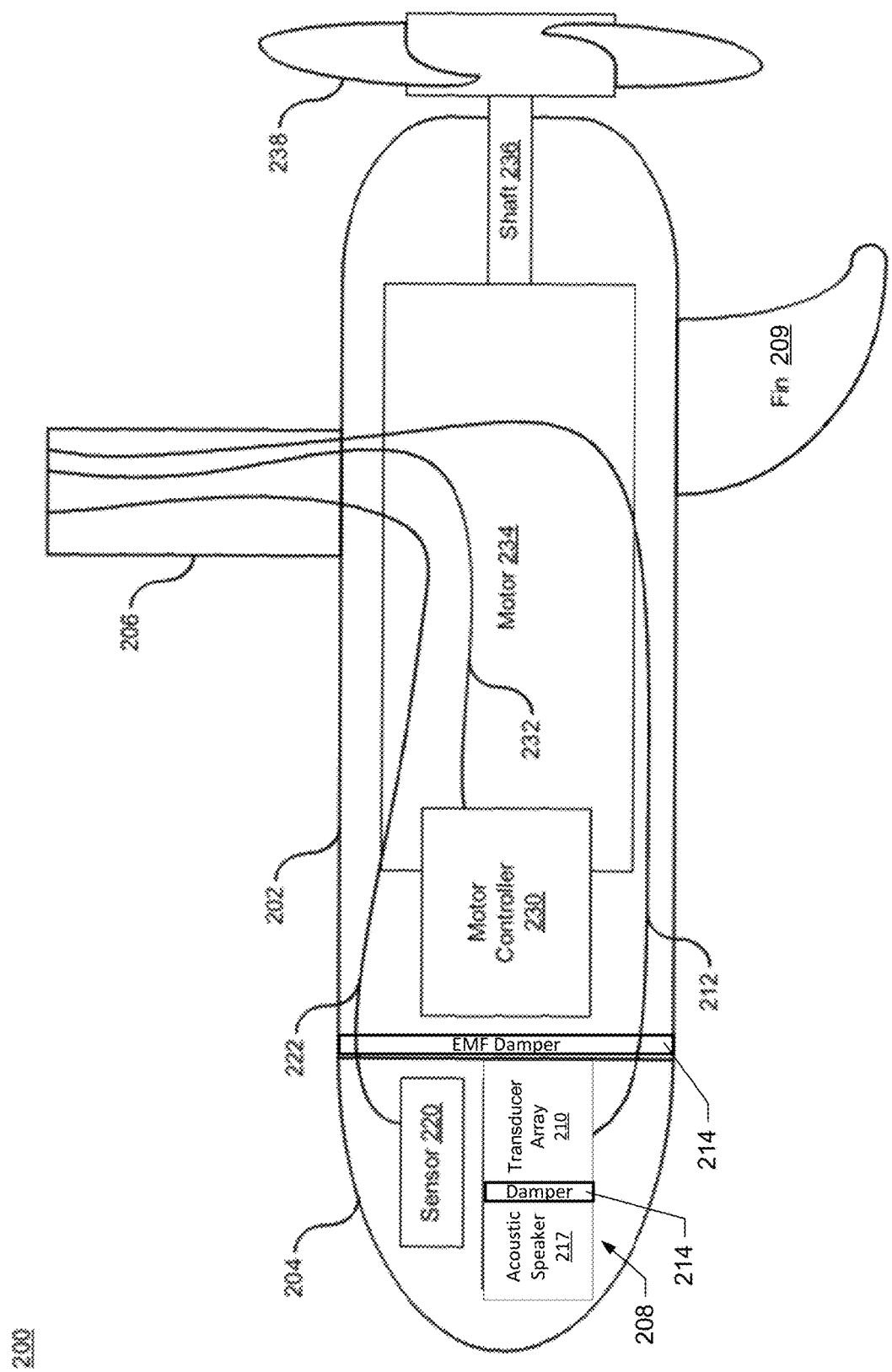
Figure 4:
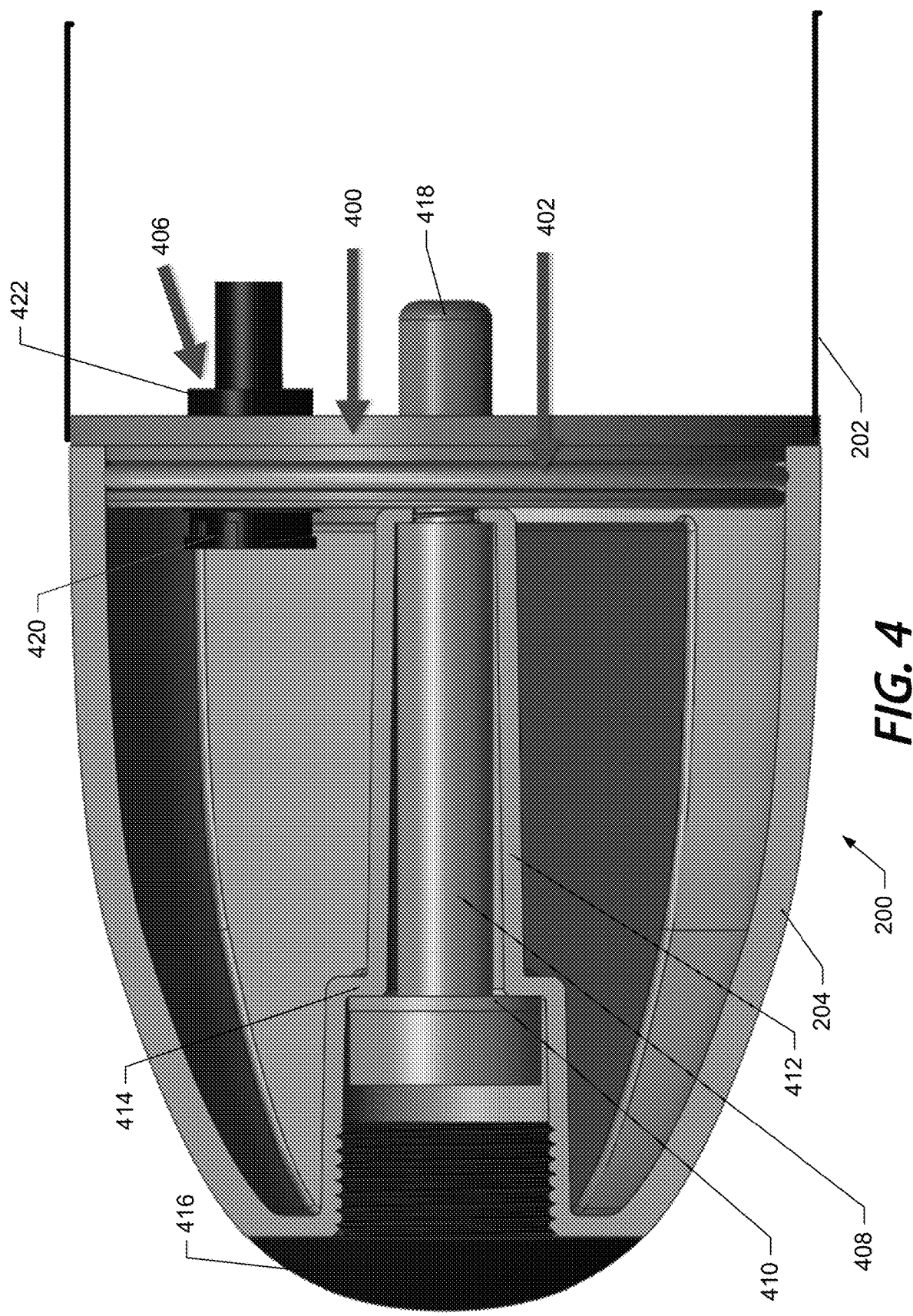
Figure 5:
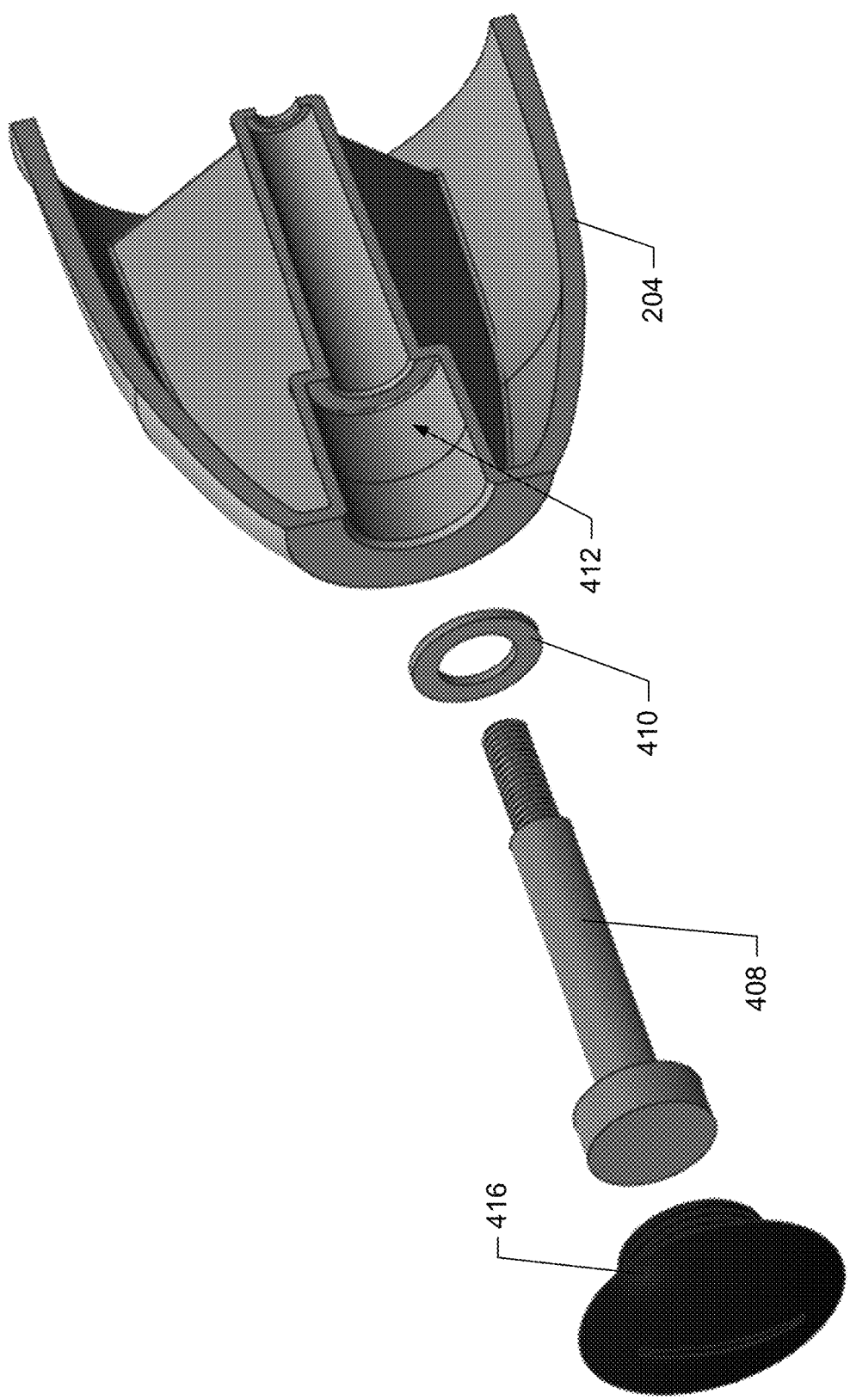
Figure 6:
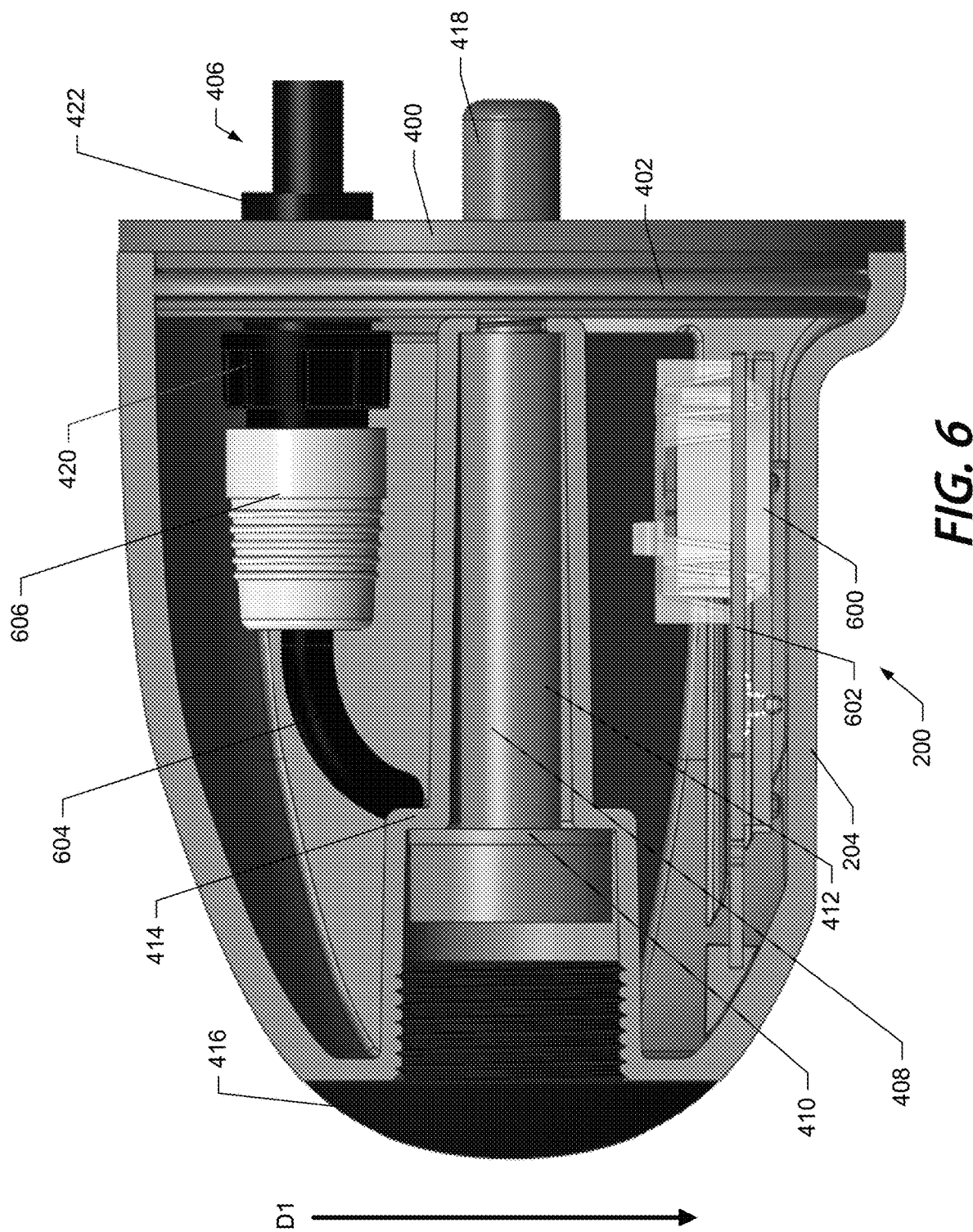
Figure 7:
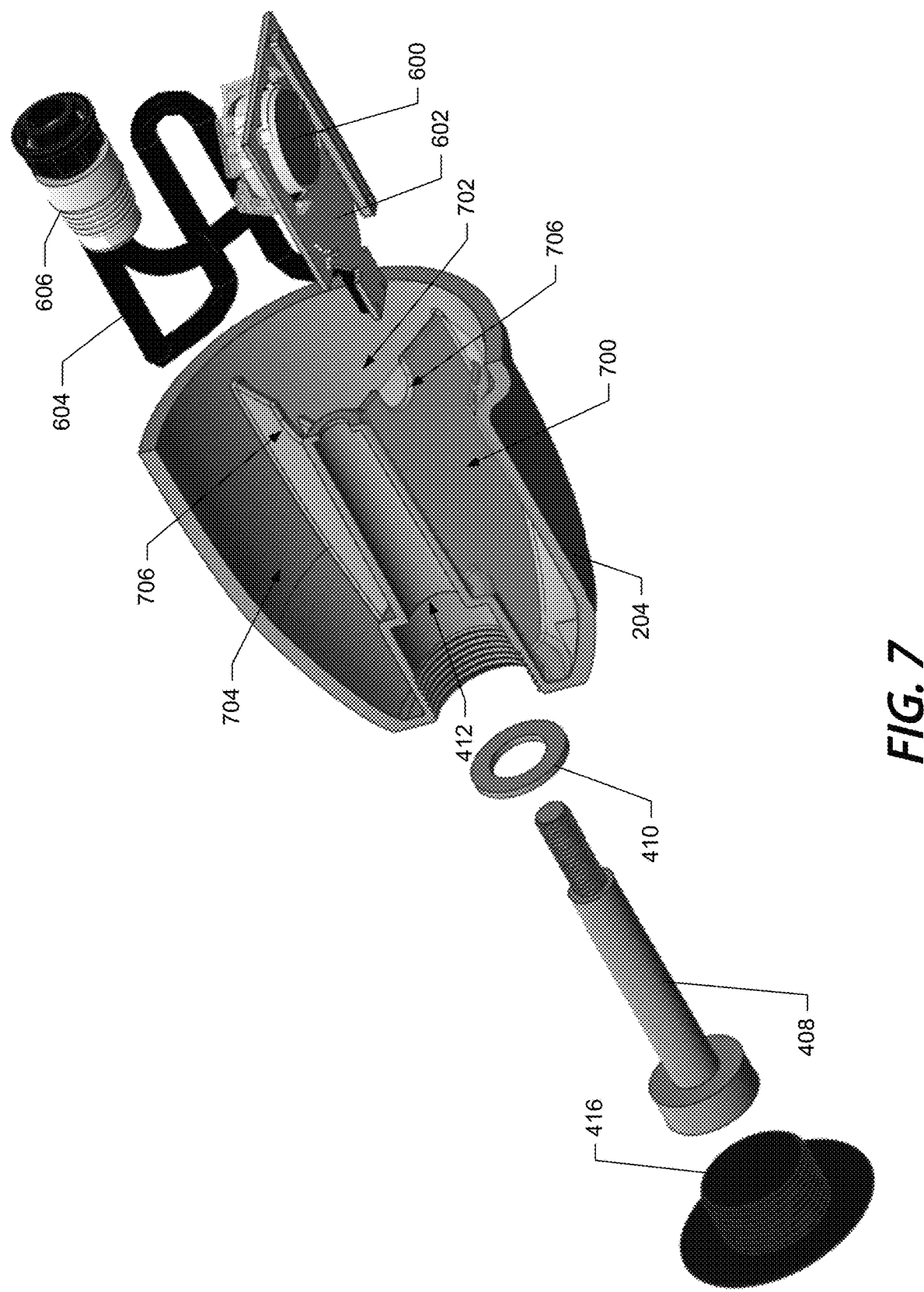
Figure 8:
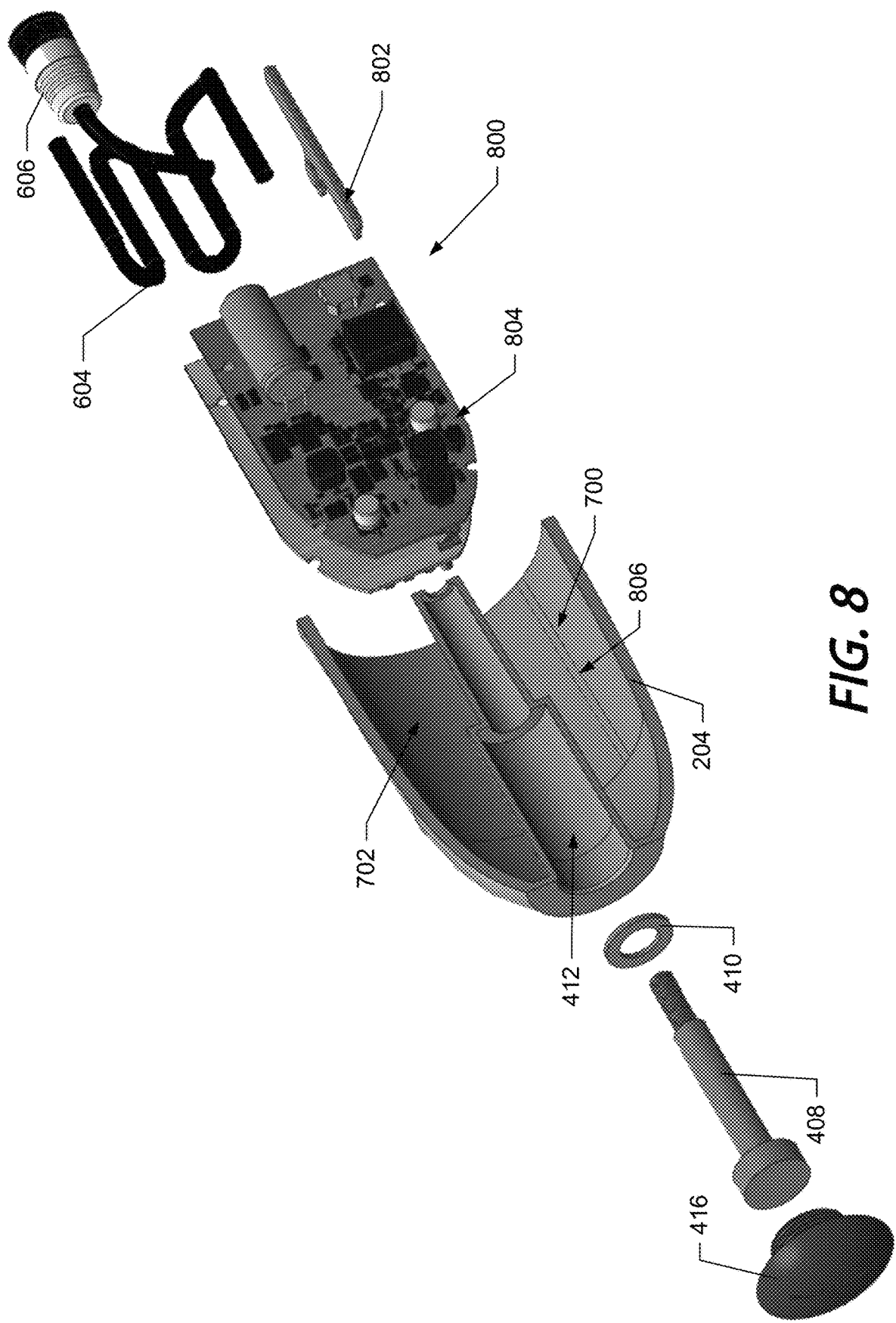
Figure 9:
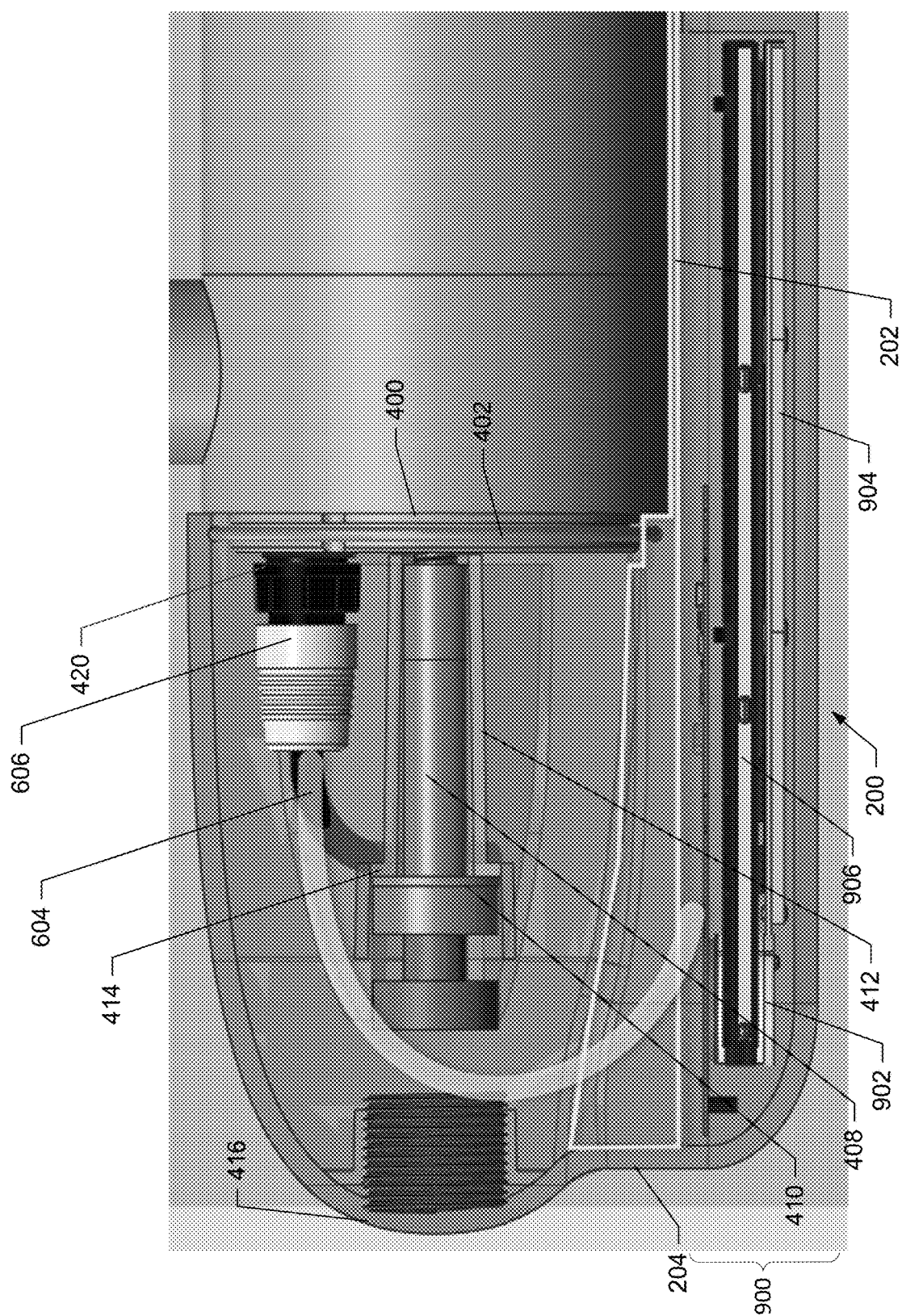
Figure 10:
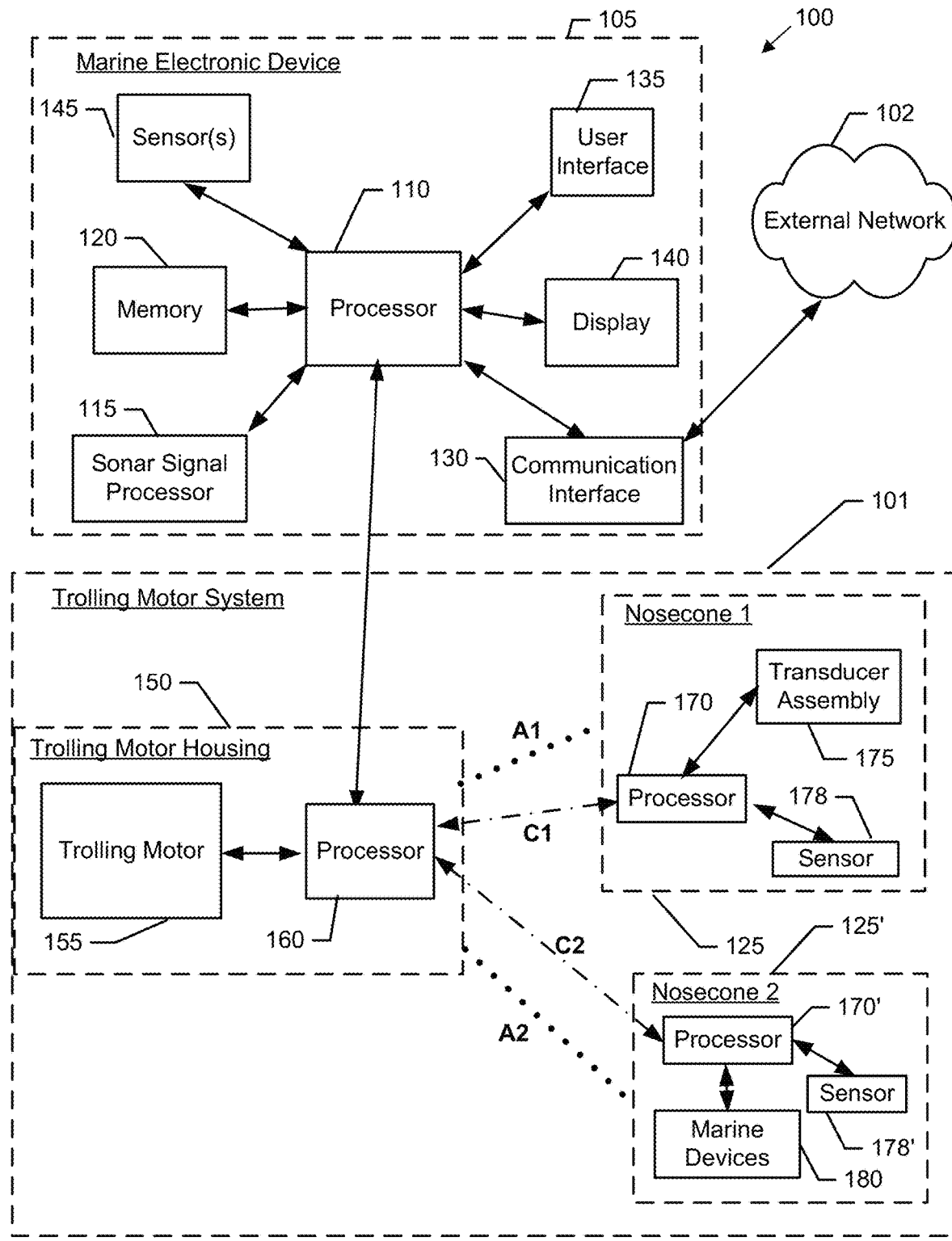
Figure 11:
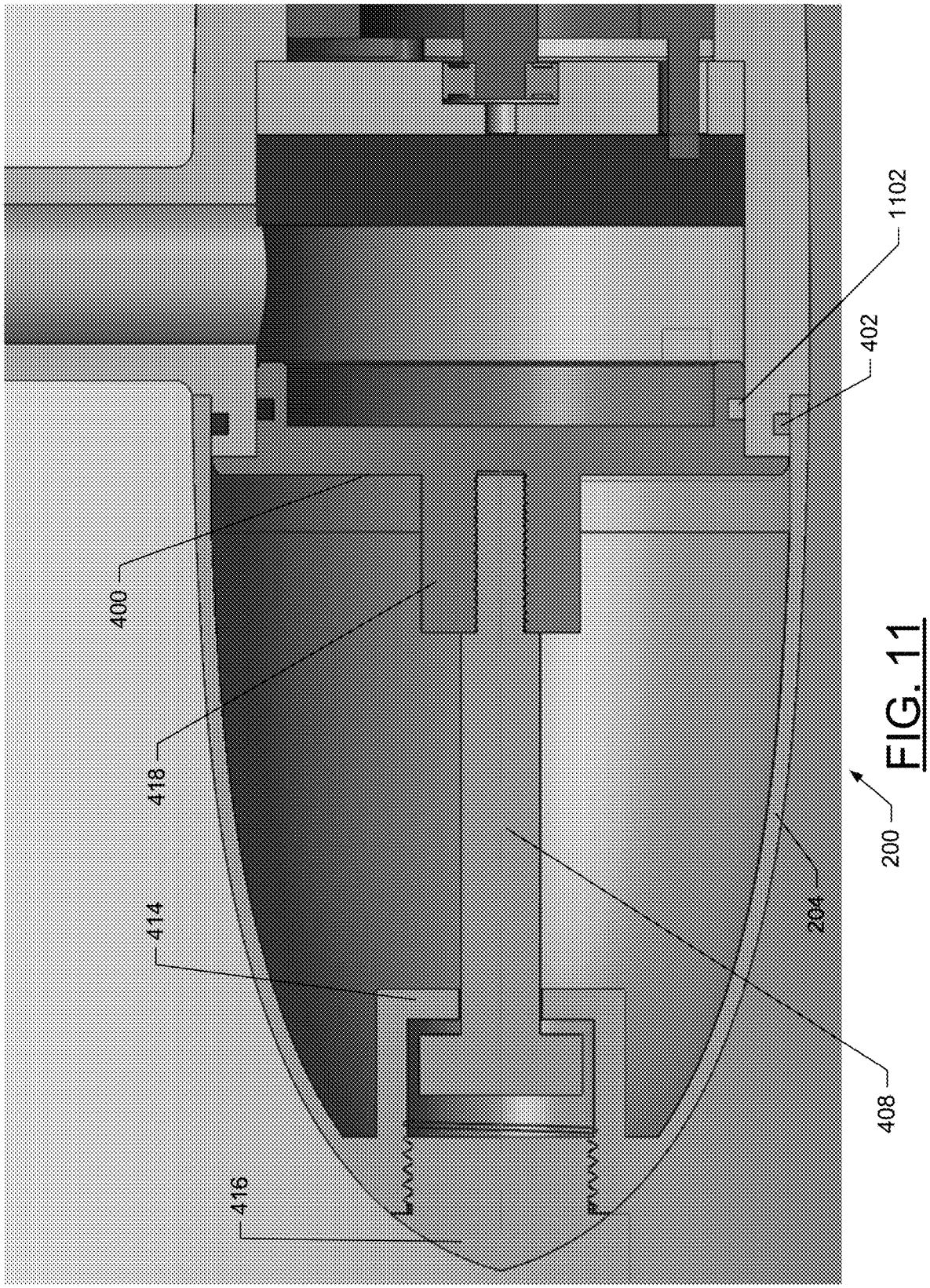
Figure 12:
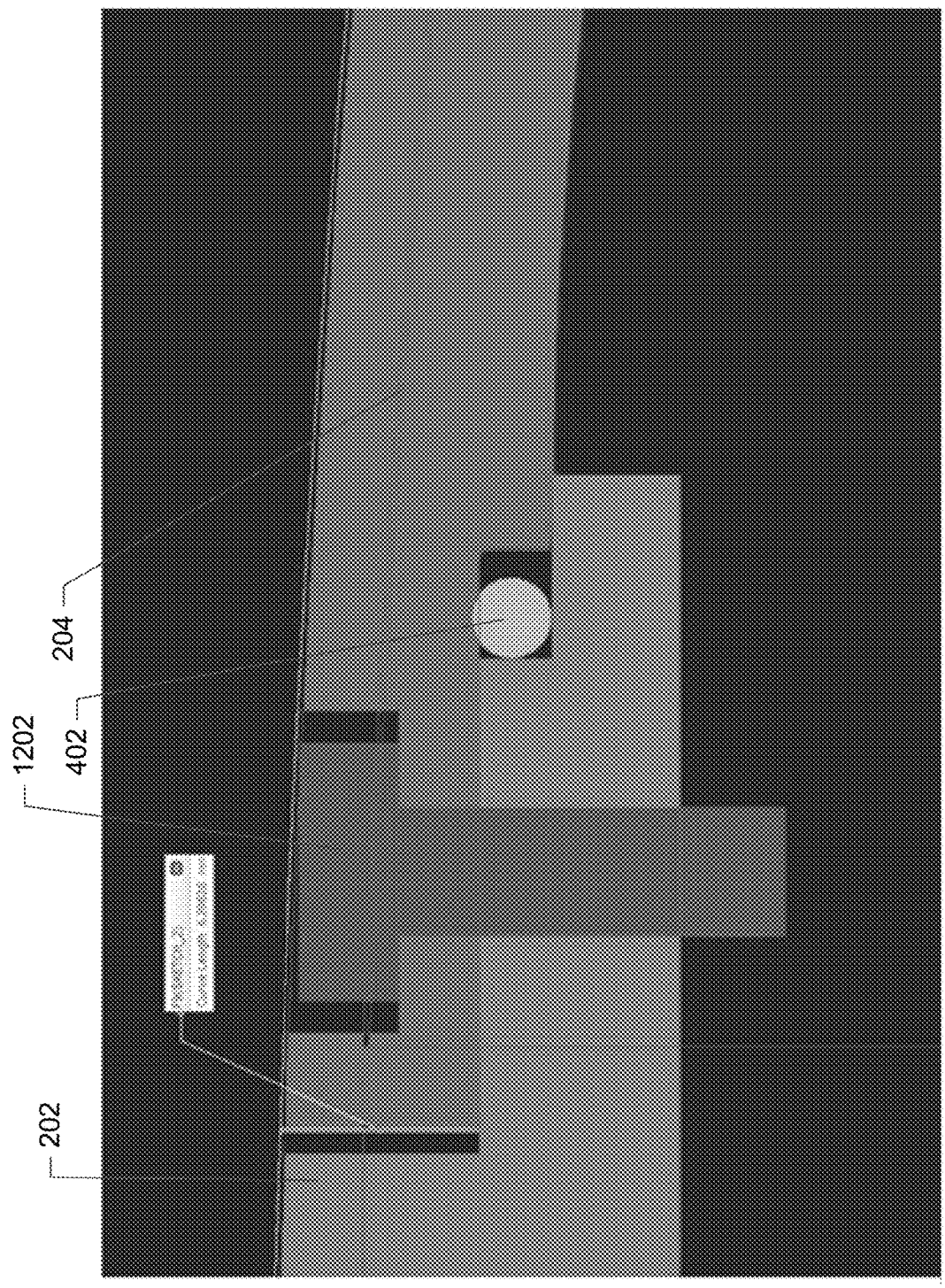
Figure 13:
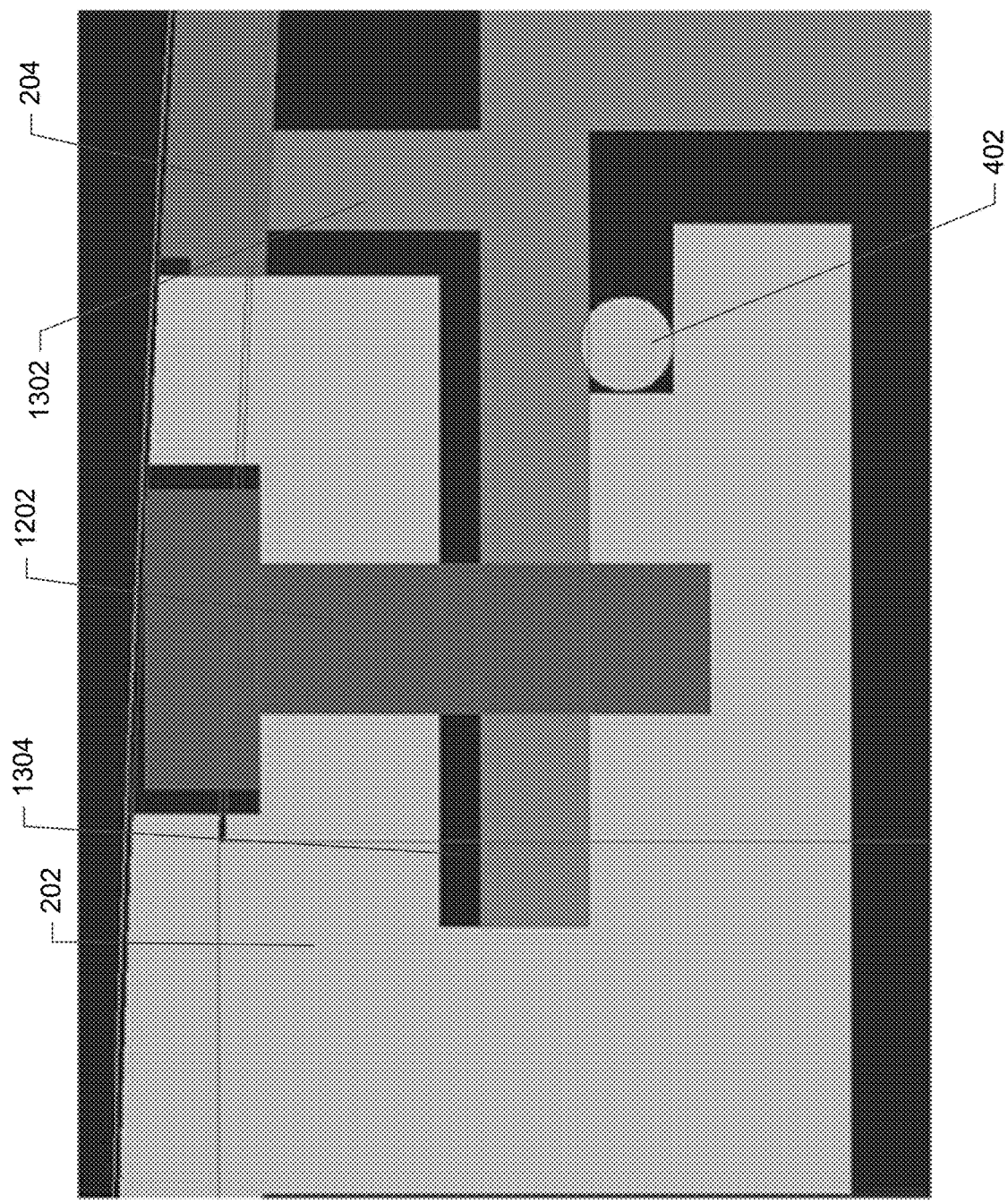
Figure 15:
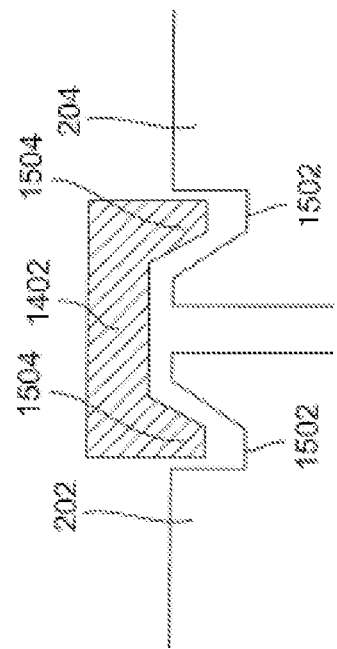
Figure 14:
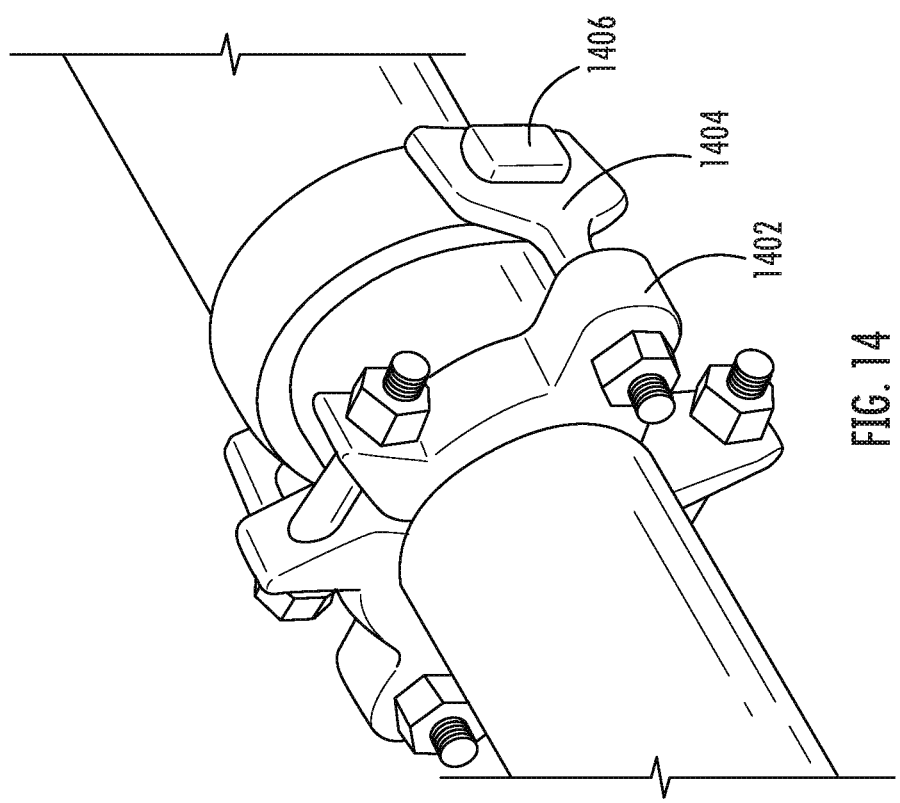
Figure 16:
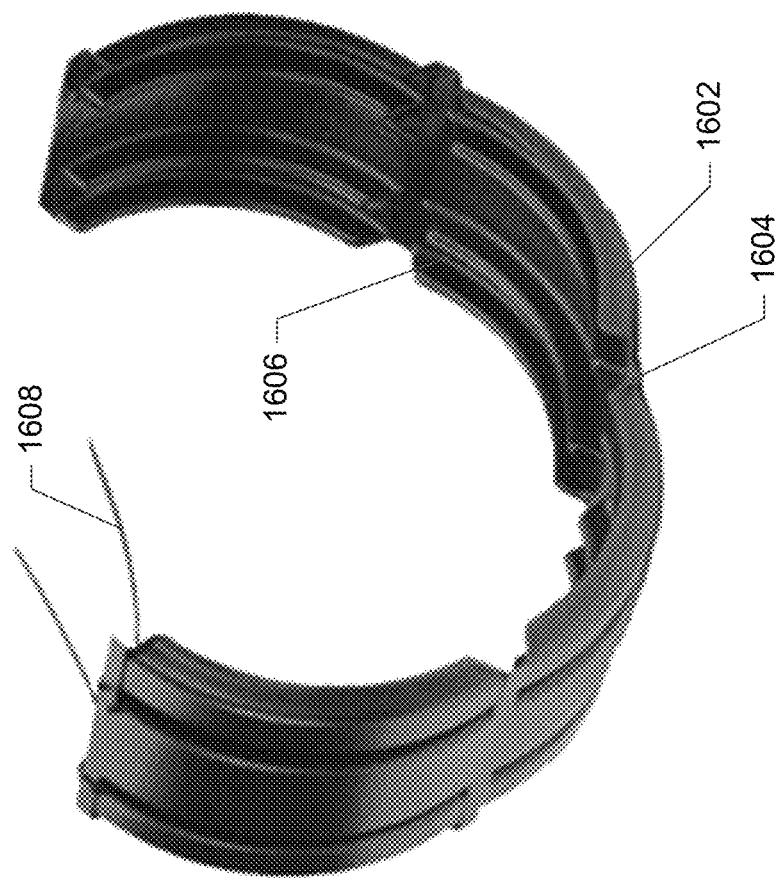
Figure 17:
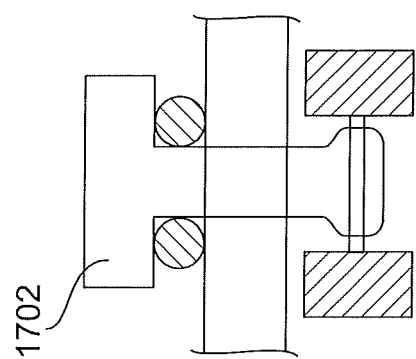
Figure 18:
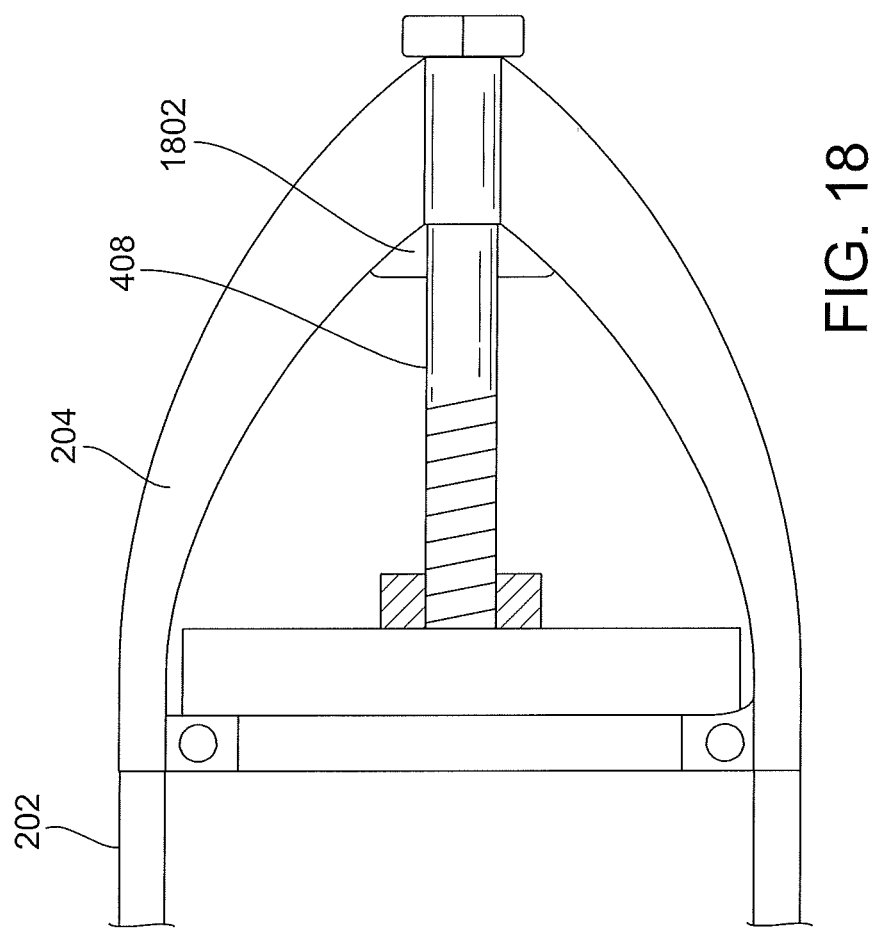
Figure 21:
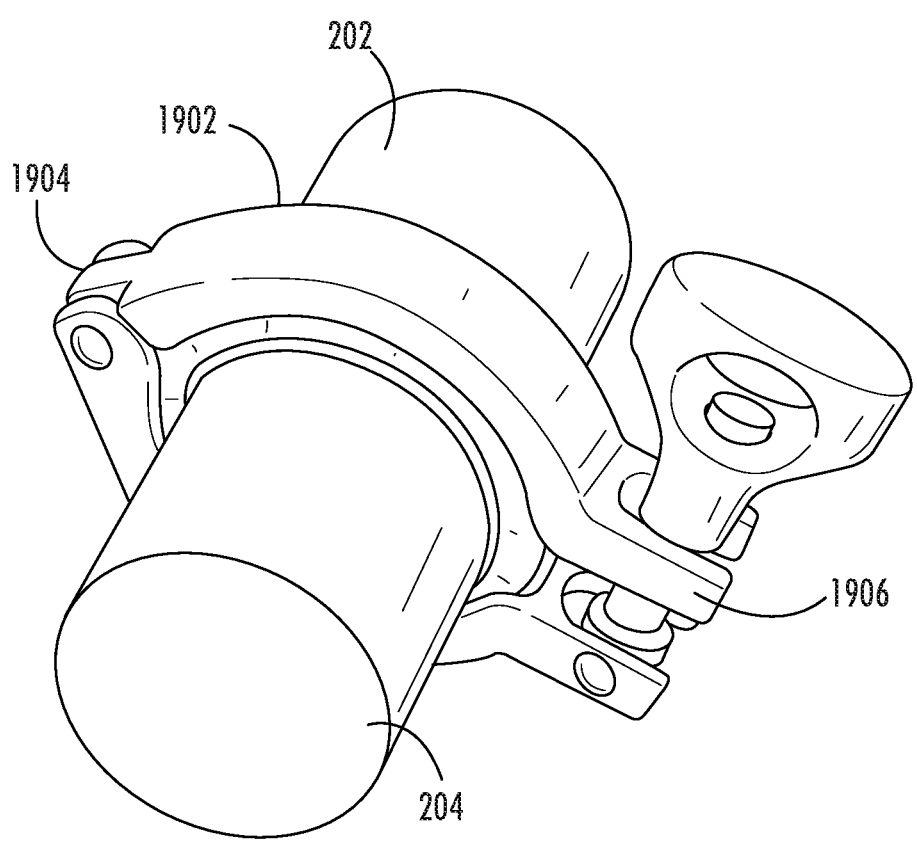
Figure 22:
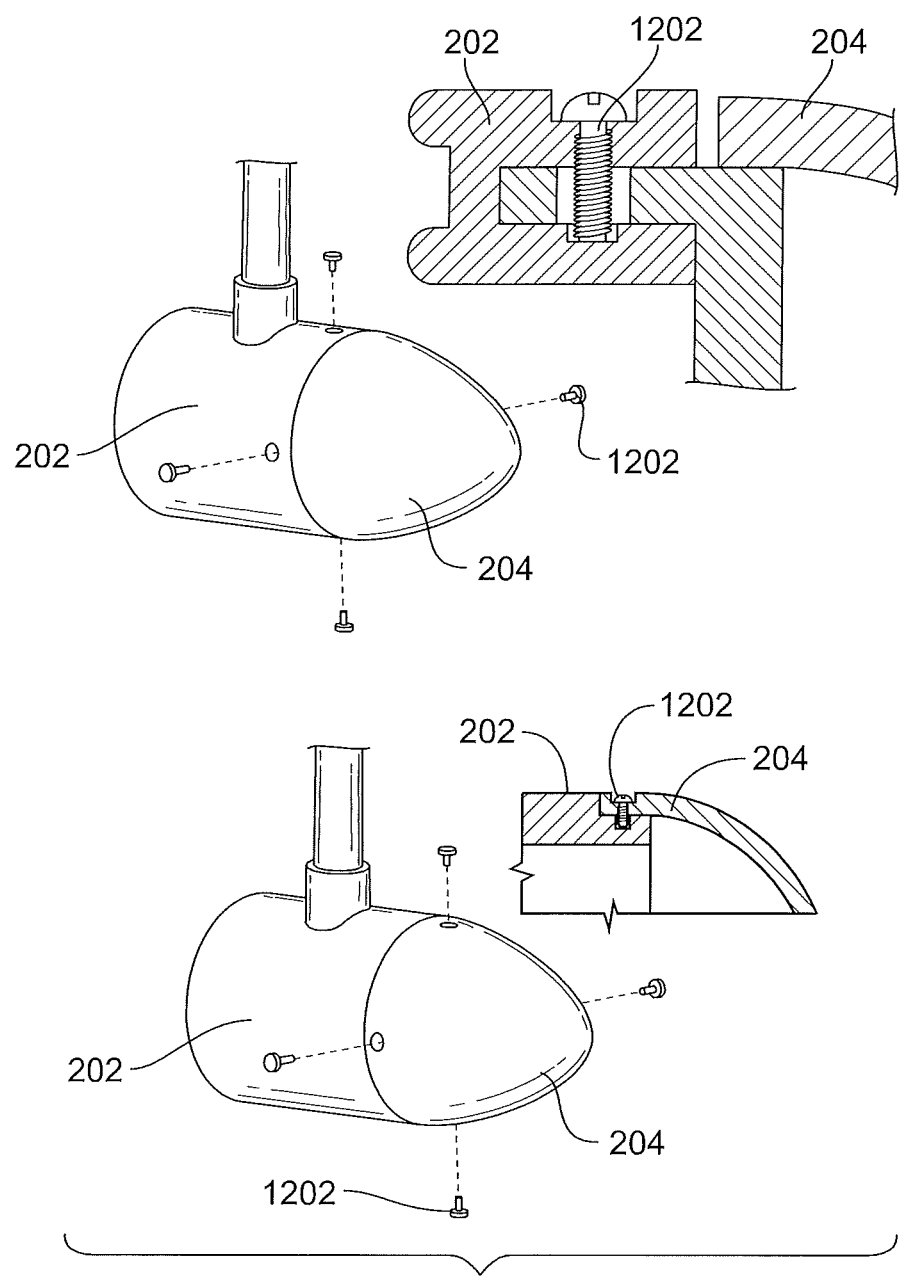
Figure 23:
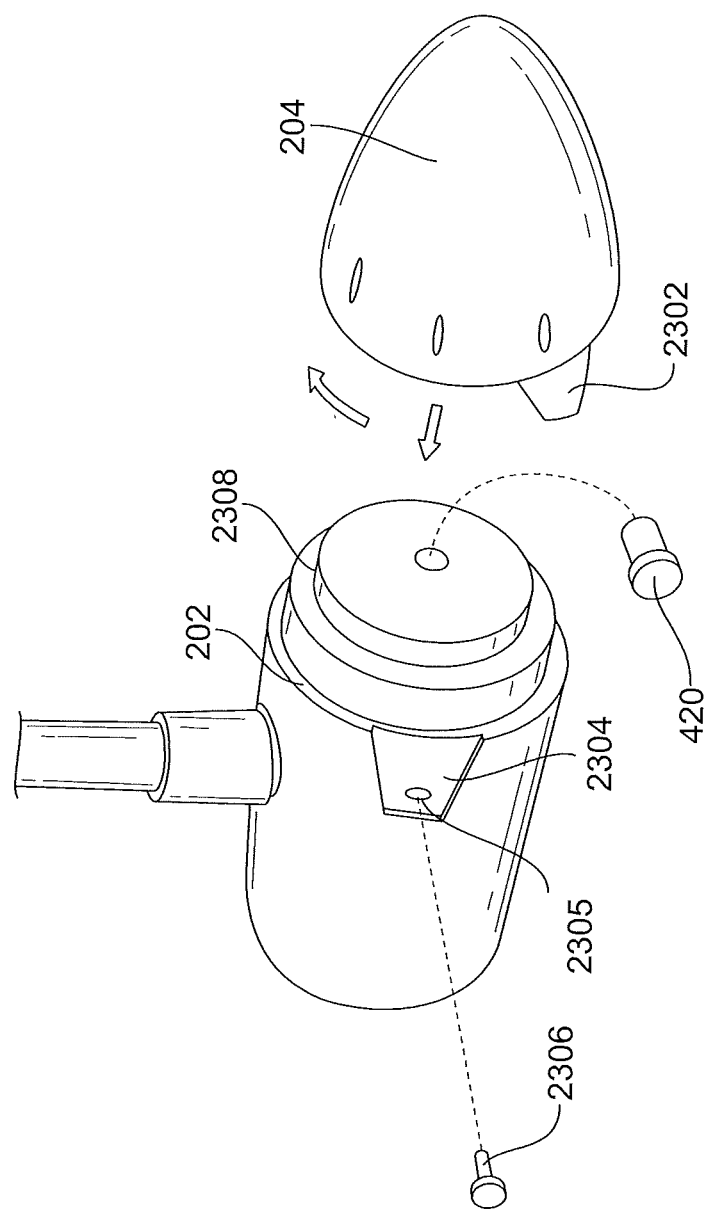
Figure 24:
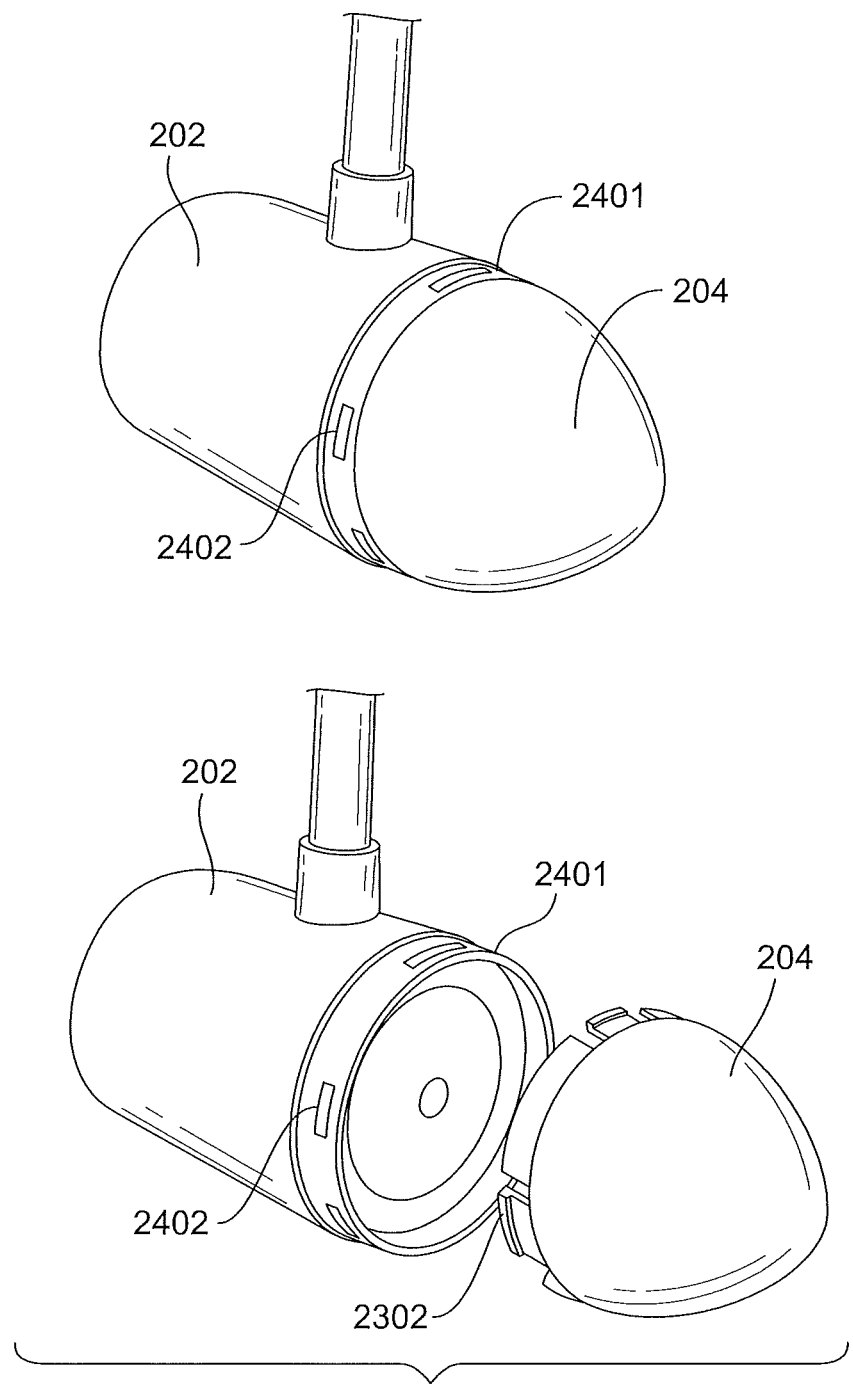
Figure 25:
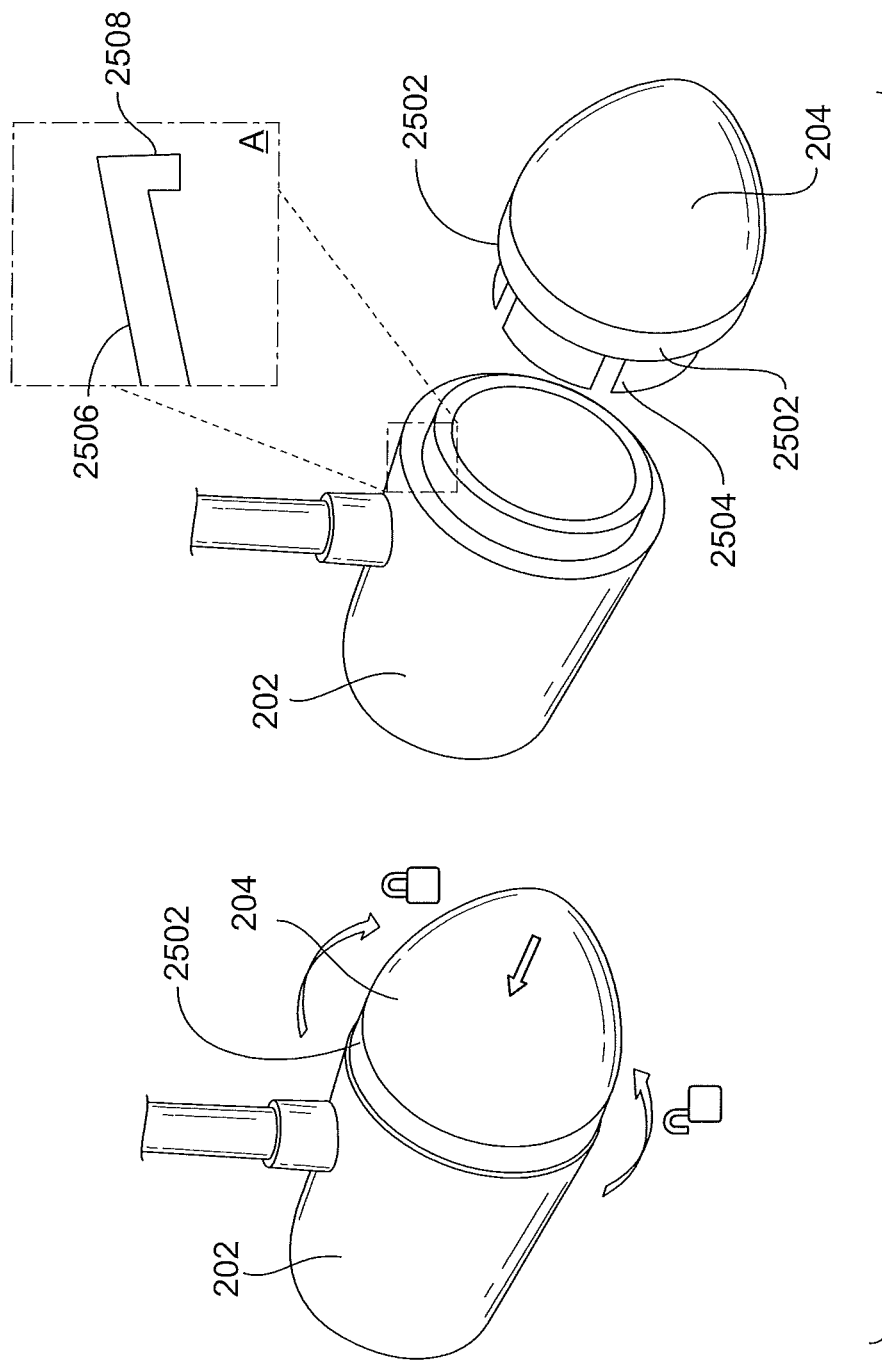
Figure 26:
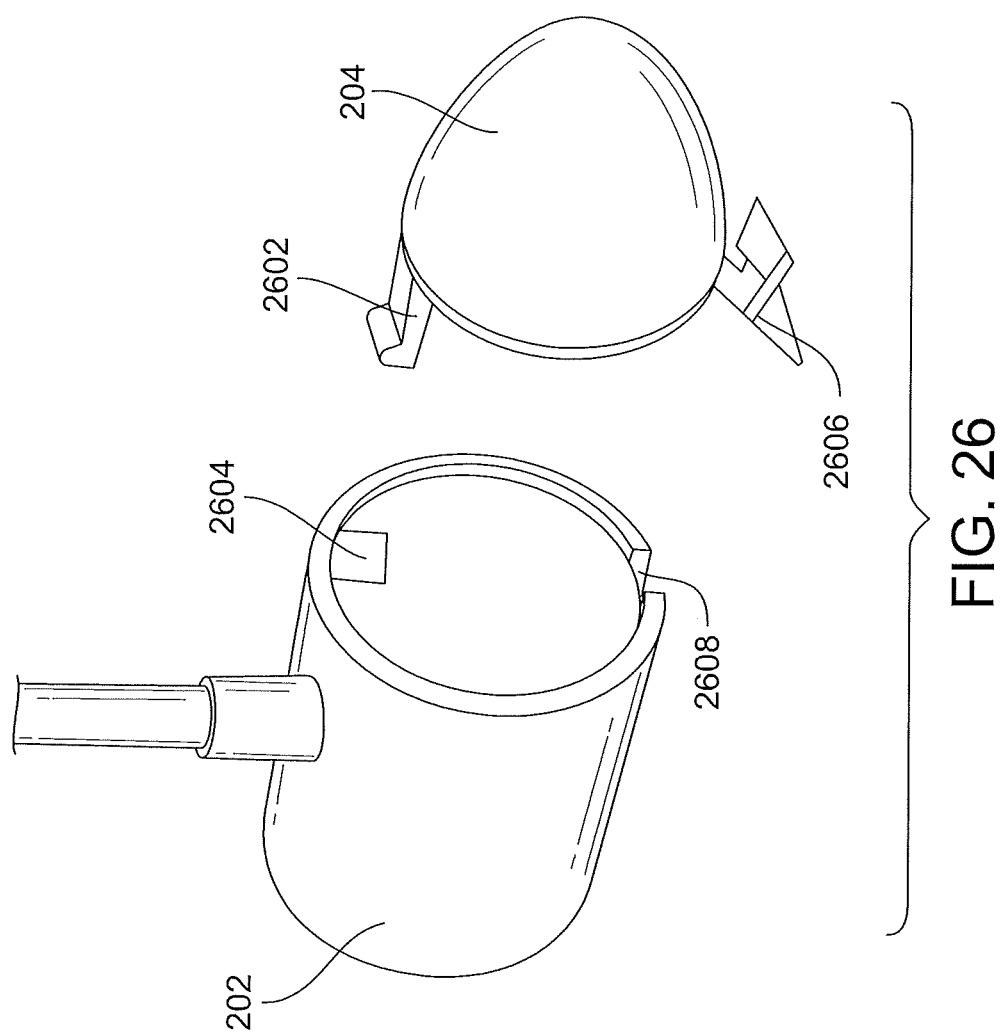
Figure 27:
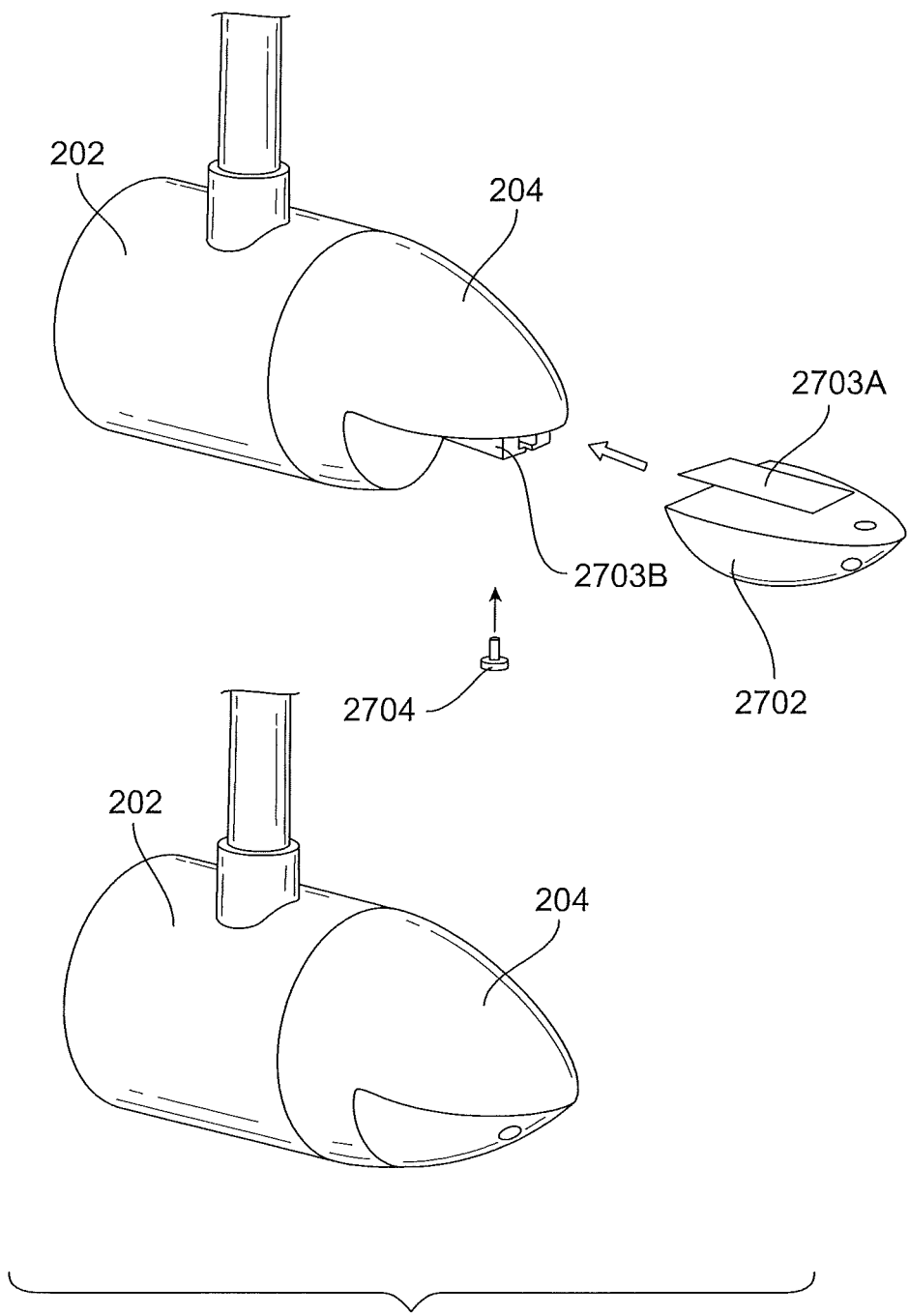
Figure 28:
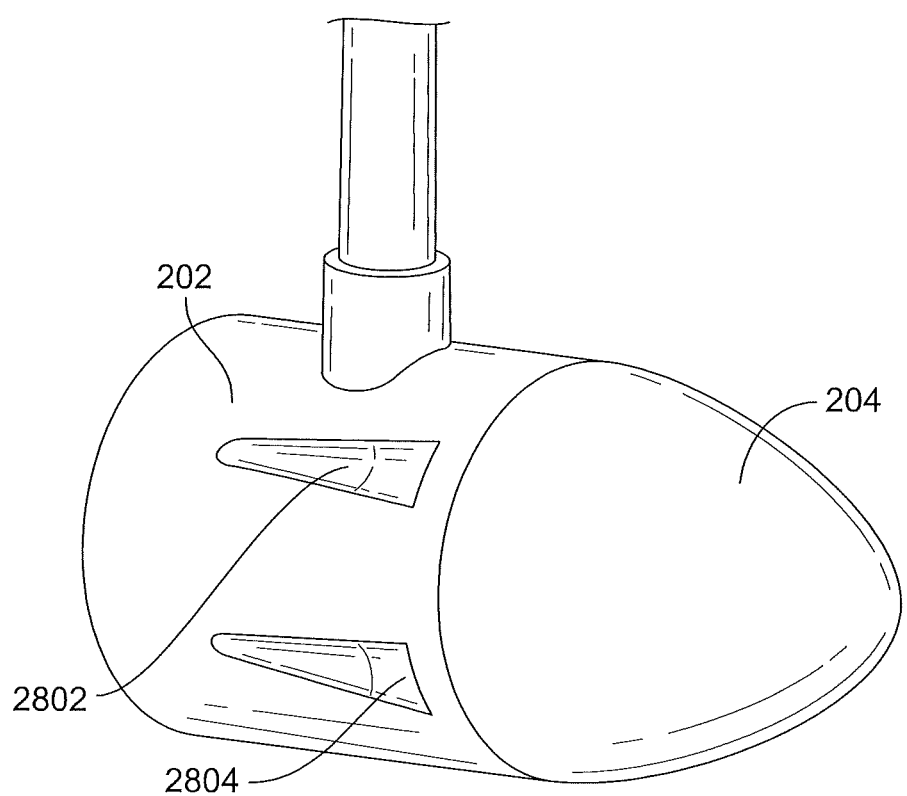
Figure 29:
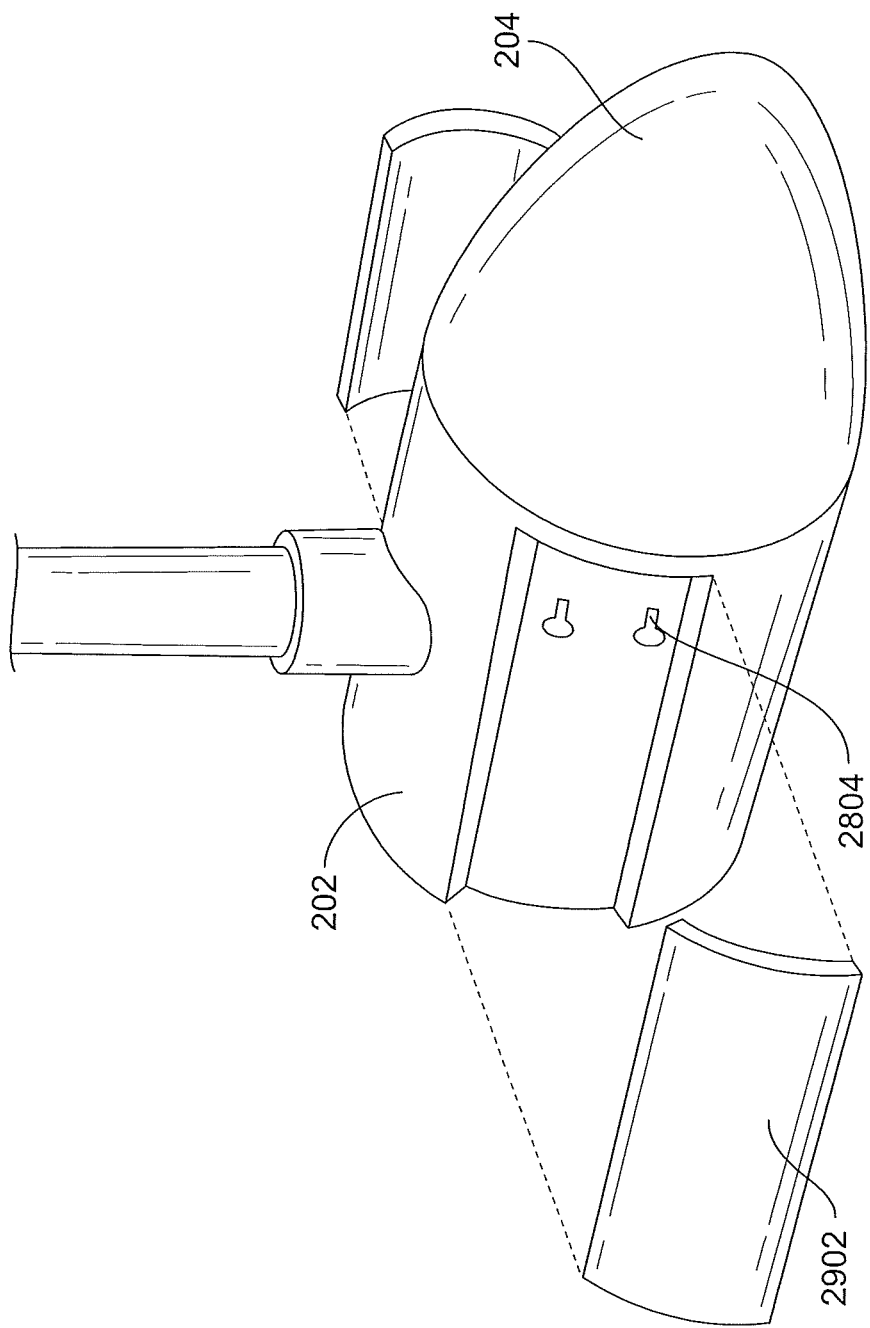
Figure 30:
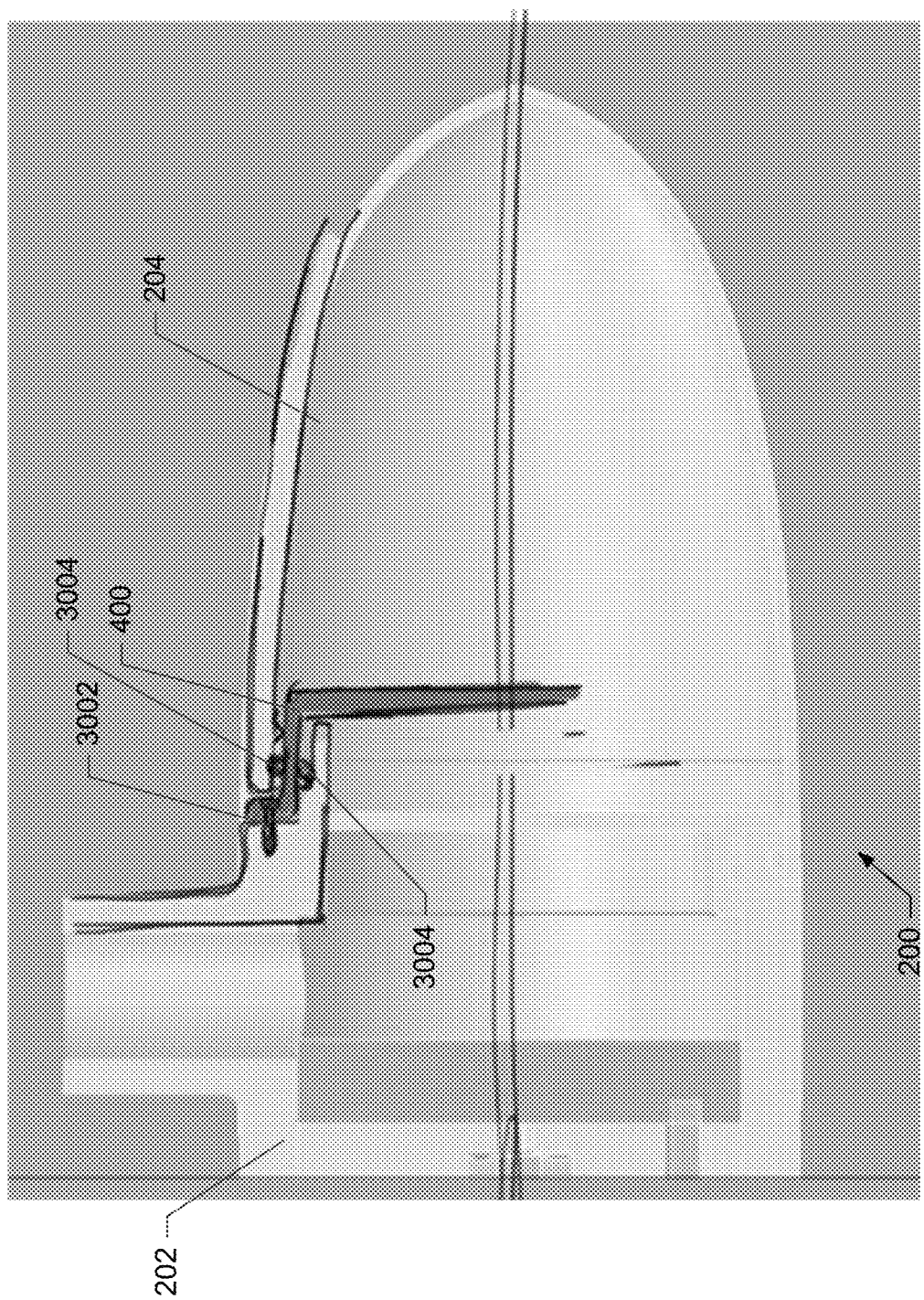
Figure 31:
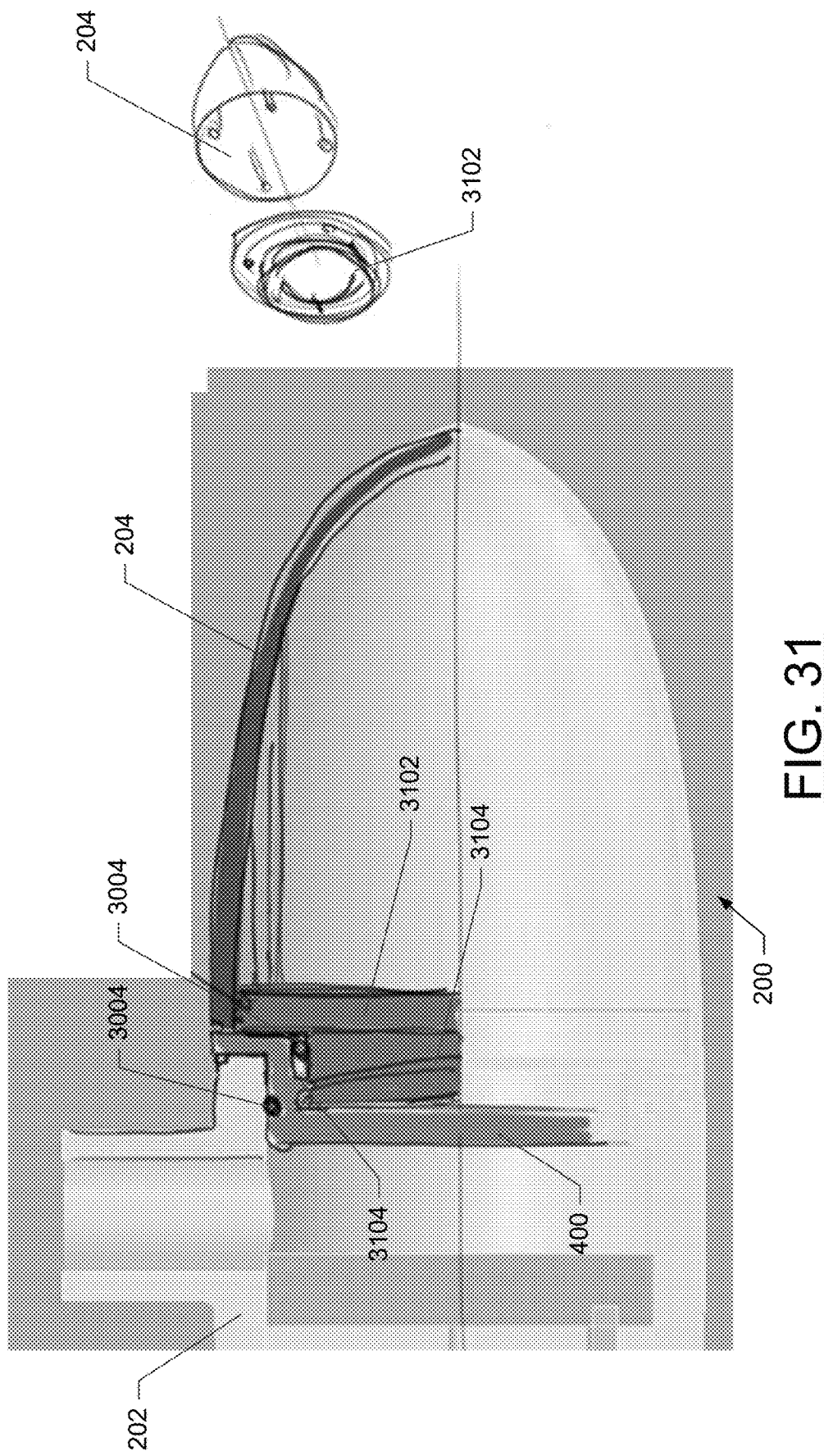
Figure 32:
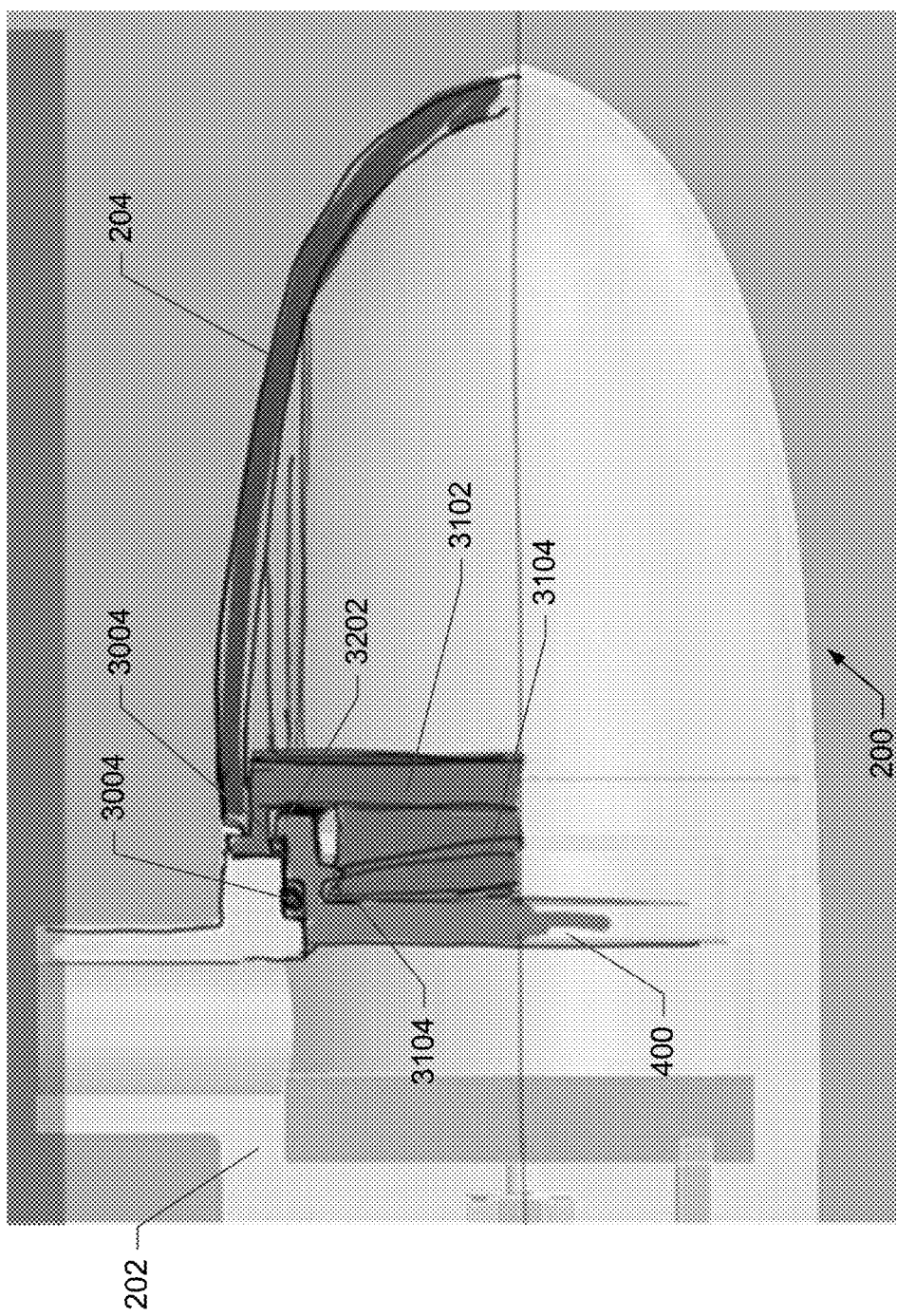
Figure 33:
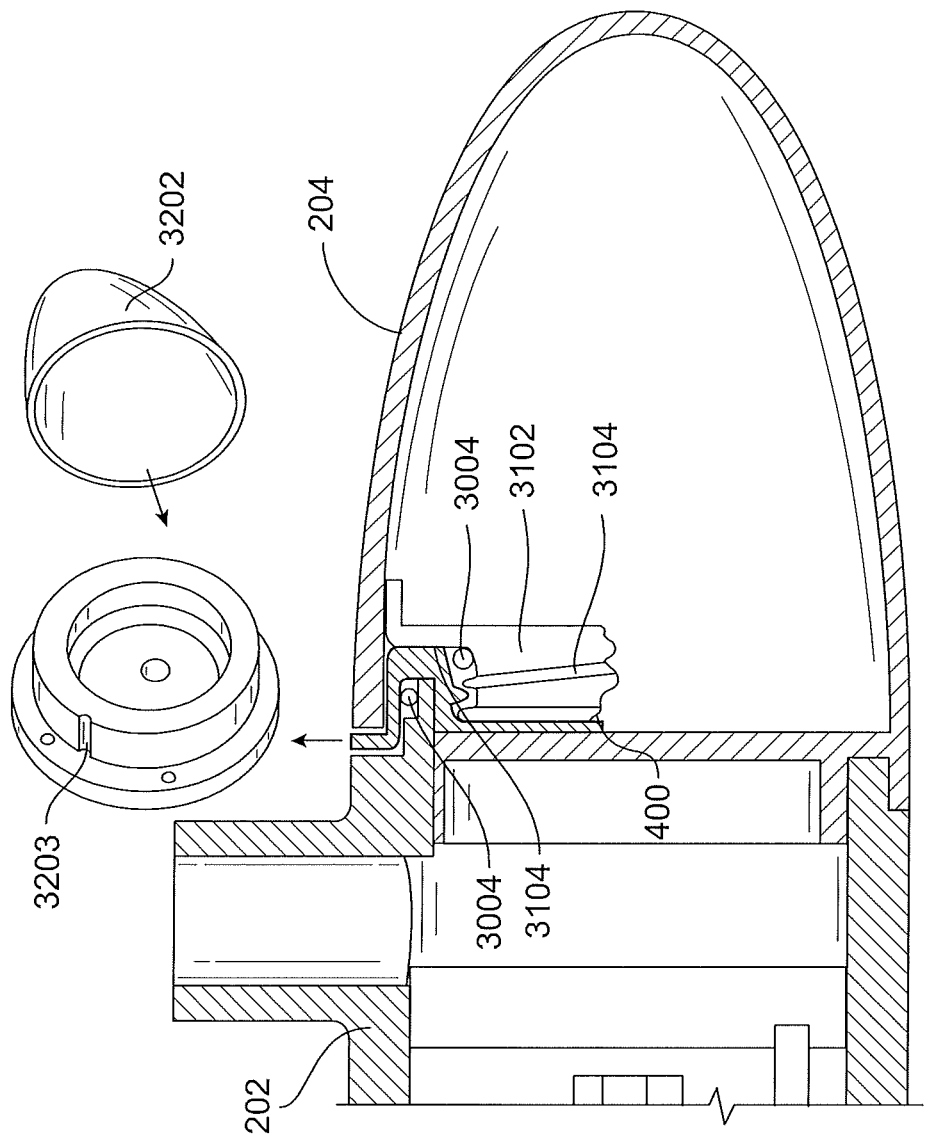
Figure 38:
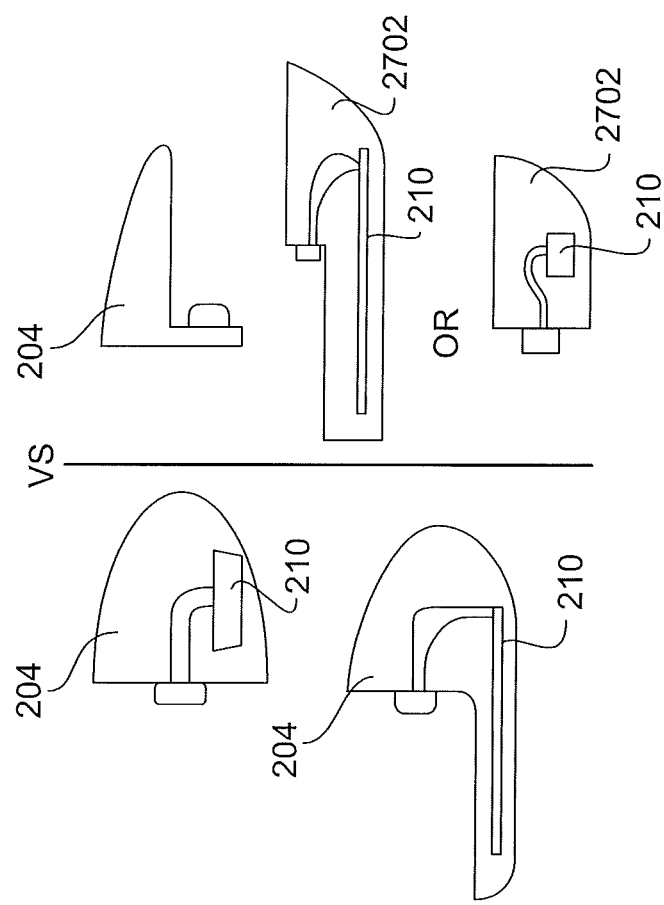
Figure 39:
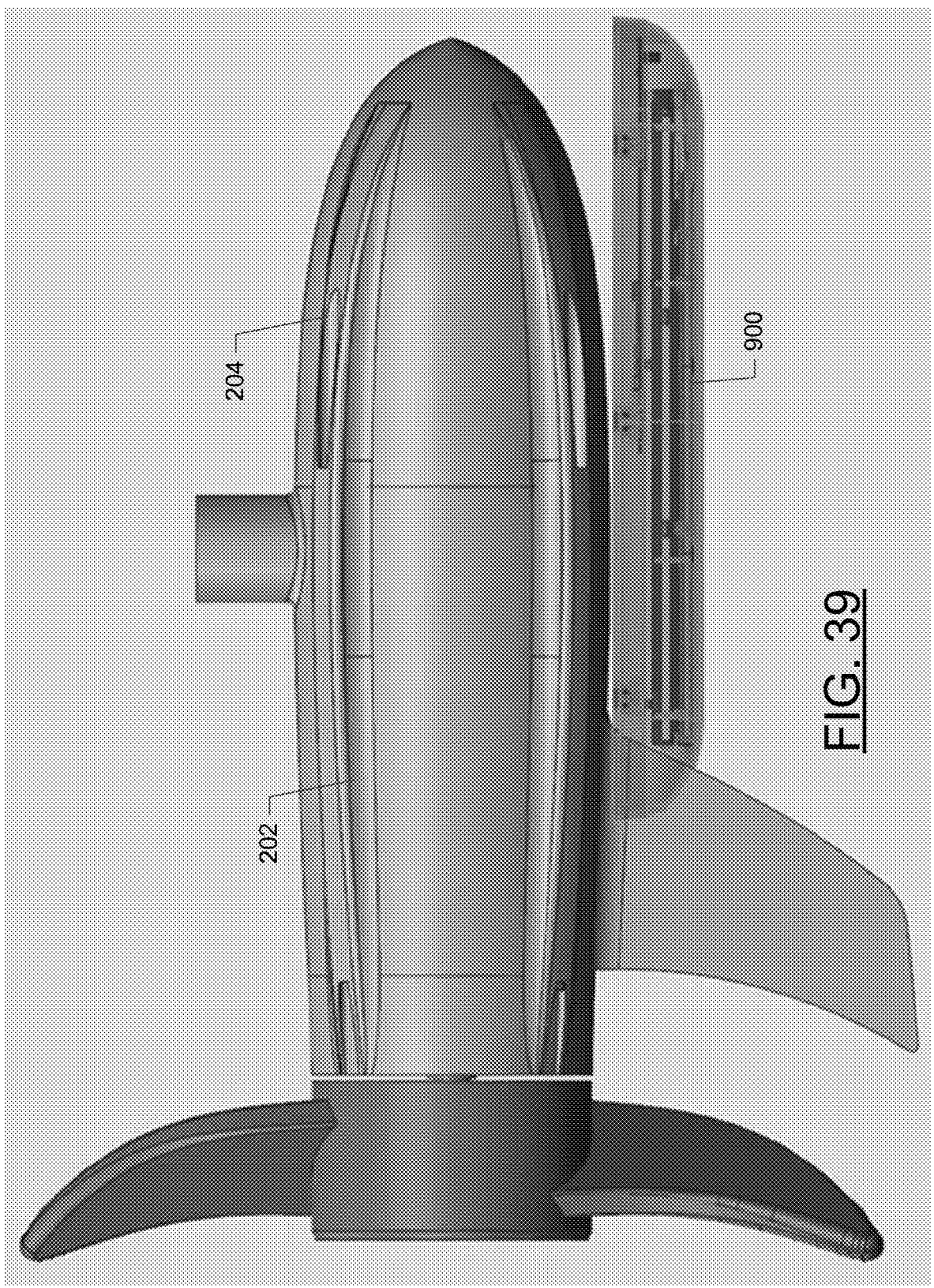
Figure 40:
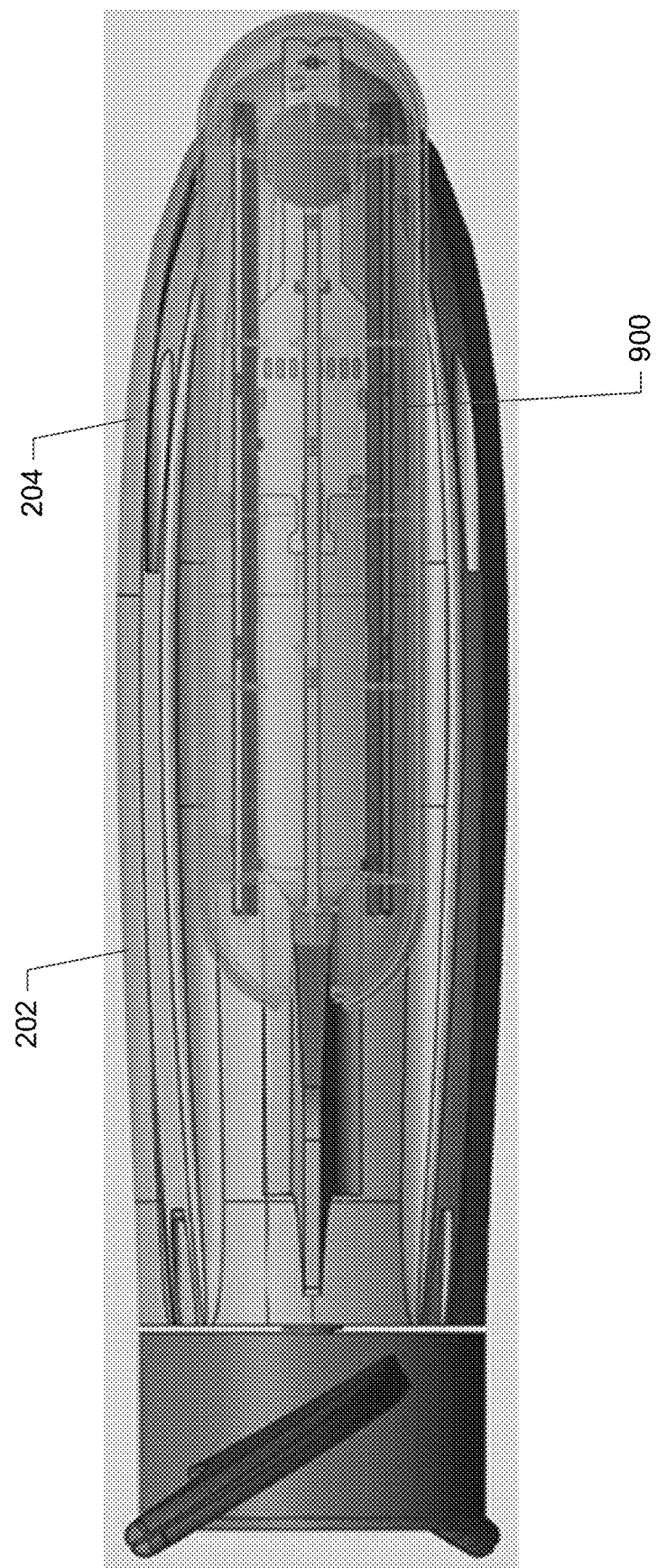
Figure 41:
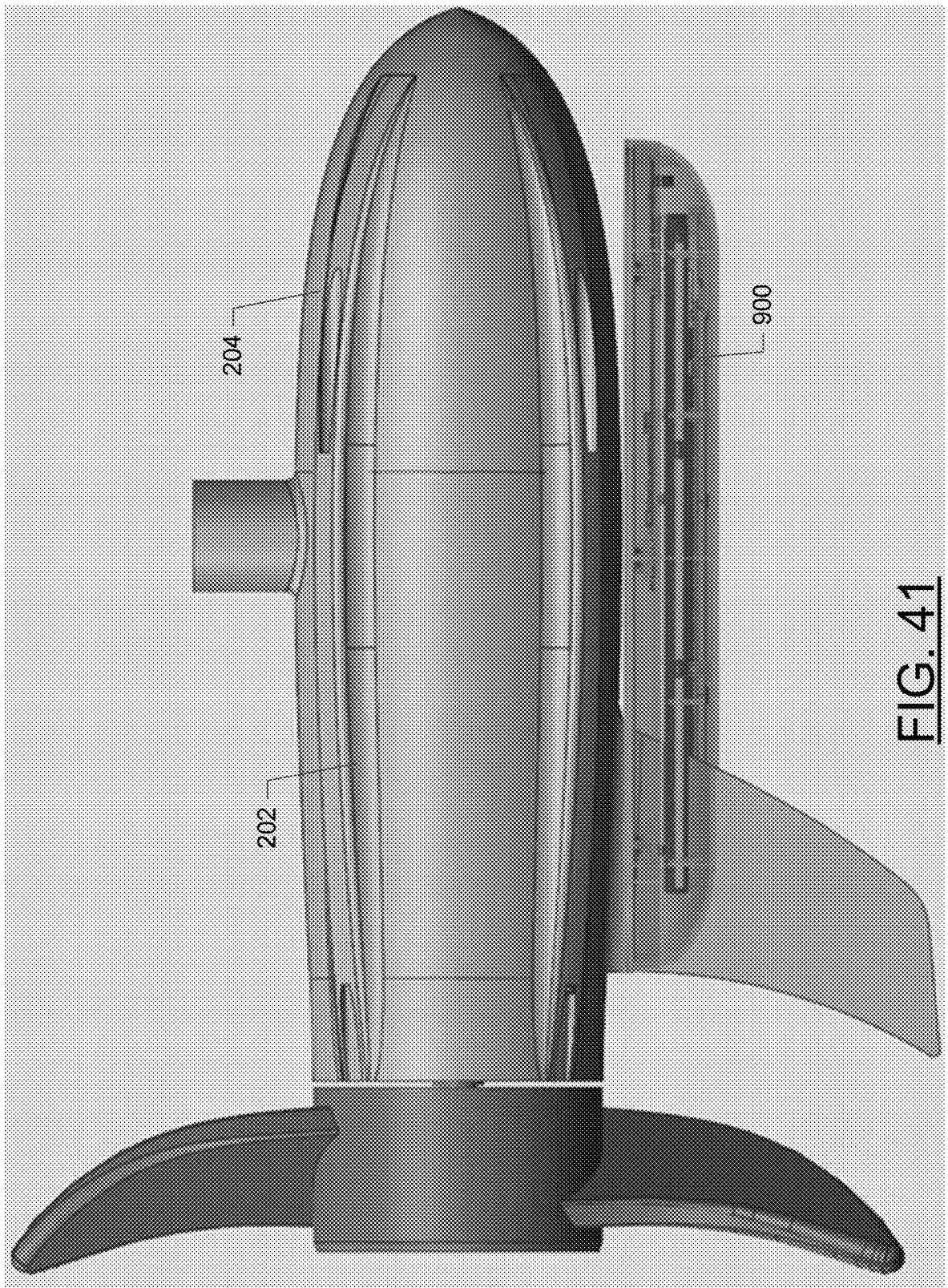
Figure 42:
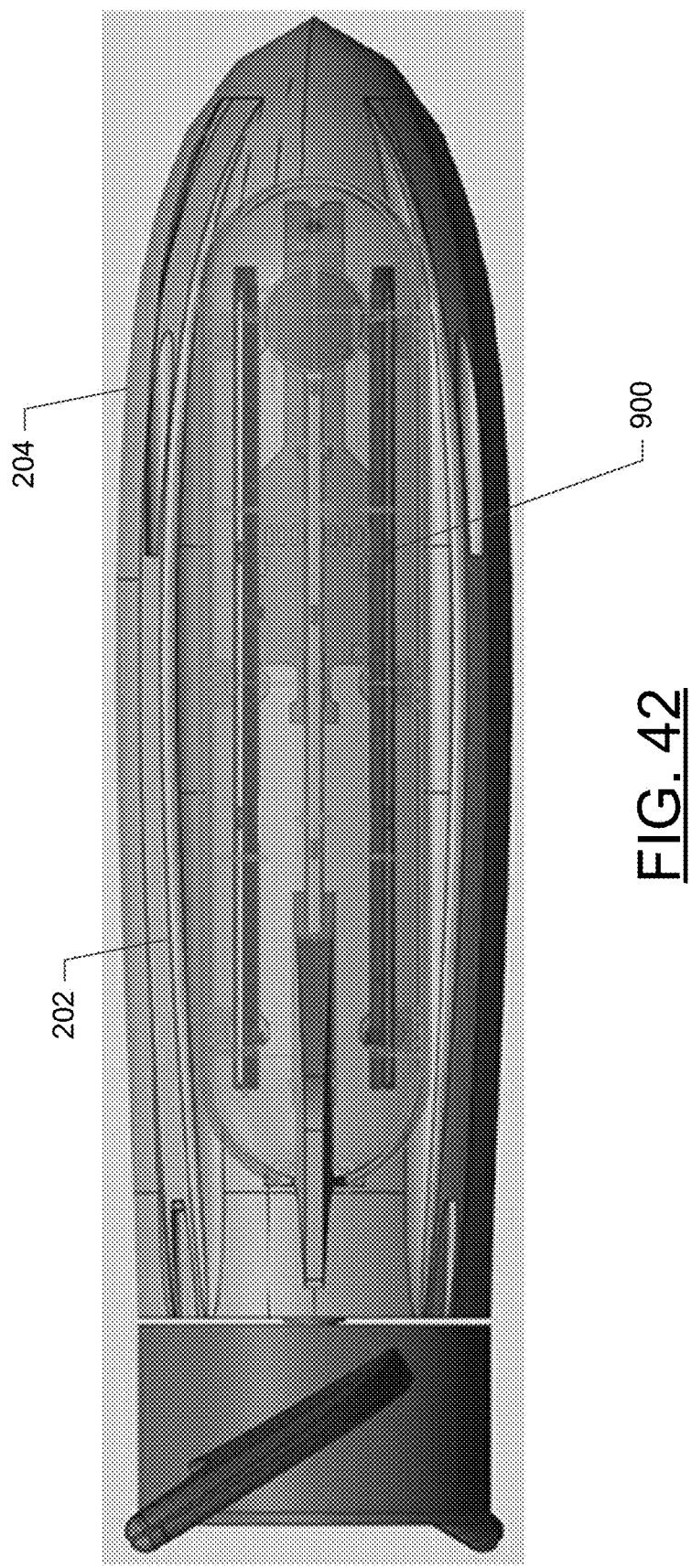
Figure 45:
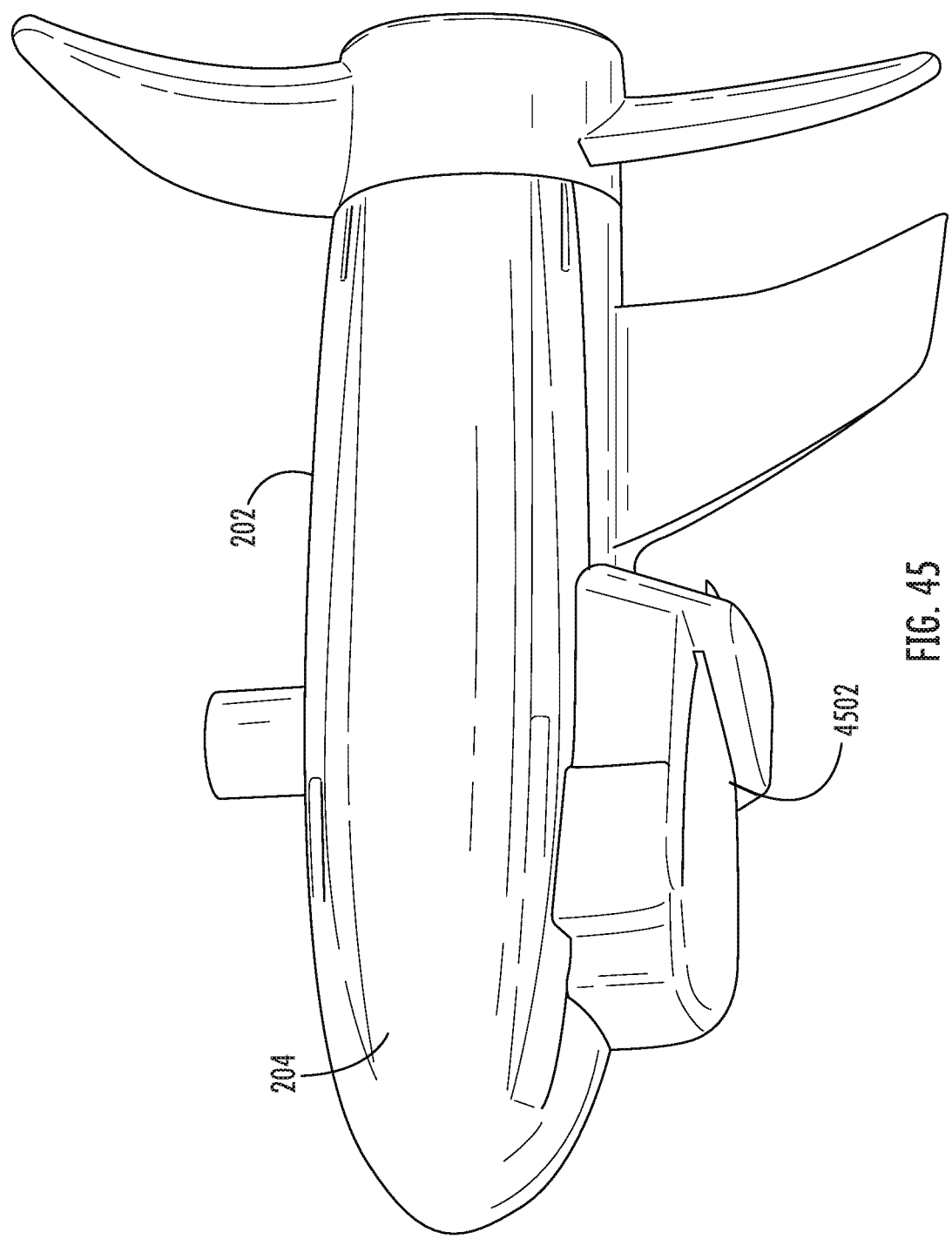
Figure 46:
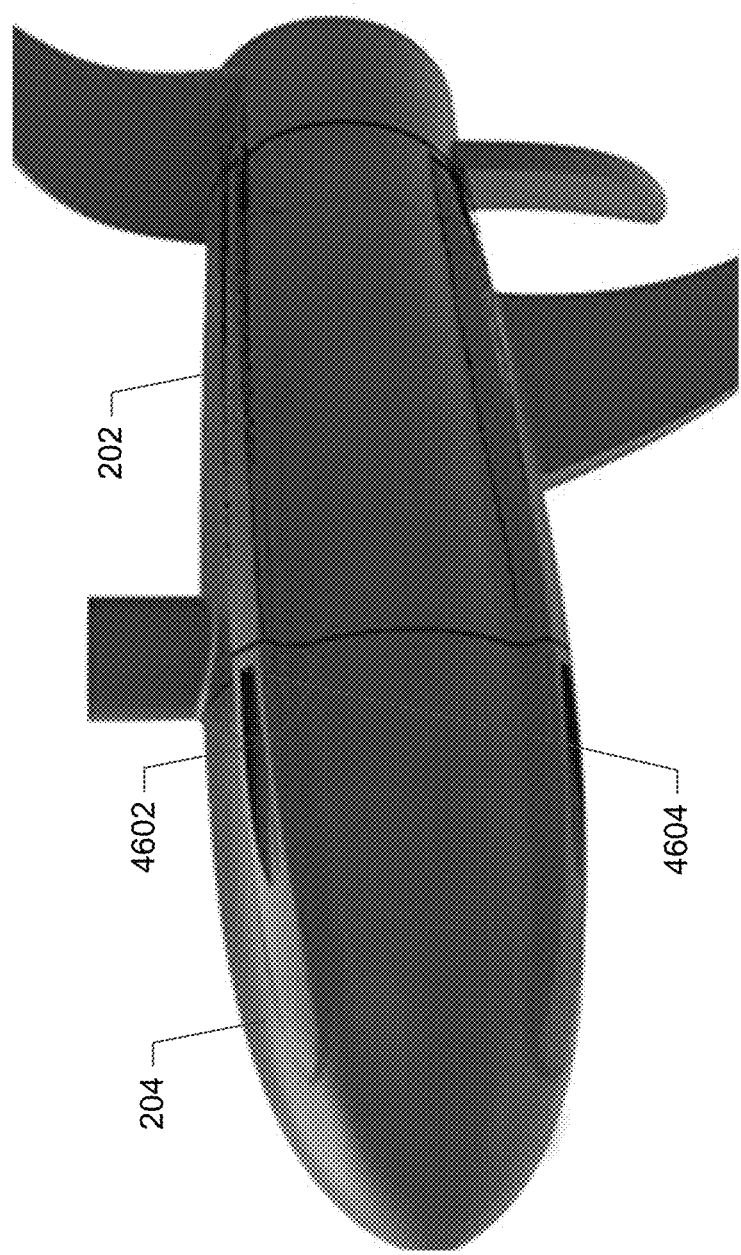
Figure 47:
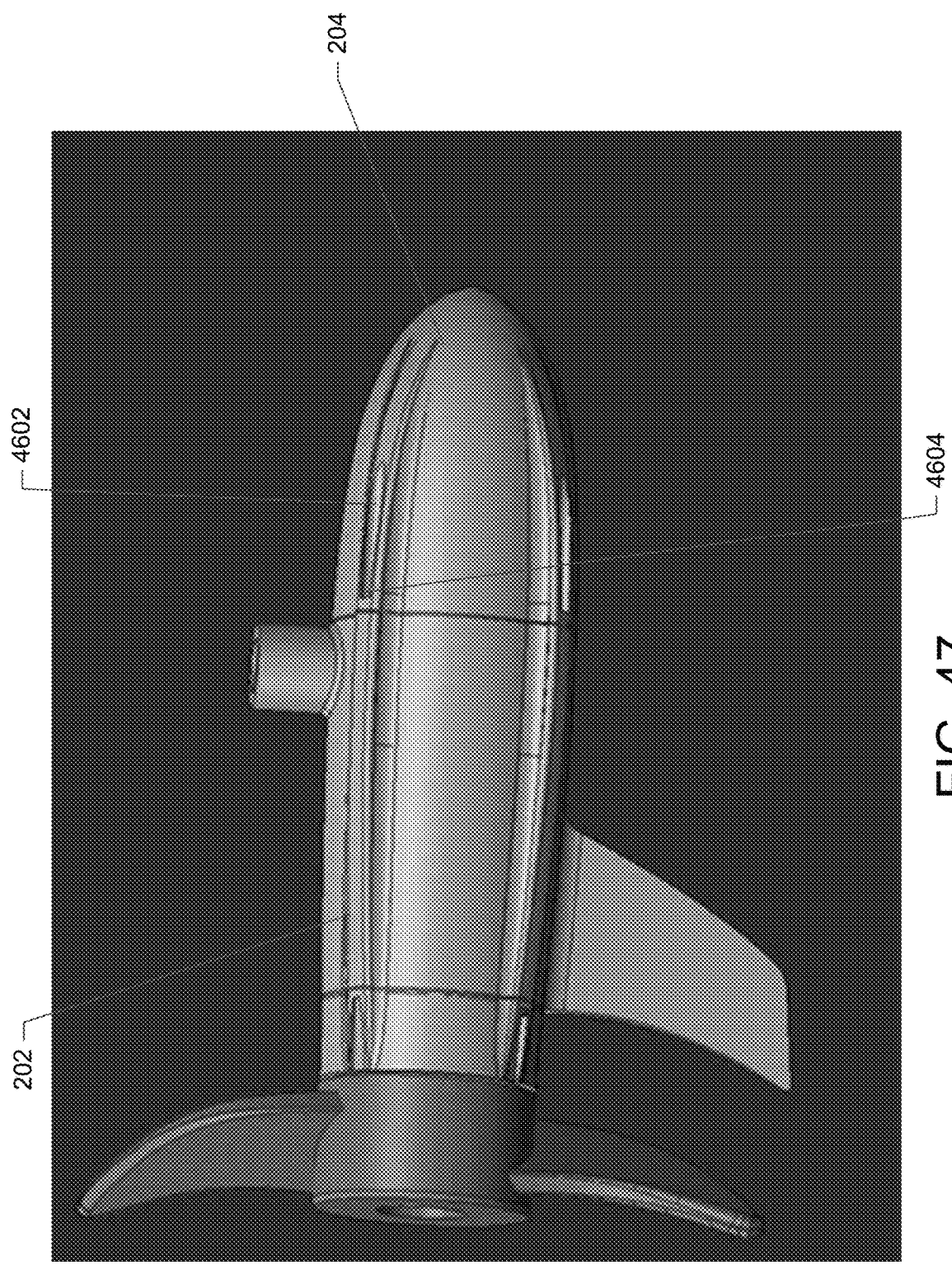
Figure 48:
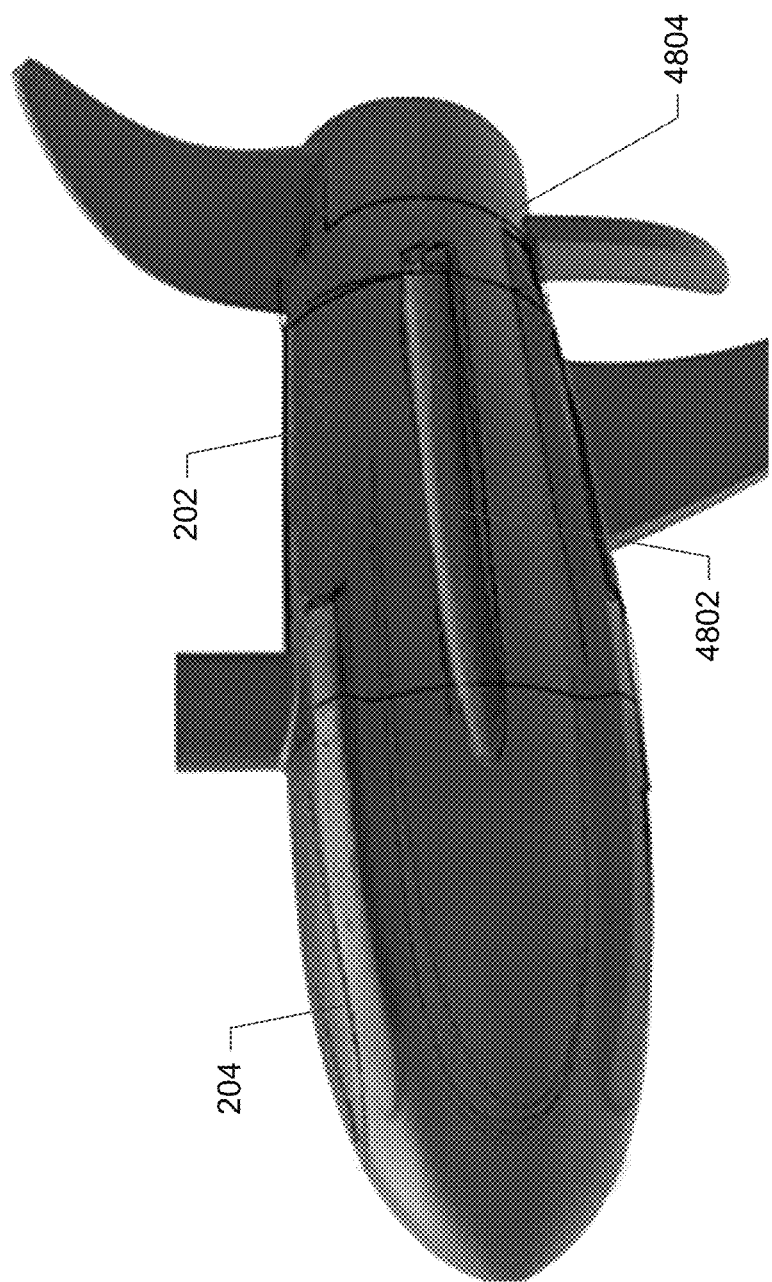

Having thus described the invention in general terms, reference will now be made to the accompanying drawings, which are not necessarily drawn to scale, and wherein:

FIG. 1A illustrates an example trolling motor assembly attached to a front of a watercraft, in accordance with some embodiments discussed herein;

FIG. 1B illustrates another example trolling motor assembly attached to a rear of a watercraft, in accordance with some embodiments discussed herein;

FIG. 2 illustrates an example trolling motor system that includes an interchangeable nosecone and trolling motor, in accordance with some embodiments discussed herein;

FIGS. 3A and 3B illustrate block diagrams of example trolling motors including connected interchangeable nosecones, in accordance with some embodiments discussed herein;

FIG. 4 illustrates a cross-sectional view of an example nosecone, in accordance with some embodiments discussed herein;

FIG. 5 illustrates an exploded view of an example nosecone, in accordance with some embodiments discussed herein;

FIG. 6 illustrates a cross-sectional view of an example nosecone including a downscan sonar transducer array, in accordance with some embodiments discussed herein;

FIG. 7 illustrates a cross-sectional exploded view of an example nosecone and downscan sonar transducer array, in accordance with some embodiments discussed herein;

FIG. 8 illustrates a cross-sectional exploded view of an example nosecone including a phased array, in accordance with some embodiments discussed herein;

FIG. 9 illustrates an example nosecone with a multifunction sonar transducer array, in accordance with some embodiments discussed herein;

FIG. 10 shows a block diagram illustrating an example trolling motor system, in accordance with some embodiments discussed herein;

FIG. 11 illustrates a cross-sectional view of an example nosecone attachment to a trolling motor by a retention bolt, in accordance with some example embodiments discussed herein;

FIGS. 12 and 13 illustrate a connection of the nosecone to the housing utilizing one or more retention screws, in accordance with some example embodiments discussed herein;

FIGS. 14 and 15 illustrate an example clamp connection between the housing and the nosecone, in accordance with some example embodiments discussed herein;

FIG. 16 illustrates an example hinged connector, in accordance with some example embodiments discussed herein;

FIG. 17 illustrates an example T bar fastener, in accordance with some example embodiments discussed herein;

FIG. 18 illustrates an example connection of the nosecone to the housing in which the retention bolt is captured by the nosecone, in accordance with some example embodiments discussed herein;

FIGS. 19-21 illustrate an example flange clamp connection of the nosecone and housing, in accordance with some example embodiments discussed herein;

FIG. 22 illustrates example screw positions on the trolling motor for the retention screw, in accordance with some example embodiments discussed herein;

FIGS. 23 and 24 illustrate example connections between the nosecone and the housing including clips, in accordance with some example embodiments discussed herein;

FIG. 25 illustrates an example connection between the housing and the nosecone including a rotating lock, in accordance with some example embodiments discussed herein;

FIG. 26 illustrates a connection between the housing and the nosecone including a locking latch, in accordance with some example embodiments discussed herein;

FIG. 27 illustrates an example nosecone including an interchangeable component module, in accordance with some example embodiments discussed herein;

FIGS. 28 and 29 illustrate example reverse mountings for the nosecone and housing, in accordance with some example embodiments discussed herein;

FIG. 30 illustrates an example bulkhead configuration, in accordance with some example embodiments discussed herein;

FIGS. 31-33 illustrate example trolling motors that include a first bulkhead and a secondary bulkhead, in accordance with some example embodiments discussed herein;

FIGS. 34-37 illustrate example trolling motors with transparent housings and/or nosecones to aid in understanding of example physical layouts of example components of the nosecone, in accordance with some example embodiments discussed herein;

FIG. 38 illustrates example profiles of a nosecone with one or more transducer elements positioned in the nosecone versus one or more transducer elements positioned in an interchangeable component module, in accordance with some example embodiments discussed herein;

FIGS. 39-44 illustrate example placements of one or more transducer elements in relation to the trolling motor, in accordance with some example embodiments discussed herein;

FIG. 45 illustrates an example transducer housing, in accordance with some example embodiments discussed herein;

FIGS. 46 and 47 depict a nosecone connected from the front of the nosecone, in accordance with some example embodiments discussed herein; and FIG. 48 depicts a housing including one or more retention shafts disposed in the sidewall of the housing, in accordance with some example embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Embodiments of the present invention provide trolling motor systems that include interchangeable nosecones. Such example embodiments enable a user the optionality to pick and choose which features to utilize with their trolling motor, while still providing the protection and small footprint of keeping the features within the trolling motor housing. Further, the user may upgrade or update the features without the need to purchase an entirely new trolling motor.

FIG. 1A illustrates an example watercraft 10 on a body of water 15. The watercraft 10 has a trolling motor assembly 20 attached to its front, with a trolling motor housing 50 submerged in the body of water. The trolling motor can be used as a propulsion system to cause the watercraft to travel along the surface of the water. While the depicted embodiment shows the trolling motor assembly 20 attached to the front of the watercraft 10 and as a secondary propulsion system, example embodiments described herein contemplate that the trolling motor assembly 20 may be attached in any position on the watercraft 10 and/or may be the primary propulsion system for the watercraft 10.

FIG. 1B illustrates a view of using a trolling motor assembly 20 in accordance with various implementations described herein. In some implementations, the trolling motor assembly 20 includes a device having a motor with a propeller 22 coupled thereto and a shaft 24 coupling the motor to a watercraft 10 (e.g., boat). As shown in FIG. 1B, the trolling motor assembly 20 may be coupled or mounted to a stern of the watercraft 10. In some instances, the trolling motor assembly 20 may be coupled or mounted to another part of the watercraft 10, such as, e.g., a bow of the watercraft 10 or some other useful part of the watercraft 10. During operation, the motor is configured to drive the propeller 22 to provide thrust for the watercraft 10 in water, such as along a surface 15 of a body of water 16. The shaft 24 may be configured to rotate relative to the watercraft 10 to allow steering of the watercraft 10 via user interaction with a handle 18 in the body of water 16 during operation of the motor. In some examples, the trolling motor assembly 20 may include use of a manually operated steering mechanism; however, in other examples, the trolling motor may use a motorized mechanism for steering, which may include use of a cable steer type trolling motor or an electric steer type trolling motor.

The trolling motor assembly 20 includes a housing 50 that encapsulates the motor. The housing 50 may be configured to enclose the motor within a waterproof capsule that is impervious to water.

Attached to the housing 50 may be a nosecone 25. The housing 50 and the nosecone 25 may be formed to connect to form a hydrodynamic profile or hydrodynamic contour, such as a torpedo shape. Depending on the configuration and/or features, the nosecone 25 may include a transducer or transducer array (or other features). For example, in the illustrated embodiment, the nosecone 25 includes a transducer array that is configured to project one or more sonar beams 29 into the underwater environment. The sonar pulses of the sonar beams may reflect off objects within the water 16 (e.g., the bottom surface 19) and return to the transducer array to provide sonar returns that can be converted into sonar images for display (e.g., on a marine electronic device 30 of the watercraft 10) to a user.

FIG. 2 illustrates the example concept of an interchangeable nosecone for a trolling motor system. In the illustrated embodiment, the trolling motor system 20 includes a trolling motor housing 50 that encloses components. Attached to the housing is a propeller 22 used along with the motor (not shown) to cause propulsion of the watercraft. A shaft 24 leads upwardly and can be utilized to enclose cables and other components leading to a remote marine electronics device, such as on the watercraft. The housing 50 also includes a front surface 37 that is configured to receive and attach to a nosecone 25.

Some embodiments of the present provide for connection of interchangeable nosecones for a trolling motor. In some embodiments, the trolling motor housing 50 may be configured with one or more attachment features that enable removable attachment and connection of one of a plurality of nosecones. As such, the nosecones can be removed and attached without damaging either the nosecone or trolling motor housing. Further, as detailed herein, various optionality can be utilized be selection of which nosecone to attach to the trolling motor.

In some embodiments, the surface 37 of the trolling motor housing 50 or a corresponding surface of the nosecone 25 may include one or more sealing features that enable a waterproof connection between the nosecone 25 and the trolling motor housing 50. In this regard, the trolling motor housing 50 and nosecone 25 form a desirable waterproof system that maintains a small footprint.

In some embodiments, the surface 37 of the trolling motor housing 50 and the corresponding surface of the nosecone 25 may each include complementary wired connection ports that are align and configured to connect upon attachment of the nosecone 25 to the trolling motor housing 50. In some embodiments, the wired connection port of the surface 37 of the trolling motor housing 50 is designed to receive and communicate with various different connection ports—such as to accommodate various different nosecone configurations, thus enabling connection and interaction with various nosecone configurations. In this regard, the trolling motor housing 50 may further enclose one or more processors and/or enable communication (e.g., through cables) with one or more processors that are configured to communicate and receive information from various marine devices stored within the various nosecones. In this way, the trolling motor system 20 and/or remote marine electronics device of the watercraft may be configured to communicate with and utilize any of the different nosecones (with their varying functionality).

As detailed herein, some embodiments of the present invention contemplate various different nosecone configurations that are interchangeable with the trolling motor housing. In this regard, each nosecone may incorporate various different marine devices and/or functionality. For example, different nosecones may have different transducer systems. One nosecone may have a linear downscan transducer system, while another may have a traditional conical transducer system. Additionally, other transducer systems are contemplated, including, for example, phased array transducer systems, sidescan transducer systems, forward looking transducer systems, 3D-enabled transducer systems, etc. Further, other marine devices, such as water temperature sensors, speed sensors, etc. are also contemplated. Moreover, embodiments of the present invention contemplate various combinations of such marine devices and/or functionality. In this regard, the user may select and interchange nosecones depending on the desired functionality.

FIG. 3A illustrates a block diagram of a trolling motor 200 in accordance with various implementations described herein. In various implementations, the trolling motor 200 may include and/or incorporate use of various types of electrically and/or mechanically steered trolling motors. In some instances, some trolling motors may be electrically steered via a remote device, foot pedal, or multi-functional display (MFD). In other instances, some trolling motors may be mechanically steered via a handheld tiller type control or a mechanical cable steered foot pedal.

The trolling motor 200 includes a housing 202 configured to encapsulate a motor 234. The housing 202 attaches to a nosecone 204. There are one or more marine devices 208, such as the depicted transducer array 210, incorporated within the nosecone 204. The trolling motor 200 includes a propeller 238 coupled to the motor 234 via a drive shaft 236. The trolling motor 200 includes a steering shaft 206 that couples the motor 234 (and housing 202) to a watercraft (e.g., a boat). The motor 234 may include an electric motor, and the motor 234 may be configured to drive the propeller 238 in water to provide thrust for the watercraft in a body of water 102 during operation of the electric motor. The trolling motor 200 may include a fin 209 for stability in water during movement.

In an example embodiment, the nosecone 204 may be removable, such that nosecones 204 with different marine devices 208 may be interchanged. For example, the nosecone 204 may include a first sonar transducer. However, it may be interchanged with a second nosecone 204' that includes a second sonar transducer, multiple sonar transducers, an acoustic speaker, lighting assembly, camera, or any combination thereof. The interchangeability of the nosecone 204 may enable customization of the trolling motor 200 based on the intended body of water 16, the preferences of the fisherman, type of marine activity or fishing, or the like.

In an example embodiment, such as depicted in FIG. 3A, the marine device 208 may be a transducer array 210, such as a phased array, downscan transducer array, a sidescan transducer array, conical array, or the like, disposed in the nosecone 204. In some example embodiments, one or more of the multiple transducer arrays 210 may be disposed within the nosecone 204.

In some example embodiments, the trolling motor 200 may include an electromagnetic field (EMF) damper 214. The EMF damper 214 may be positioned between the motor 234 and one or more electronic components within the nosecone 204 and/or housing 202, such as the one or more transducer arrays 210, one or more sensors 220, and/or the motor controller 230. The EMF damper 214 may include one or more EMF shielding materials, such as fabrics, textiles, plastics, glass, paints, foils, ribbon, or wire, configured to reduce or prevent electromagnetic interference caused by an electromagnetic field produced by the motor 234.

The steering shaft 206 may incorporate use of a first electrical cable 232 for controlling operation of the motor 234 via a motor controller 230. Operation of the motor 234 may be controlled by a variable power supply, such as a foot-pedal, that provides variable control signals to the motor controller 230, and the motor controller 230 relays the variable control signals to the motor 234 to drive the motor 234. In another instance, operation of the motor 234 may be controlled by an external computing device, such as the marine electronic device 30 in FIG. 1B. In this instance, the external computing device may provide variable control signals to the motor controller 230, and the motor controller 230 relays the variable control signals to the motor 234 to drive the motor 234.

The steering shaft 206 may incorporate use of a second electrical cable 212 for transmitting data signals from the one or more marine devices 208, such as sonar data signals from the transducer array 210, to a computing device, such as the marine electronic device 30 in FIG. 1. The transducer array 210 may include a transducer assembly having multiple scanning transducer arrays. The transducer array 210 may include multiple transducer arrays 210 including one or more of a right scanning transducer array, left scanning transducer array, a down scanning transducer array, a forward scanning transducer array, a conical down beam transducer array, and/or a phased array. The sonar data generated and transmitted by the transducer array 210 may be used for imaging environmental features in the body of water 16.

Generally, the term sonar (i.e., SOund Navigation And Ranging) refers to various techniques for propagating sound underwater to detect objects on or under a surface of a body of water, such as fish, plants, rocks, sea floor, etc. One type of sonar technology refers to active sonar that is configured to emit pulses of sound waves while receiving echoes, which refers to pinging. Sonar may be used to determine acoustic locations and/or measurements of echo characteristics for targets and objects in a body of water. Further, acoustic frequencies used in sonar based devices may vary from low frequency (i.e., infrasonic) to high frequency (i.e., ultrasonic).

As discussed above, the sonar transducer 210 may include multiple transducer arrays that may be configured to use sonar technology to evaluate attributes of a target object by interpreting echoes from sound waves. In various implementations, each transducer array may be configured to actively generate low and/or high frequency sound waves and evaluate echoes received back to thereby measure time intervals between sending signals and receiving corresponding echoes to determine distance to target objects. Each transducer array may be configured to convert energy into sound waves using piezoelectric transducer elements or capacitive transducer elements that are configured to convert electrical energy into sound. Each piezoelectric transducer element may be configured to use piezoelectric crystals that include a property of changing size when voltage is applied, whereby applying an alternating current (AC) across the piezoelectric crystals may cause oscillations at high frequencies, to thereby generate high frequency sound waves. In some instances, focusing sound waves generated by each piezoelectric transducer element may be determined by an area and shape of each sonar transducer element, a sound wave frequency of each piezoelectric transducer element, and a sound velocity of the propagation medium, such as a body of water. In some instances, each piezoelectric transducer element may use piezoelectric crystals configured as transceivers to transmit and detect sound waves in one or more elements, such as propagating sound waves and receiving echoing sound waves.

The trolling motor system 200 may include one or more sensors 220 incorporated within the nosecone 204. Further, the steering shaft 206 may incorporate use of a third electrical cable 222 for transmitting sensor data signals from the one or more sensors 220 to a computing device, such as the computing device 30 in FIG. 1B. In some embodiments, the one or more sensors 220 may include a dedicated sensor (e.g., water sensor) configured for sensing deployment/removal of the trolling motor 200 in/from the body of water 16. For instance, the dedicated sensor may include electrode terminals (not shown) configured to activate (e.g., power-up) the transducer assembly or transducer array 210 when the trolling motor 200 is deployed in water. The electrode terminals may be configured to deactivate (e.g., power-down) the transducer assembly or sonar transducer 210 when the trolling motor 200 is removed from water. The one or more sensors 220 may include one or more environmental sensors, such as a temperature sensor. Additionally or alternatively, the one or more sensors 220 may include an orientation or direction sensor.

In an example embodiment, with reference to FIG. 3B, the one or more marine devices 208 (such as employed in the nosecone), may include an acoustic speaker 217. The acoustic speaker 217 may be configured to emit a fish attraction sound into the surrounding water. In an example embodiment, the fish attraction sound may be configured to attract bait fish, which may in turn attract larger target fish. In some example embodiments, the fish attraction sound may be configured for a specific type of fish or species. The fish attraction sound may simulate a sound made by fish to indicate a feeding frenzy, distress, or the like. In the example depicted in FIG. 3B, the acoustic speaker 217 may be disposed in the nosecone 204 with the transducer array 210.

In some example embodiments, the one or more marine devices 208 may also include a lighting assembly. The lighting assembly may include one or more light emitting diodes (LEDs) or other appropriate illumination elements, oriented within the housing and configured to transmit light into the underwater environment. The nosecone 204 may include a translucent or transparent portion aligned with the light assembly to enable the transmission of the light into the underwater environment. Lighting the underwater environment may be advantageous to prevent striking underwater obstacles, locating shallow objects under the surface of the water, attracting fish, providing an aesthetically pleasing environment, or the like.

In an example embodiment, the one or more marine devices 208 may include a camera oriented and configured to capture one or more images of the underwater environment. The camera may be configured to capture fixed images or moving images (e.g., videos). The captured images may be displayed on a user interface.

FIG. 4 illustrates a cross-sectional view and FIG. 5 illustrates an exploded view of a nosecone 204 according to some example embodiments. The housing 202 of the trolling motor 200 may include a forward bulkhead 400, e.g. wall, configured to abut the nosecone 204. The nosecone 204 may be configured to be operably coupled to the forward bulkhead 400. In some example embodiments, the nosecone 204 may form a watertight unit. In the depicted embodiment, the nosecone is sealed, e.g. watertight, by a bulkhead seal 402. The bulkhead seal 402 may be an O ring, such as a rubber O ring or other suitably compressible material, which is compressed between the wall of the nosecone 204 and a perimeter of the bulkhead 400. In an example embodiment, the bulkhead seal 402 may be disposed in a seal groove in the perimeter of the bulkhead 400 to provide a compression area and limit movement of the seal 402.

In an example embodiment, the nosecone 204 may include a retention element, e.g. a nosecone mechanical connection feature, such as one or more retention bolts 408. The retention bolt 408 may include a threaded portion, a shaft and a head. In some embodiments, the integral bolt head may be replaced by a removable retention nut. The threaded portion and shaft may pass through a through aperture 412 in the nosecone 204. The threaded portion of the retention bolt 408 may engage a motor housing connection feature, such as a bolt receiver 418, associated with or disposed in the bulkhead 400. The bolt receiver 418 may include complementary threads to the threaded portion of the retention bolt 408, such that rotation of the retention bolt 408, such as by operation of a tool in contact with the head, may draw the retention bolt 408 into the bolt receiver 418. The through aperture 412 may include an engagement surface 414 configured to receive a retention force from the head of the retention bolt 408. In some embodiments, the nosecone 204 may include a bolt seal, such as a rubber gasket, disposed around the shaft of the retention bolt 408, between the head and the engagement surface 414. The bolt seal 410 may be configured to be compressed between the head of the retention bolt 408 and the engagement surface 414 to seal, e.g. waterproof, the through aperture 412. In an example embodiment, the nosecone 204 may include a bolt cap 416 configured to close the through aperture 412. The bolt cap 416 may include threads and the nosecone 204 may include complementary threads, such that the bolt cap 416 may be rotated, e.g. screwed, to engage threads. The bolt cap 416 may conform to the contour of the nosecone 204, e.g. the bolt cap 416 may have a hydrodynamic contour to reduce drag due to water flow across the bolt cap.

Additionally or alternatively, the retention element, e.g. nosecone mechanical connection feature, may include threads on the wall of the nosecone 204 and the motor housing mechanical connection feature may include threads around the perimeter of the bulkhead 400, past the seal 402. The nosecone 204 may be rotated to engage the threads, which may operably couple the nosecone 204 to the housing 202. In other examples, the retention element may include cam lever connectors, snap fittings, or other suitable retention system.

In some example embodiments, the trolling motor 200 may include a cable connector 406. The cable connector 406 may be disposed in the bulkhead 400, such that the cable connector penetrates from the housing side of the bulkhead 400 to the nosecone side of the bulkhead 400. In some embodiments, the cable connector 406 may include a sealing surface 422 extending about a perimeter of the cable connector 406. The sealing surface may abut the bulkhead 400 on a first side, e.g. the housing side of the bulkhead 400 in the depicted embodiment. The cable connector 406 may include a fastener 420 disposed at a distal end of the cable connector 420. The fastener 420 may include threads and a flange which are configured to be engaged by a retention ring 420 including complementary threads. The retention ring 420 may engage the threads on the distal end of the cable connector 406 and compress the flange against the bulkhead 400, thereby sealing the aperture in the bulkhead 400.

In an example embodiment, the cable connector 406 may include a motor housing electrical connection feature, such as a jack, a plug, a pin connector, or the like configured to receive a complementary nosecone electrical connection feature, such as a plug, a jack, a pin connector, or the like operably coupled to the one or more marine devices 208 within the nosecone 204. In some example embodiments, the cable connector 406 is disposed completely on the nosecone 204 side of the bulkhead 400 and a sealing gasket is disposed around the electronic cable to provide a waterproof seal.

Additionally or alternatively, a cable grommet may be provided through the bulkhead 400. The cable grommet may be rubber or other suitable materiel. An electrical cable may be passed through the cable grommet causing the grommet to press against the penetration in the bulkhead 400 and the cable creating a water tight seal. The electrical cable may include a motor housing electrical connection feature, such as a jack, plug, pin connector, or the like configured to receive a complementary nosecone electrical connection feature, such as a plug, jack, pin connector, or the like operably coupled to the one or more marine devices 208 within the nosecone 204.

FIG. 6 illustrates a cross-sectional view of a nosecone 204 including a downscan sonar array 600 according to an example embodiment. The downscan sonar array 600 (e.g., a linear downscan transducer and a traditional conical downscan transducer) may be disposed on a PCB 602, such that transducer elements associated with the downscan sonar array are directed generally downwardly as indicated by arrow D1 when the nosecone 204 is deployed in the underwater environment. The PCB 602 may be a high density interconnect PCB including piezoelectric crystal transducer elements of the downscan sonar array 600. In some example embodiments, other marine devices, such as an acoustic speaker, lighting assembly, camera, other sonar arrays, or the like may be disposed within the nosecone 204 and/or disposed on the same PCB 602. The downscan sonar array may provide two dimensional sonar imaging as described above in reference to FIG. 3A.

In some example embodiments, the PCB 602 may be electrically connected to a computing device by a device cable 604. The device cable 604 may include a device connector 606, e.g. nosecone electrical connection feature, which may be electrically or data connected to the cable connector 406, e.g. motor housing electrical connection feature, to provide an electrical or data connection to the computing device, as described above.

FIG. 7 illustrates an example cross-sectional exploded view of the nosecone 204 and downscan sonar array 600. The nosecone 204 may be partitioned into two or more compartments. A first marine device 208, such as the downscan sonar array 600 and associated PCB 602 may be disposed in a first compartment 700. The first compartment 700 may be filled, e.g. potted, with a waterproof or anti-shock material, which may encapsulate the downscan sonar array 600 and PCB 602. The waterproof or anti-shock material may provide an additional waterproof barrier for the marine device 208, e.g. the downscan sonar array 600 and/or may limit or prevent damage to the marine device from vibration or impact. In an example embodiment, the waterproof or anti-shock material may be soft epoxy, hard epoxy, urethane, polyurethane, or other suitable material.

In an example embodiment, partitions between the compartments of the nosecone 204 may include a cable notch 706. The cable notch may be provided to route the device cable 604 from the marine device 208, e.g. the downscan sonar array 600, and the device connector 606. A second compartment 702 may be provided for storage of additional device cable 604 and/or an additional marine device 208, such as an additional sonar array, acoustic speaker, lighting assembly, camera, or the like. In some example embodiments, further compartments, such as compartment 704, may be provided for storage of device cabling 604 or further marine devices 208. In this regard, a benefit of providing a central bolt retention mechanism enables compartmentalization around the bolt.

FIG. 8 illustrates a cross-sectional exploded view of a nosecone 204 including a phased array 800. In an example embodiment, the marine device 208, may include a phased array 800, or a beam steering array. The phased array 800 may include one or more crystal arrays 802, e.g. piezoelectric crystals disposed on a PCB, and one or more sonar PCBs 804 configured to control aspects of the crystal arrays 802 and receive sonar returns.

In an example embodiment, the nosecone 204 may be molded or may include slots 806 configured to retain one or more PCBs, such as sonar PCBs 804 and/or crystal arrays 802 in a predetermined position. In some embodiments, the slots 806 may be about the width of the associated PCB, which may enable friction to limit movement of the PCB.

FIG. 9 illustrates a nosecone 204 with a multifunction sonar array 900. The multifunction sonar array 900 may be include a conical sonar array 902, downscan sonar array 904, a sidescan sonar array 906, or the like. The multifunction sonar array 900 may include an expanded nosecone 204 to provide adequate space for each of the sonar arrays. In an example embodiment, the nosecone 204 may be extended downward and in some cases under the housing 202 of the trolling motor. The extended portion of the nosecone 204 encapsulating the multifunction sonar array 900 may be tapered at an end opposite the bolt cap 416 to provide a hydrodynamic profile.

Example System Architecture

FIG. 10 shows a block diagram of an example system 100 for use with a marine electronic device 105 and a trolling motor system 101 capable for use with several embodiments of the present invention. As shown, the system 100 may include a number of different modules or components, each of which may comprise any device or means embodied in either hardware, software, or a combination of hardware and software configured to perform one or more corresponding functions. For example, the trolling motor system 101 may include a trolling motor housing 150 and various nosecones 125, 125', etc.

The system 100 may also include one or more communications modules configured to communicate with one another in any of a number of different manners including, for example, via a network. In this regard, the communication interfaces and/or processors (e.g., 110, 160, 170, 170', 130) may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays (e.g., a marine electronic device 105) may be included in the system 100.

The marine electronic device 105 may include a processor 110, a memory 120, a sonar signal processor 115, a user interface 135, a display 140, one or more sensors 145 (e.g., a location sensor, position sensor, heading sensor, GPS, orientation sensor (not shown), etc.), and a communication interface 130.

The processor 110 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to provide processing to utilize any operational and/or location data detected by the system 100 (e.g., operational data and/or location data provided by one or more unmanned vehicles 120). In some embodiments, the processor 110 may be further configured to implement signal processing or enhancement features (such as through a sonar signal processor 115). In some embodiments the processor 110 may be configured to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 120 may be configured to store instructions, computer program code, marine data, such as sonar data, chart data, location/position data, radar data, camera data, and other data associated with the marine electronic device 105 in a non-transitory computer readable medium for use, such as by the processor.

The communication interface 130 may be configured to enable connection to external systems (e.g., an external network 102, one or more marine electronic devices 105, etc.). In this regard, the marine electronic device 105 may include at least one transmitter configured to transmit, for example, one or more signals according to example embodiments described herein. Likewise, the marine electronic device 105 may include at least one receiver configured to, for example, receive data from one or more unmanned vehicles according to example embodiments described herein. In some embodiments, the transmitter and receiver may be combined as a transceiver. Though the depicted embodiment shows specific examples of external networks that the marine electronic device is configured to communicate with, there are many other contemplated systems (such as the operation and/or control systems of the watercraft carrying the marine electronic device).

The marine electronic device 105 may also include one or more sensor(s), system(s), or other information/data collecting devices 145 (such as any example sensors or data collecting devices described in any embodiments herein). For example, the marine electronic device 105 may include a location sensor configured to determine the current location of the marine electronic device. Further, the marine electronic device may include speed and/or direction detecting sensors that are configured to determine the speed and/or heading of the marine electronic device (or that of the watercraft/marine vessel associated with the marine electronic device). Even further, the marine electronic device may include a navigation system that is configured to enable navigation capabilities (such as described herein in greater detail with respect to some example embodiments). As will be apparent to one of ordinary skill in the art based on the disclosure herein, there are many different types of sensors or data collection devices that can be utilized and/or integrated within the marine electronic device.

The display 140 may be configured to display images and may include or otherwise be in communication with a user interface 135 configured to receive input from a user. The display 140 may be, for example, a conventional LCD (liquid crystal display), a touch screen display, mobile device, or any other suitable display known in the art upon which images may be displayed.

The user interface 135 may include, for example, a keyboard, keypad, function keys, mouse, scrolling device, input/output ports, touch screen, or any other mechanism by which a user may interface with the system.

Although the display 140 of FIG. 10 is shown as being directly connected to the processor 110 and within the marine electronic device 105, the display 140 could alternatively be remote from the processor 110 and/or marine electronic device 105. Likewise, in some embodiments, other components of the marine electronic device 105 could be remotely located.

The trolling motor system 101 may include a trolling motor housing 150 and selectively one of various nosecones, such as nosecone 125 or nosecone 125'.

The trolling motor housing 105 may include a processor 160 and trolling motor 155, though other components are also contemplated.

The processor 160 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 160 as described herein. In this regard, the processor 160 may be configured to receive data from one or more marine devices within a nosecone and process the data accordingly. In some embodiments, the processor 160 may be configured to transmit the data to the marine electronics device 105 for further processing and/or display. In some embodiments, the trolling motor housing 150 may not have a processor and simply have cables that transfer data from the nosecone directly to the marine electronic device 105. Alternatively, wireless communication can be utilized.

The trolling motor 155 may be configured to interact with and/or control propulsion of the trolling motor system 101 (and, thus, the attached watercraft).

The system 100 may include one or more nosecones 125, 125' that can each selectively be attached and connected to the trolling motor housing 150—one at a time.

A first example nosecone 125 includes a processor 170, transducer assembly 175, and sensor 178. The nosecone 125 may be configured to attach (A) and connect (C1) to the trolling motor housing 150. In this regard, the attachment (A1) may be configured to removably attach a nosecone mechanical connection feature with a motor housing mechanical connection feature to securely attach the nosecone 125 to the trolling motor housing 150. Likewise, the connection (C1) may be configured to electrically connect a nosecone electrical connection feature to a motor housing electrical connection feature to facilitate data transfer, such as from the processor 170 of the nosecone 125 to the processor 160 of the trolling motor housing 150 and/or the processor 110 of the marine electronics device 105.

The processor 170 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 170 as described herein. In this regard, the processor 170 may be configured to receive data from the transducer assembly 175 and/or sensor 178 and process the data accordingly. In some embodiments, the processor 170 may be configured to transmit the data (such as through the connection C1) to the processor 170 of the trolling motor housing 150 and/or the processor 110 of the marine electronics device 105 for further processing and/or display.

The transducer assembly 175 may be any transducer or transducer array, including combinations of various transducers. In this regard, the transducer assembly is configured to emit one or more sonar beams into the underwater environment and receive one or more corresponding sonar returns.

The sensor 178 may be any type of sensor, such as a water temperature sensor, speed sensor, wind sensor, position sensor, orientation sensor, or the like. In an example embodiment, the sensors 178 may include a dedicated sensor (e.g., water sensor) configured for sensing deployment/removal of the trolling motor 200 in/from the body of water 102. For instance, the dedicated sensor may include electrode terminals (not shown) configured to activate (e.g., power-up) the transducer assembly 175 when the trolling motor is deployed in water. The electrode terminals may be configured to deactivate (e.g., power-down) the transducer assembly 175 when the trolling motor is removed from water.

In some example embodiments, the sensor 178 may include one or more environmental sensors, such as a temperature sensor configured to measure the temperature of the water and/or ambient air. Additionally or alternatively, the one or more sensors 178 may include position and/or an orientation sensors configured to determine the relative position and orientation of the watercraft.

A second example nosecone 125' includes a processor 170' and sensor 178'. In this regard, the marine device components and functionality offered by the nosecone 125' are different than that of the first example nosecone 125. The nosecone 125' may be configured to attach (A2) and connect (C2) to the trolling motor housing 150. In this regard, the attachment (A2) may be configured to removably attach a nosecone mechanical connection feature with a motor housing mechanical connection feature to securely attach the nosecone 125' to the trolling motor housing 150. Likewise, the connection (C2) may be configured to electrically connect a nosecone electrical connection feature to a motor housing electrical connection feature to facilitate data transfer, such as from the processor 170' of the nosecone 125' to the processor 160 of the trolling motor housing 150 and/or the processor 110 of the marine electronics device 105.

In some example embodiments, the attachments (A1) and/or (A2) and connections (C1) and/or (C2) may be a electromechanical connections providing both the mechanical and electrical connection between the trolling motor housing 150 and the nosecone 125 and/or 125'. In one such example, the electrical contacts of the connection (C1) and/or (C2) may be a portion of, or molded into, the mechanical attachment (A1) and/or (A2), such that mechanical engagement between the trolling motor housing 150 and the nosecone 125 and/or 125' causes the electrical contacts of the connections (C1) and/or (C2) to mate. Additionally or alternatively, the electrical connection (C1) and/or (C2) may be a wireless connection, such as a WiFi, Bluetooth, NFC, or other short range wireless communication protocol configured to establish data communication between the trolling motor housing 150 and the nosecone 125 and/or 125'. In some example embodiments the connections (C1) and/or (C2) may be configured to wirelessly communicate directly between the nosecones 125 and/or 125' and a computing device including, but not limited to the marine electronic device 105, such as via the communication interface 130.

The second nosecone 125' may include one or more marine devices 180, such as one or more transducer assemblies, similar o transducer assembly 175. The transducer assemblies may be in any of various sonar array configurations, as discussed above in reference to FIG. 3A.

In some embodiments, the one or more marine devices 180 may include an acoustic speaker. The acoustic speaker 217 may be configured to emit a fish attraction sound into the surrounding water. In an example embodiment, the fish attraction sound may be configured to attract bait fish, which may in turn attract larger target fish. In some example embodiments, the fish attraction sound may be configured for a specific type of fish or species. The fish attraction sound may simulate a sound made by fish to indicate a feeding frenzy, distress, or the like.

In some example embodiments, the one or more marine devices 180 may also include a lighting assembly. The lighting assembly may include one or more light emitting diodes (LEDs) or other appropriate illumination elements, oriented within the second nosecone 125' and configured to transmit light into the underwater environment. The second nosecone 125' may include a translucent or transparent portion aligned with the light assembly to enable the transmission of the light into the underwater environment. Lighting the underwater environment may be advantageous to prevent striking underwater obstacles, locating shallow objects under the surface of the water, or the like.

In an example embodiment, the one or more marine devices 180 may include a camera oriented and configured to capture one or more image of the underwater environment. The camera may be configured to capture fixed image or moving images. The captured images may be displayed on a user interface. In some instances the camera may be configured to capture images in response to a trigger event, such as a starting the trolling motor, casting a fishing line, user initiation, or the like.

Additional Example Nosecone Embodiments

FIG. 11 illustrates an example nosecone 204 attachment to a trolling motor 200. The nosecone 204 may be attached (e.g., bolted) to the bulkhead 400 of the trolling motor 200 in a manner substantially similar to the nosecone 204 and trolling motor 200 described above in FIG. 4. The bulkhead 400 depicted in FIG. 11 includes a bolt receiver 418, e.g. a motor housing mechanical connection feature, extending outward from the bulkhead 400 into the nosecone 204. In some example embodiments, the bulkhead 400 may by a separate component from the trolling motor 200 which isolates the housing 202 from the nosecone 204. The bulkhead 400 may be operably coupled to the nosecone 204 or the housing 202, such as by screw, friction, clips, tabs, welding, or the like. In an example embodiment, the bulkhead 400 may include a sealing ring, e.g. an O ring 1102, to generate a water tight seal between the bulkhead 400 and the nosecone 204 or housing 202. The bulkhead 400 may facilitate a connection between the housing 202 and the nosecone 204, such that the nosecone 204 is operably coupled to bulkhead 400, which is in turn operably coupled to the housing 202.

FIGS. 12 and 13 illustrate a connection of the nosecone 204 to the housing 202 utilizing one or more retention screws 1202. In FIG. 12, the retention screw 1202 may be screwed through an aperture in a side wall of the nosecone 204 and housing 202. The retention screws 1202 may be tightened, such that the abutting side walls of the nosecone 204 and housing 202 are compressed against each other. In the depicted embodiment, the abutting sidewalls form the nosecone mechanical connection feature and the motor housing mechanical connection feature, which are maintained in contact by the retention screw 1202. In some embodiments, the retention screws may form one or more nosecone mechanical connection features.

In some embodiments, the bulkhead seal 402 may be compressed between the sidewalls of the nosecone 204 and the housing to create a watertight seal. In the depicted embodiment, the side wall of the nosecone 204 is configured to receive the side wall of the housing 202. Particularly, the outer periphery of the side wall of the nosecone is recessed, such that the outer side wall of the housing 204 fits within the inner circumference of the side wall of the nosecone 204. Preferably, the outer circumference of the side walls of the nosecone 204 and housing may be approximately the same to provide a hydrodynamic profile. In some embodiments, the coupling of the nosecone 204 and the housing 202 may be reversed, such that the sidewall of the nosecone couples within the side wall of the housing 204.

In FIG. 13, the trolling motor 200 includes an insert 1302, such as the separate bulkhead 400 discussed above in reference to FIG. 11. The insert 1302 may be operably coupled to the nosecone 204, such as by welding, molding, snap fit, interference fit, adhesive, or the like, thereby forming a portion of a nosecone mechanical connection feature. Additionally, a portion of the insert 1302 may extend into a retention slot 1304, such that the retention screw 1202 may extend completely through an aperture in a first portion a side wall of the housing 202 on the outer side of the retention slot 1304 and the portion of the insert 1032. In the depicted embodiment, the insert 1302 may form the nosecone mechanical connection feature and the retention slot may form the motor housing mechanical connection feature. In some embodiments, the retention screw may form a nosecone mechanical connection feature.

In an example embodiment, the retention screw 1202 extend partially through a second portion of the side wall of the housing 202 on the inner side of the retention slot 1304, which may provide a stronger connection and/or greater watertight integrity. The insertion of the insert into the retention slot and/or the tightening of the retention screws 1202 may compress the bulkhead seal 402, thereby creating a watertight seal between the nosecone 204 and housing 202. In some instances the side wall of the housing 202 may include a recess approximately the size of a head of the retention screws. The recess may enable the retention screws 1202 to be inserted such that the head is flush or below the outer edge of the side wall of the housing 202 allowing for a hydrodynamic profile. In an alternative embodiment, the housing 202 may include an extension and the insert 1302 or nosecone 204 may include the retention slot 1304.

FIGS. 14 and 15 illustrate an example clamp connection between the housing 202 and the nosecone 204, forming respective portions of a nosecone mechanical connection feature and/or motor housing mechanical connection feature. The clamp connection may include a clamp 1402 configured to clamp about the nosecone 204, the housing 204, or a connection between the nosecone 204 and housing 202. The clamp connection may also include a clamp restraint 1404 and an anchor 1406. In an embodiment in which the clamp 1402 is clamped about the housing 202 or the nosecone 204, the anchor 1406 may be disposed on the other of the nosecone 204 or housing 202, such that the clamp restraint 1404 compresses the connection between the housing 202 and nosecone 204 when a restraint bolt is tightened. Alternatively, in an embodiment in which the clamp 1402 is clamped about the connection between the housing 202 and the nosecone 204, as depicted in FIG. 15, the restraint 1404 and anchor 1406 may prevent rotation or vibration of the clamp 1402, which may limit loosening of the clamp 1402 during operation. In a further alternative embodiment, the restraint 1404 and anchor 1406 may be omitted entirely. The housing 202 and/or the nosecone 204 may include a groove 1502 or ridge, e.g. a nosecone mechanical connection feature and motor housing mechanical connection feature, configured to engage a complementary ridge or groove 1504 of the clamp 1402 when connected. The clamp may be tightened, or otherwise engaged, to create a watertight seal between the nosecone 204, the housing 202, and/or the clamp 1402.

FIG. 16 illustrates an example hinged connector 1602. The hinged connector 1602 may be formed from plastic, metal, or the like. The hinged connector 1602 may include a hinge 1604 and one or more ridges or grooves 1606. The hinged connector 1602 may be configured to connect the housing 202 to the nosecone 204 in a manner similar to the clamp 1402 discussed in reference to FIGS. 14 and 15, such as by engaging complementary ridges or groves 1502 disposed in the nosecone 202 and/or housing 204. The hinged connector 1602 may include one or more fasteners 1608, such as screws, ratchet strips, a T bar 1702 as depicted in FIG. 17, or the like, configured to retain the hinged connector 1602 in a shut position. Clamp 1402 and hinged connector 1602 may be generally referred to as circular connectors.

FIG. 18 illustrates an example connection of the nosecone 204 to the housing 202, in which the retention bolt 408 is captured to the nosecone 204. The retention bolt 408 or nosecone 204 may include a capture element 1802 to retain the retention bolt 408 in connection with the nosecone 204. The capture element 1802 may be a groove or ridge on the retention bolt 408 that engages a complementary ridge or groove in the nosecone 204, a snap lock, e.g. c clip, a retention ring, a pin, or the like. The retention bolt 408 may include a hexagonal head, or may include a driving recess, such as a hexagonal recess, torque recess, e.g. star recess, a Phillips recess, e.g. cross, a standard recess, e.g. line recess, or the like to facilitate tightening of the retention bolt to couple the nosecone 204 to the housing 202.

FIGS. 19-21 illustrate a flange clamp 1902 connection of the nosecone 204 and housing 202. The nosecone 204 and housing 202 may include a flange flare 1901, e.g. ridge, at the mating surface, forming a nosecone mechanical connection feature and motor housing mechanical connection feature, respectively. The flange clamp 1902 may include a hinge 1904 and a tightening element 1906, e.g. a threaded shaft and head. The flange clamp 1902 may be clamped about the flange flare 1901, such that the flange flare 1901 sets into a seating groove 1903, and be tightened. In some example embodiments, the connection may also include a sealing element 1903, such as a gasket. The gasket may be formed of rubber, plastic, metal, or the like.

FIG. 22 illustrates screw positions on the trolling motor 200 for the retention screw 1202 discussed above in reference to FIGS. 12 and 13. In an example embodiment, the trolling motor 200 may utilize any number of retention screws 1202, such as 3 screws, 4 screws, 5 screws, or the like. The retention screws 1102 may be spaced about a periphery of the connection at about equal distances or may be offset from equal distances based on component placement. In some embodiments, the retention screws 1202 may be placed at the top, bottom, and lateral sides of the connection, diagonally, or any other suitable placement.

FIGS. 23 and 24 illustrate example connections between the nosecone 204 and the housing 202 including clips 2302. The nosecone 204 and/or the housing 202 may include one or more clips 2302 extending longitudinally toward a corresponding clip recess 2304 in the housing 202 or nosecone 204, for example 3 clips, 4, clips, or any other suitable number of clips. The clips 2302 and corresponding clip recesses 2304 may form a nosecone mechanical connection feature and a motor housing mechanical connection feature. The clips 2302 may include one or more protrusions extending substantially laterally inward away from the clips 2302, which may be received in engagement recesses 2305 of the clip recess 2304 to retain the housing 202 in connection with the nosecone 204. In some embodiments, a locking screw 2306 may also be provided to secure one or more or the clips 2302 in engagement with the clip recesses 2304. In some example embodiments, the housing 202 or nosecone 204 may include threads 2308, which may enable a rotational engagement of the nosecone 204 with the housing 202 by engaging complementary threads 2308 of the other of the housing 202 or nosecone 204. In an example embodiment, the nosecone 204 may be threaded onto the housing 202 by threads 2308 and clips 2302 may engage the clip recesses 2304 when the nosecone 204 reaches a fully threaded position.

In the embodiment, depicted in FIG. 24, the housing 202 includes a locking ring 2401, e.g. motor housing mechanical connection feature, that may include, for example, one or more engagement surfaces 2402, e.g. protrusions or recesses, disposed about a periphery of the housing 202 at the connection to the nosecone 204. One or more clips 2302, e.g. nosecone mechanical connection features, may engage the locking ring 2401 similar to engaging the clip recess 2304, discussed above in reference to FIG. 23. However, in the embodiment depicted in FIG. 24, the protrusions may extend laterally outward and the clips 2302 may be received within the locking ring 2401.

FIG. 25 illustrates a connection between the housing 202 and the nosecone 204 including a rotating lock 2502. The rotating lock 2502 may be disposed on either of the housing 202 and the nosecone 204. In the depicted embodiment, the rotating lock 2502 is disposed on the nosecone 204 and forms a nosecone mechanical connection feature. The rotating lock 2502 may be configured to rotate at least a predetermined amount about the periphery of the connection surface of the housing 202 or the nosecone 204. The nosecone 204 and/or housing 202 may include one or more alignment protrusions 2504 and/or corresponding recesses configured to align the nosecone 204 with the housing 202 to facilitate proper electrical, and/or mechanical connections. The nosecone 204 may be pushed on to the housing 202 and the rotating lock 2502 may be rotated, for example one quarter turn, such that one or more locking elements engage, such as complementary threads, protrusion and corresponding track, or other suitable locking elements. The threads or protrusion and track 2506, e.g., a motor housing mechanical connection feature in the depicted embodiment, may be configured to tighten the nosecone 204 against the housing 202 in response to rotation of the rotating lock 2502. In some embodiments, the track 2506 may include a drop in recess 2508 corresponding to a locked position, as depicted in detail A, which may limit rotation of the rotating lock 25 out of the locked position.

FIG. 26 illustrates a connection between the housing 202 and the nosecone 204 including a locking latch 2606. The housing 202 or nosecone 204 may include an alignment protrusion 2602, e.g. a first nosecone mechanical connection feature in the depicted embodiment, configured to be received by a complementary recess 2604 in the other of the housing 202 or nosecone 204, e.g. a first motor housing mechanical connection feature in the depicted embodiment. The nosecone 204 and/or housing 202 may also include the locking latch 2606, e.g. a second nosecone mechanical connection feature, such as a pivoting latch configured to engage a complementary catch 2608, e.g. a first motor housing mechanical connection feature, on the other of the housing 202 or nosecone 204.

FIG. 27 illustrates a nosecone 204 including an interchangeable component module 2702. The nosecone 204 may be connected to the housing 202 by any of the methods discussed above. The interchangeable component module 2702 may include a sonar transducer, lights, acoustic speaker, or the like. The interchangeable component module 2702 may allow further customization of the nosecone 204. In some embodiments, the interchangeable component module 2702 or the nosecone 204 may include a guide 2703A, such as a T track, configured to be received by a complementary slot 2703B, such as a T slot, to align the interchangeable component module 2702 with the nosecone 204. The interchangeable component module 2702 may be retained in connection with the nosecone 204, a retention element 2704, such as a screw, tab, locking pin, or other suitable retention device. In other example embodiments, the interchangeable component module 2702 may be coupled to the nosecone 204 by fasteners, snap connections, or other suitable methods.

FIGS. 28 and 29 illustrate a reverse mount nosecone 204 and housing 202. The housing 202 may include one or more retention slots 2802 formed in a side wall of the housing 202 and configured to enable alignment of a retention element 2804, e.g. motor housing mechanical connection feature, such as a screw, bolt, pin, or the like. The retention element 2804 may extend through the housing 202 and attach to the nosecone 204 or bulkhead 400, such as through a fastener aperture disposed in a face of the housing 202 and into a receiving aperture in the nosecone 204, e.g. a nosecone mechanical connection feature. In FIG. 29, the trolling motor 200 may include one or more cover panels 2902 configured to cover the retention slots 2802, such as to provide a more attractive appearance, or hydrodynamic profile.

FIGS. 30-32 illustrate example bulkhead configurations. FIG. 30 depicts a trolling motor 200 including a single bulkhead 400. The depicted bulkhead 400 is operably coupled to the housing by a screw 3002 disposed through a lip provided at the periphery of the bulkhead 400 and into a face of the housing 202. The bulkhead 400 also includes a sealing element 3004 between the bulkhead 400 and both of the housing 202 and the nosecone 204, which may provide a watertight seal therebetween. The bulkhead 400 may provide a watertight seal for the housing 202 and a mating surface for attachment of the nosecone 204 to the housing 202.

FIGS. 31-33 illustrate an example trolling motor 200 including a first bulkhead 400 and a secondary bulkhead 3102. The secondary bulkhead 3102 may be operably coupled to the nosecone 204, such as by screws, rivets, welding, adhesive, or the like. The secondary bulkhead 3102 may provide a watertight seal for the nosecone 204 and/or aid in potting, covering of components of the nosecone 204, connection to the housing 202, or the like. In some embodiments, the connection of the nosecone 204 to the housing 202 may be facilitated by the bulkhead 400 and the secondary bulkhead 3102. In an example embodiment, the bulkhead 400 and the secondary bulkhead 3102 may include a connection element 3104, such as complementary threads 3104, configured to retain the nosecone 204 in connection with the housing 202 through connection of the bulkhead 400 to the secondary bulkhead 3102. As such, the connection element 3104 forms a nosecone mechanical connection feature. FIGS. 32-33 depict the bulkhead 400 including a clip 3202, configured to engage the secondary bulkhead 3102. The clip 3202 may retain the connection between the housing 202 and the nosecone 204 by limiting disengagement of the connection element 3104, e.g. backing off of threads.

Figure 34:
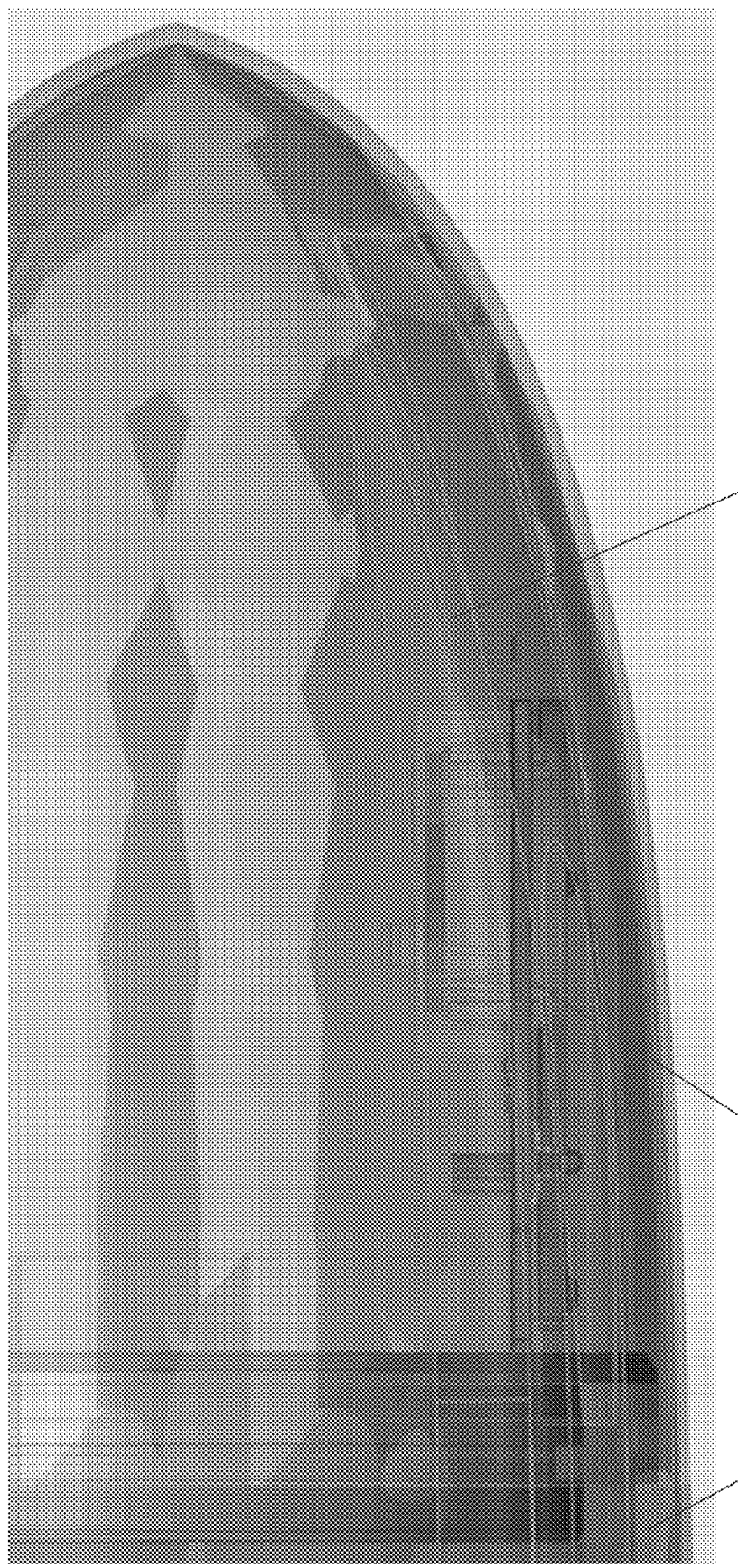
Figure 35:
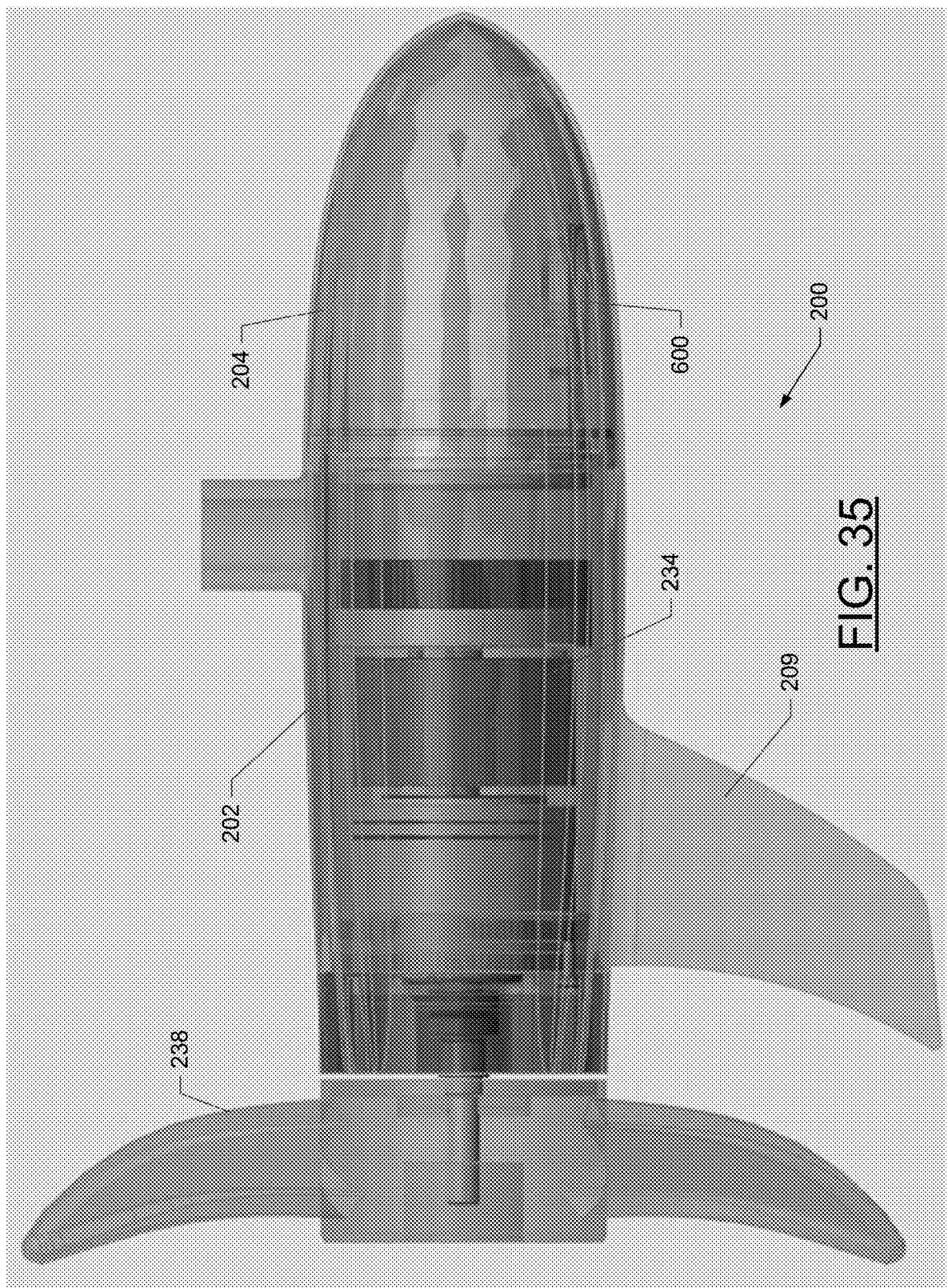
Figure 36:
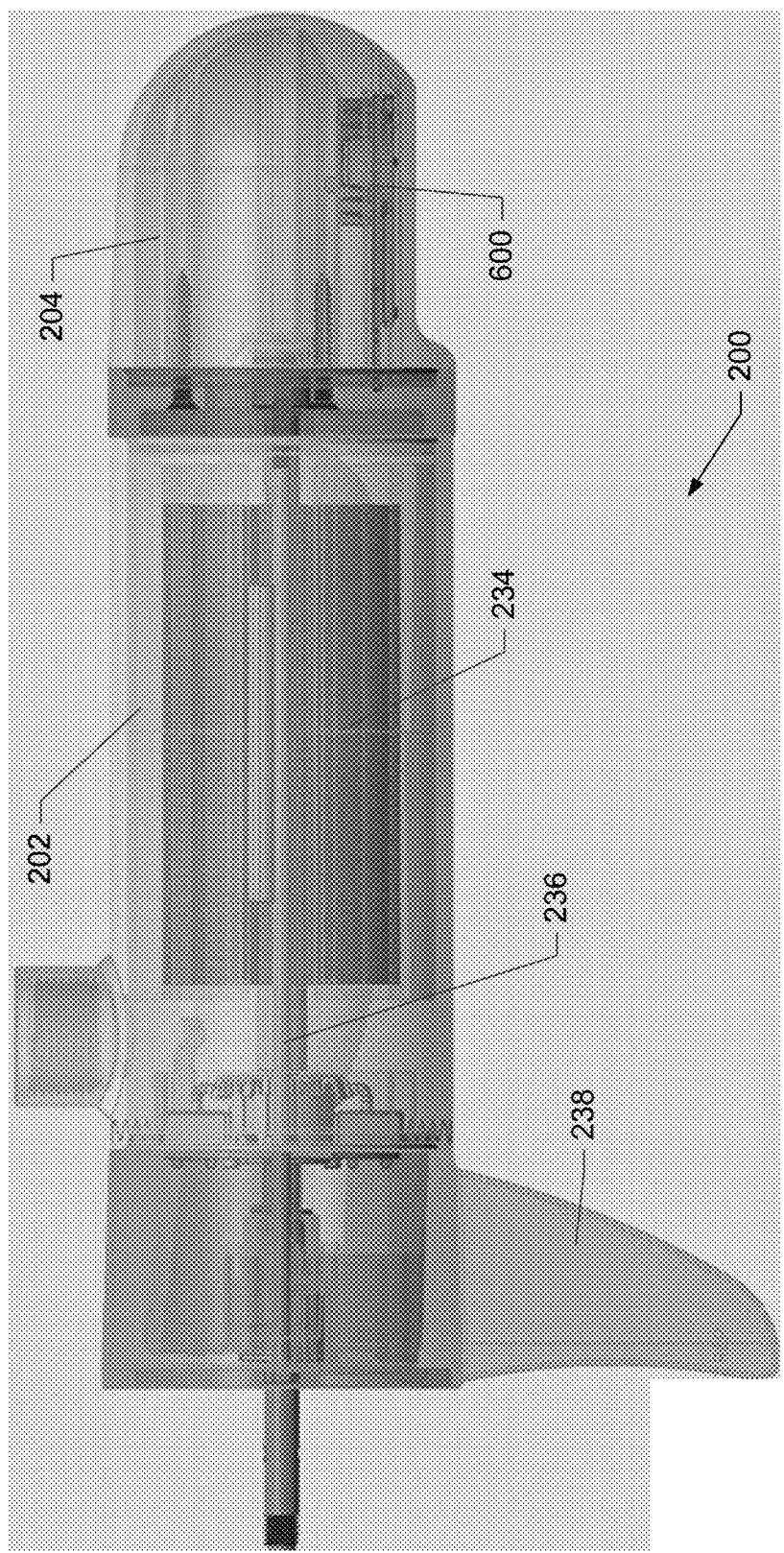
Figure 37:
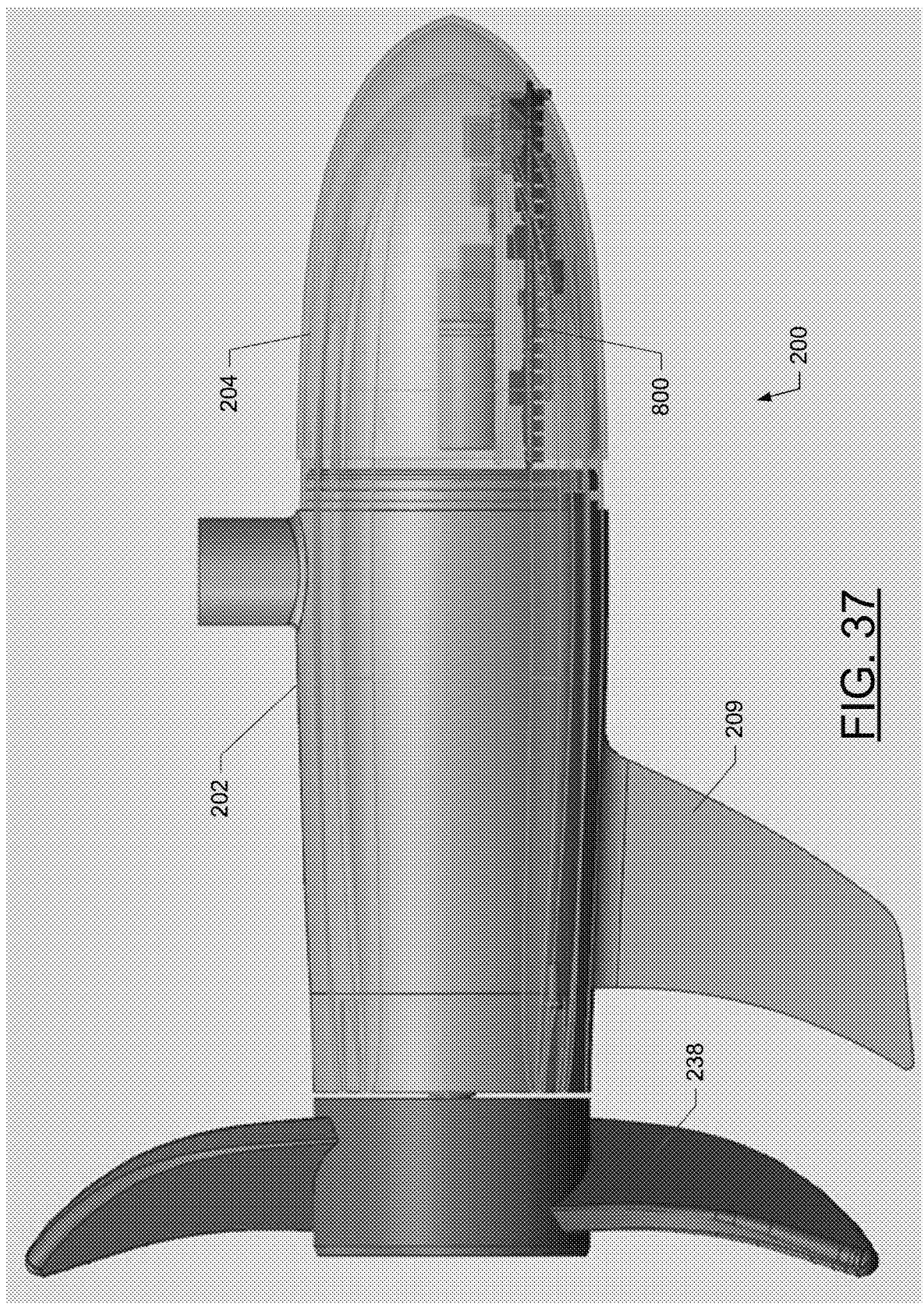

FIGS. 34-37 illustrate example trolling motors 200 with transparent housings 202 and/or nosecones 204 to aid in understanding of a physical layout of example components of the nosecone 204 and/or housing 202. FIGS. 34 and 35 include a generally conical nosecone 204 including a transducer array, which includes a downscan sonar array 600 disposed at the bottom of the nosecone. FIG. 36 illustrates a trolling motor including a nosecone 204 with a flat bottom portion and a downscan sonar transducer 600. The downscan sonar transducer 600 may be aligned with the flat bottom portion of the nosecone 204 to limit distortion introduced by changes in medium in front of the transducer elements. Additionally, the motor 234 is depicted within the housing 202 providing a propeller 238 coupled thereto by a shaft 236. FIG. 37 depicts a trolling motor 200 including a nosecone 204 equipped with a phased array 800. The phased array 800 may be disposed at or near the bottom of the nosecone 204.

FIG. 38 illustrates example profiles of a nosecone 204 with the one or more transducer elements 210 positioned in the nosecone 204 versus one or more transducer elements 210 positioned in an interchangeable component module 2702. As discussed above, the interchangeable component module 2702 may enable further customization of the nosecone 204 and/or the marine electronics disposed therein.

Figure 43:
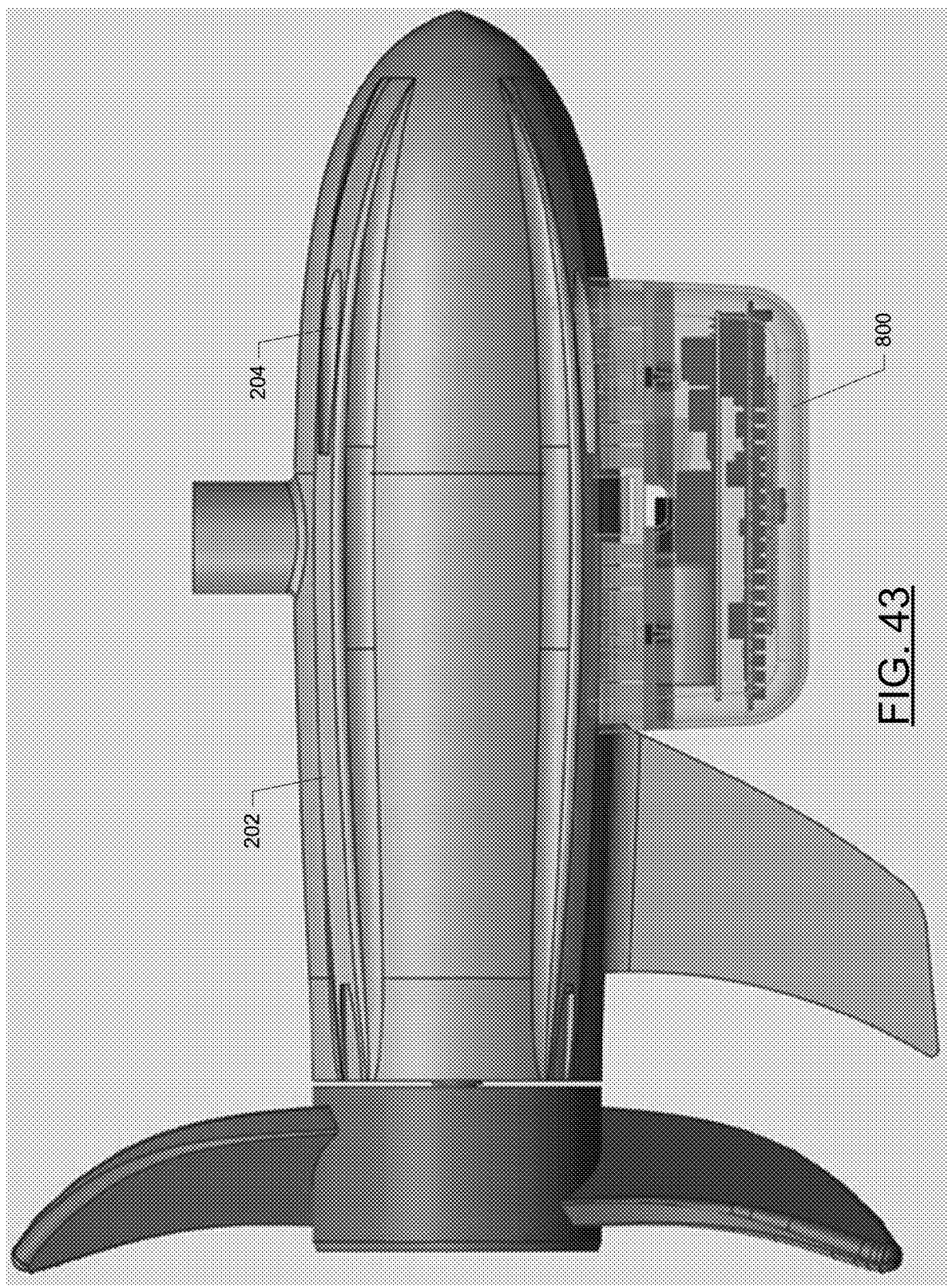
Figure 44:
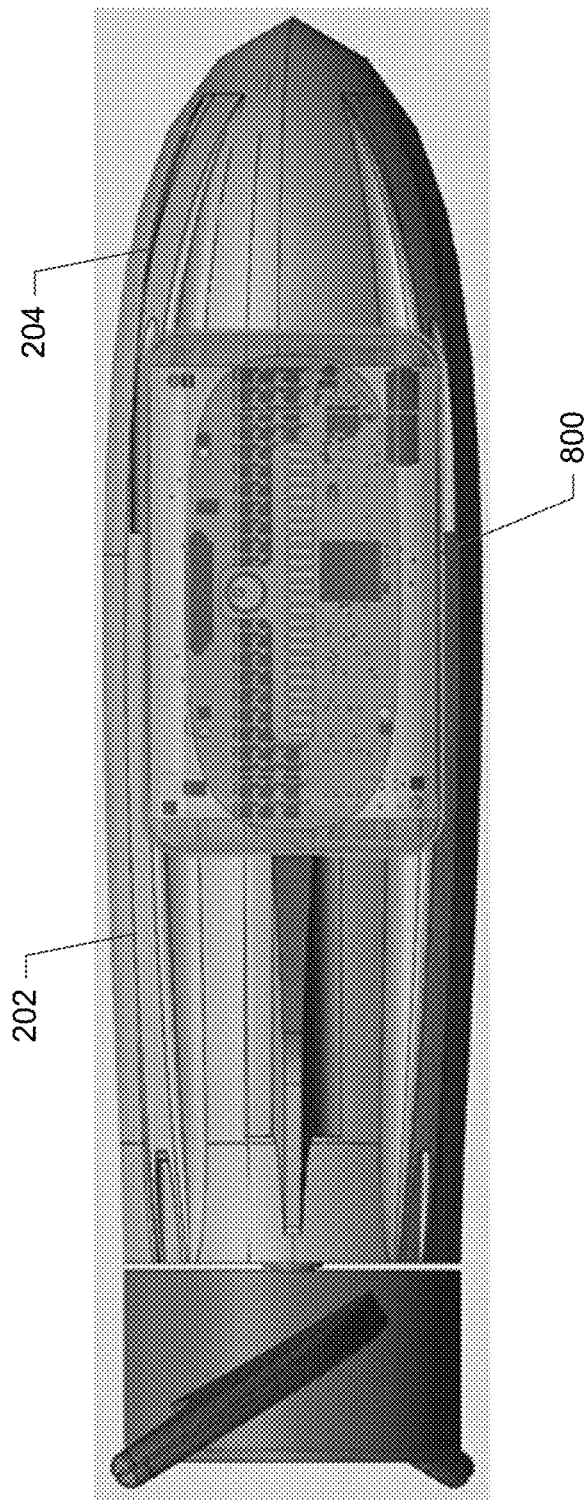

FIGS. 39-44 illustrate example placements of one or more transducer elements in relation to the trolling motor 200. FIGS. 39-42 depict example placements of a multifunction array 900 relative to the housing 202 and nosecone 204 from a bottom up perspective and a side perspective. FIGS. 43 and 44 depict an example placement of a phased array 800 relative to the housing 202 and nosecone 204 from a bottom perspective and side perspective. One more of such example transducer elements and/or arrays may be disposed within a transducer housing 4502, as depicted in FIG. 45. The transducer housing 4502 may extend from the nosecone 204, similar to the expanded nosecone 204 depicted in FIG. 9. Additionally or alternatively, the transducer housing 4502 may be connected to the housing 202 and/or nosecone 204, such as by one or more fasteners. In some embodiments, the transducer housing 4502 may be configured to be connected to the trolling motor 200 using one or more of the fasteners used to connect the housing 202 to the nosecone 204.

FIGS. 46-48 illustrate example connections of the nosecone 204 to the housing 202. FIGS. 46 and 47 depict a nosecone 204 connected from the front of the nosecone 204. The nosecone 204 may include one or more retention slots 4602 configured to enable alignment of a retention element 4604, e.g. nosecone mechanical connection feature, such as a screw, bolt, pin, or the like. The retention element 4604 may extend through the nosecone 204 such as through a retention aperture disposed in a face of the nosecone and attach to the housing 202 or bulkhead 400, such as into a receiving aperture, e.g. a motor housing mechanical connection feature. FIG. 48 depicts a housing 202 including one or more retention shafts 4802 disposed in the sidewall of the housing 202. The retention shafts may be configured to enable alignment of a retention element 4804, such as a screw, bolt, pin, or the like. The retention element 4804 may extend through the sidewall of the housing 202 and attach to the nosecone 204 or bulkhead 400.

Descriptions of embodiments including mechanical connections features disposed on the nosecone 204 or housing 202 are merely for illustrative purposes. One of ordinary skill in the art would immediately appreciate that mechanical connections features may be reversed, such that the described mechanical connection features are disposed on the opposite of the nosecone 204 or housing 202 from the embodiment described herein.

Method of Manufacture

Embodiments of the present invention provide methods for manufacturing example trolling motor systems and/or various nosecones, such as described herein.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A trolling motor assembly comprising:
an electric motor with a propeller coupled thereto;
a shaft configured to couple the electric motor to a watercraft, wherein the shaft is configured to rotate relative to the watercraft, wherein the shaft defines an internal passage;
a motor housing that encapsulates the electric motor, wherein the housing defines a first end and a second end, wherein the propeller is positioned proximate the second end, wherein the motor housing comprises at least one motor housing electrical connection feature proximate the first end and at least one motor housing mechanical connection feature proximate the first end;
a removable nosecone removably coupled to the motor housing, wherein the removable nosecone defines a nosecone housing that comprises at least one nosecone electrical connection feature and at least one nosecone mechanical connection feature, wherein the nosecone housing is configured to encapsulate at least one marine device and includes at least one nosecone electrical cable, wherein the at least one nosecone electrical cable electrically connects the at least one marine device to the at least one nosecone electrical connection feature, wherein the at least one nosecone mechanical connection feature is configured to removably attach to the at least one motor housing mechanical connection feature to enable removable coupling between the nosecone housing and the first end of the motor housing, wherein the at least one nosecone electrical connection feature is configured to electrically connect with the at least one motor housing electrical connection feature in an instance in which the at least one nosecone mechanical connection feature is attached to the at least one motor housing mechanical connection feature; and
at least one motor housing electrical cable that leads from the at least one electrical connection feature of the motor housing through the internal passage of the shaft to enable electrical signals to be transmitted between the at least one marine device within the nosecone housing and a computing device in an instance in which the at least one nosecone electrical connection feature is electrically connected to the at least one motor housing electrical connection feature, wherein the at least one motor housing electrical cable is contained within the internal passage of the shaft so as to protect the at least one motor housing electrical cable while still enabling rotation of the shaft and motor housing,
wherein the motor housing mechanical connection feature comprises a bolt receiver, and the nosecone mechanical connection feature comprises a retention bolt including a bolt head or retention nut, wherein the retention bolt is configured to engage the bolt receiver and apply retention force to the removable nosecone in response to tightening of the retention bolt, and
wherein the removable nosecone comprises a through aperture configured to receive the retention bolt therethrough, and wherein the trolling motor further comprises a bolt cap configured to close the through aperture in the removable nosecone, wherein the through aperture extends along a centrally-located longitudinal axis of the removable nosecone.

2. The trolling motor assembly of claim 1, wherein the removable nosecone is interference fit about a periphery of the first end of the motor housing.

3. The trolling motor assembly of claim 1, wherein the motor housing comprises a watertight bulkhead, and wherein the removable nosecone is removably coupled to the watertight bulkhead.

4. The trolling motor assembly of claim 3, wherein the watertight bulkhead comprises an electrical cable aperture allowing the electrical cable to pass therethrough, wherein the aperture includes a sealing element disposed in the electrical cable aperture to provide a watertight barrier between the motor housing and the removable nosecone.

5. The trolling motor assembly of claim 1, wherein the at least one marine device is encapsulated in a waterproof material.

6. The trolling motor assembly of claim 1, wherein the motor housing mechanical connection feature further comprises threads disposed about an outer periphery of the first end of the motor housing and the nosecone mechanical connection feature comprises complementary threads disposed on an inner periphery of the nosecone.

7. The trolling motor assembly of claim 1, wherein the nosecone mechanical connection feature further comprises a plurality of retention screws disposed through a sidewall of the removable nosecone and at least partially through the motor housing.

8. The trolling motor assembly of claim 1, further comprising:
a circular connector configured to retain the removable nosecone in engagement with the motor housing.

9. The trolling motor assembly of claim 1, wherein, when connected to the removable nosecone, the bolt cap conforms to the contour of the removable nosecone.

10. A trolling motor assembly comprising:
an electric motor with a propeller coupled thereto;
a shaft configured to couple the electric motor to a watercraft, wherein the shaft is configured to rotate relative to the watercraft, wherein the shaft defines an internal passage;
a motor housing that encapsulates the electric motor, wherein the housing defines a first end and a second end, wherein the propeller is positioned proximate the second end, wherein the motor housing comprises at least one motor housing electrical connection feature and at least one motor housing mechanical connection feature proximate the first end; and
a removable nosecone removably coupled to the motor housing, wherein the removable nosecone defines a nosecone housing that comprises at least one nosecone electrical connection feature and at least one nosecone mechanical connection feature, wherein the nosecone housing is configured to encapsulate at least one marine device, wherein the at least one nosecone mechanical connection feature is configured to removably attach to the at least one motor housing mechanical connection feature to enable removable coupling between the nosecone housing and the first end of the motor housing, wherein the at least one nosecone electrical connection feature is configured to establish wireless data communication with the at least one motor housing electrical connection feature or a computing device,
wherein the motor housing mechanical connection feature comprises a bolt receiver, and the nosecone mechanical connection feature comprises a retention bolt including a bolt head or retention nut, wherein the retention bolt is configured to engage the bolt receiver and apply retention force to the removable nosecone in response to tightening of the retention bolt, and wherein the removable nosecone comprises a through aperture configured to receive the retention bolt therethrough, and wherein the trolling motor further comprises a bolt cap configured to close the through aperture in the removable nosecone via a threaded connection, wherein, when connected to the removable nosecone, the bolt cap conforms to the contour of the removable nosecone.

11. The trolling motor assembly of claim 10, wherein the at least one nosecone electrical connection feature is configured to establish wireless data communication with the at least one motor housing electrical connection feature in an instance in which the at least one nosecone mechanical connection feature is attached to the at least one motor housing mechanical connection feature, and wherein the trolling motor assembly comprises at least one motor housing electrical cable that leads from the at least one electrical connection feature of the motor housing through the internal passage of the shaft to enable electrical signals to be transmitted between the at least one marine device within the nosecone housing and a computing device in an instance in which the at least one nosecone electrical connection feature is electrically connected to the at least one motor housing electrical connection feature, wherein the at least one motor housing electrical cable is contained within the internal passage of the shaft so as to protect the at least one motor housing electrical cable while still enabling rotation of the shaft and motor housing.

12. The trolling motor assembly of claim 10, wherein the motor housing comprises a watertight bulkhead, and wherein the removable nosecone is removably coupled to the watertight bulkhead.

13. The trolling motor assembly of claim 12 further comprising a second watertight bulkhead that seals the removable nosecone.

14. The trolling motor assembly of claim 10, wherein the through aperture extends along a centrally-located longitudinal axis of the removable nosecone.

15. A trolling motor assembly comprising:
   an electric motor with a propeller coupled thereto;
   a shaft configured to couple the electric motor to a watercraft, wherein the shaft is configured to rotate relative to the watercraft, wherein the shaft defines an internal passage;
   a motor housing that encapsulates the electric motor, wherein the housing defines a first end and a second end, wherein a first watertight bulkhead disposed at the first end and the propeller is positioned proximate the second end, wherein the motor housing comprises at least one motor housing electrical connection feature proximate the first end and at least one motor housing mechanical connection feature proximate the first end;
   a removable nosecone operably coupled to the first watertight bulkhead, wherein the removable nosecone defines a nosecone housing that comprises at least one nosecone mechanical connection feature, wherein the at least one nosecone mechanical connection feature is configured to removably attach to the at least one motor housing mechanical connection feature to enable removable coupling between the nosecone housing and the first end of the motor housing;
   at least one motor housing electrical cable that leads from the at least one electrical connection feature of the motor housing through the internal passage of the shaft to enable electrical signals to be transmitted between at least one marine device within the nosecone housing and a computing device in an instance in which the at least one marine electronic device feature is installed in the nosecone and electrically connected to the at least one motor housing electrical connection feature, wherein the at least one motor housing electrical cable is contained within the internal passage of the shaft so as to protect the at least one motor housing electrical cable while still enabling rotation of the shaft and motor housing; and
   a second watertight bulkhead that seals the removable nosecone,
   wherein the motor housing mechanical connection feature comprises a bolt receiver operably coupled to the first watertight bulkhead, and the nosecone mechanical connection feature comprises a retention bolt including a bolt head or retention nut, wherein the retention bolt is configured to engage the bolt receiver and apply retention force to the removable nosecone in response to tightening of the retention bolt.

16. The trolling motor assembly of claim 15, wherein the removable nosecone is interference fit about a periphery of the first end of the motor housing.

17. The trolling motor assembly of claim 15, wherein the first watertight bulkhead comprises an electrical cable aperture allowing the electrical cable to pass therethrough, wherein the aperture includes a sealing element disposed in the electrical cable aperture to provide a watertight barrier between the motor housing and the removable nosecone.

18. The trolling motor assembly of claim 15, wherein the at least one marine device is encapsulated in a waterproof material.

* * * * *